(12) United States Patent
Sanada et al.

(10) Patent No.: US 11,870,300 B2
(45) Date of Patent: *Jan. 9, 2024

(54) PRESSED POWDER MATERIAL AND ROTATING ELECTRIC MACHINE

(71) Applicant: KABUSHIKI KAISHA TOSHIBA, Tokyo (JP)

(72) Inventors: Naoyuki Sanada, Kawasaki Kanagawa (JP); Tomohiro Suetsuna, Kawasaki Kanagawa (JP); Hiroaki Kinouchi, Tokyo (JP); Yasuyuki Hotta, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 806 days.

This patent is subject to a terminal disclaimer.

(21) Appl. No.: 17/002,811

(22) Filed: Aug. 26, 2020

(65) Prior Publication Data
US 2021/0305851 A1 Sep. 30, 2021

(30) Foreign Application Priority Data
Mar. 18, 2020 (JP) ................. 2020-047333

(51) Int. Cl.
*H01F 1/147* (2006.01)
*H01F 1/055* (2006.01)
(Continued)

(52) U.S. Cl.
CPC ............... *H02K 1/02* (2013.01); *B22F 1/068* (2022.01); *H01F 1/14741* (2013.01); *H01F 3/08* (2013.01);
(Continued)

(58) Field of Classification Search
CPC .... H01F 1/0556; H01F 1/0558; H01F 1/0578; H01F 1/06; H01F 1/086; H01F 1/08;
(Continued)

(56) References Cited

U.S. PATENT DOCUMENTS

2001/0036084 A1 11/2001 Yoshida et al.
2017/0011828 A1 1/2017 Mio et al.
(Continued)

FOREIGN PATENT DOCUMENTS

EP 1986200 * 8/2010
JP 3-108301 5/1991
(Continued)

OTHER PUBLICATIONS

Halder, et al. "Separation of particle size and lattice strain in integral breadth measurements", Acta Cryst, 20, 1966, pp. 312-313.

*Primary Examiner* — Matthew E. Hoban
(74) *Attorney, Agent, or Firm* — Amin, Turocy & Watson, LLP

(57) ABSTRACT

A pressed powder material of the embodiments is a pressed powder material including: a plurality of flaky magnetic metal particles, each flaky magnetic metal particle having a flat surface and a magnetic metal phase containing at least one first element selected from the group consisting of Fe, Co, and Ni, the flaky magnetic metal particles having an average thickness of from 10 nm to 100 μm and an average value of the ratio of the average length in the flat surface to the thickness of from 5 to 10,000; and an intercalated phase existing between the flaky magnetic metal particles and containing at least one second element selected from the group consisting of oxygen (O), carbon (C), nitrogen (N), and fluorine (F), in which the pressed powder material includes a plane, and in which the pressed powder material includes, in a predetermined cross-section perpendicular to the flat surfaces, a void site at the boundary part between the flat surface of a flaky magnetic metal particle and the intercalated phase in contact with the flat surface, and the ratio of the length of the void site is 20% or less with respect to the length of the flat surface.

10 Claims, 24 Drawing Sheets

(51) Int. Cl.
  *H02K 1/02* (2006.01)
  *H01F 3/08* (2006.01)
  *B22F 1/068* (2022.01)
  *B22F 1/05* (2022.01)
  *B22F 1/16* (2022.01)
  *B22F 1/08* (2022.01)

(52) U.S. Cl.
  CPC . *B22F 1/05* (2022.01); *B22F 1/08* (2022.01); *B22F 1/16* (2022.01)

(58) Field of Classification Search
  CPC ......... H01F 1/12; H01F 1/14; H01F 1/14716; H01F 1/14725; H01F 1/14758; H01F 1/14775; H01F 1/14783; H01F 1/18; H01F 1/37; H01F 1/375; H01F 1/26
  See application file for complete search history.

(56) References Cited

U.S. PATENT DOCUMENTS

| | | |
|---|---|---|
| 2017/0076845 A1 | 3/2017 | Suetsuna et al. |
| 2017/0209924 A1 | 7/2017 | Suetsuna et al. |
| 2018/0258513 A1 | 9/2018 | Suetsuna et al. |
| 2019/0238021 A1 | 8/2019 | Kinouchi et al. |
| 2019/0283127 A1 | 9/2019 | Kinouchi et al. |
| 2020/0035391 A1 | 1/2020 | Suetsuna et al. |
| 2020/0043639 A1 | 2/2020 | Suetsuna et al. |
| 2020/0082963 A1 | 3/2020 | Suetsuna et al. |
| 2020/0303106 A1 | 9/2020 | Suetsuna et al. |
| 2020/0340087 A1 | 10/2020 | Suetsuna et al. |
| 2021/0082608 A1 | 3/2021 | Sanada et al. |

FOREIGN PATENT DOCUMENTS

| | | |
|---|---|---|
| JP | 2002-151317 | 5/2002 |
| JP | 2002-246219 | 8/2002 |
| JP | 2003-217919 | 7/2003 |
| JP | 2014-033001 | 2/2014 |
| JP | 2017-022198 | 1/2017 |
| JP | 2017-059816 | 3/2017 |
| JP | 2017-135358 | 8/2017 |
| JP | 2018-152449 | 9/2018 |
| JP | 2018-168402 | 11/2018 |
| JP | 2019-058014 | 4/2019 |
| JP | 2019-161183 | 9/2019 |
| JP | 2020-25077 | 2/2020 |
| JP | 2020-025077 | 2/2020 |
| JP | 2020-43268 | 3/2020 |
| JP | 2020-155525 | 9/2020 |
| JP | 2021-48238 | 3/2021 |
| WO | 2019/058602 | 3/2019 |

\* cited by examiner

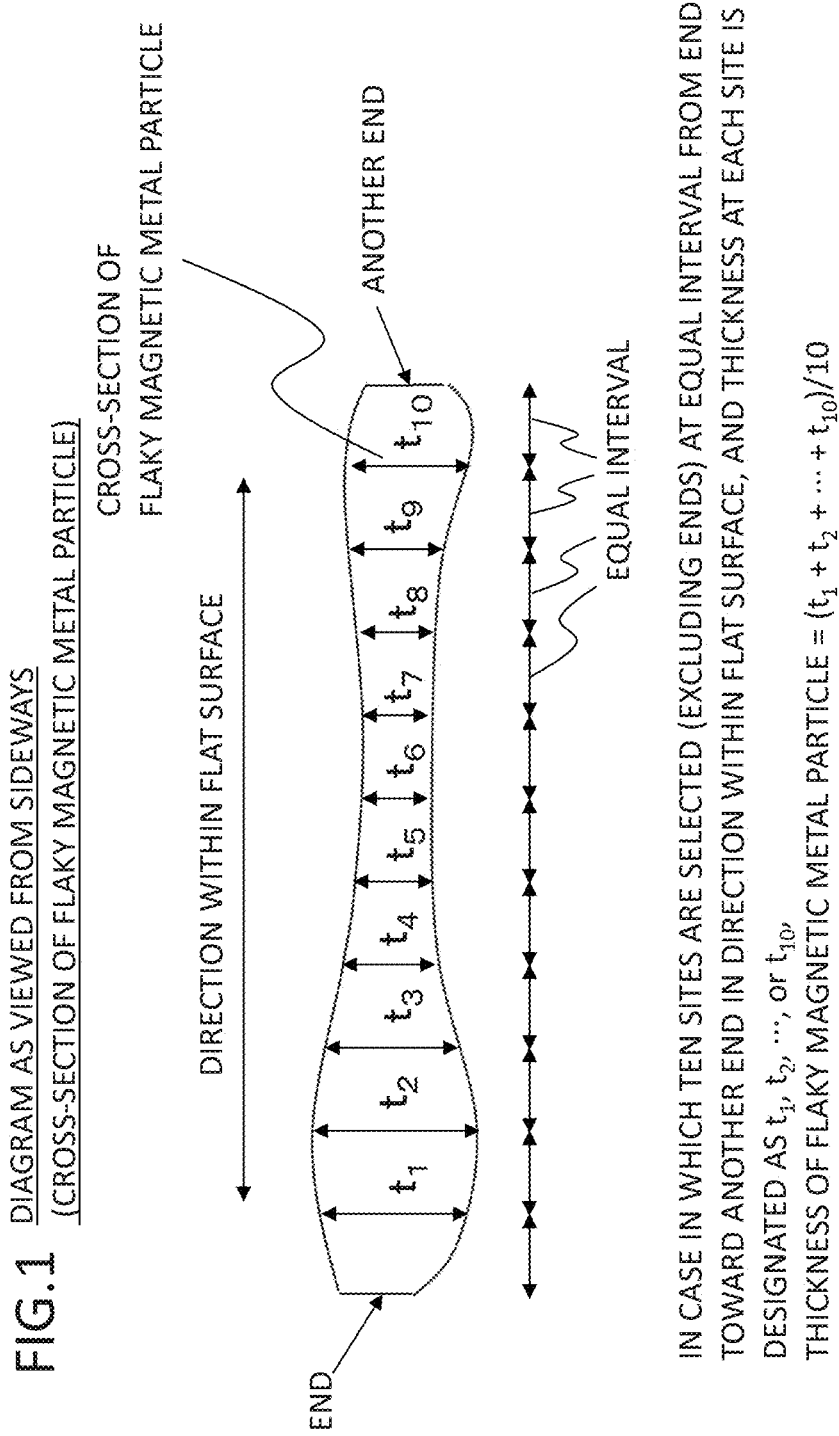

DIAGRAM AS VIEWED FROM TOP (FLAT SURFACE OF FLAKY MAGNETIC METAL PARTICLES)

IN CASE OF
TRIANGLE

IN CASE OF QUADRILATERAL

IN CASE OF ROUNDISH SHAPE

DIAGRAM AS VIEWED FROM TOP (FLAT SURFACE OF FLAKY MAGNETIC METAL PARTICLES)

DIAGRAM AS VIEWED FROM TOP (FLAT SURFACES OF FLAKY MAGNETIC METAL PARTICLES)

FIG.9
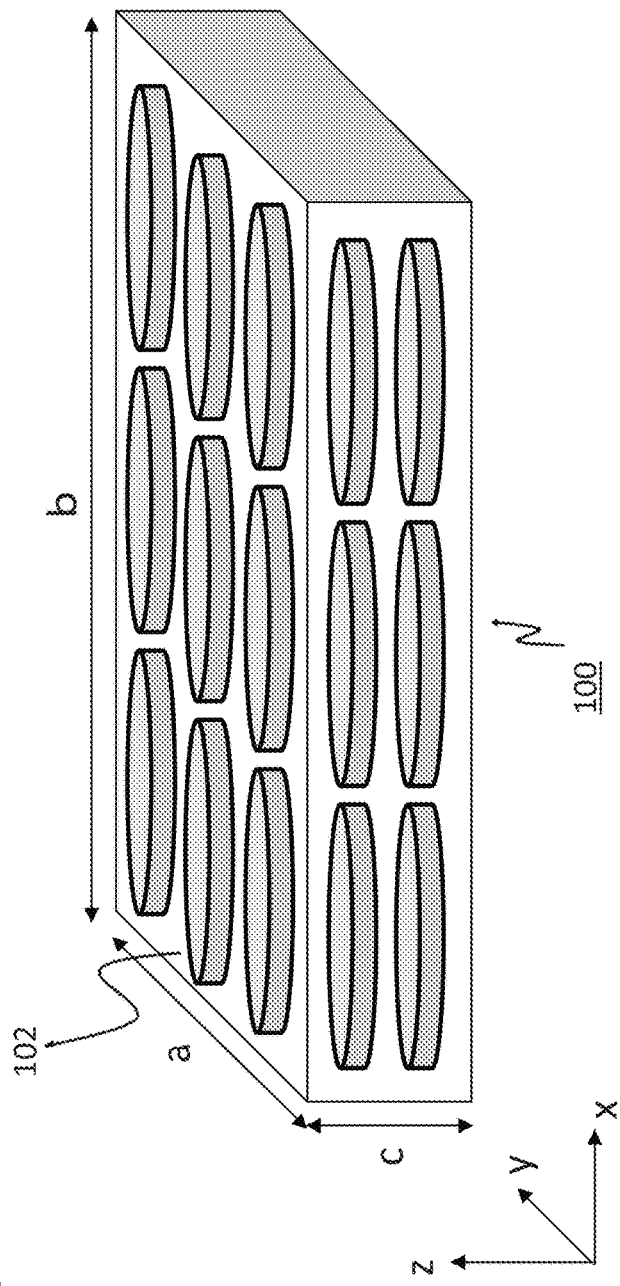
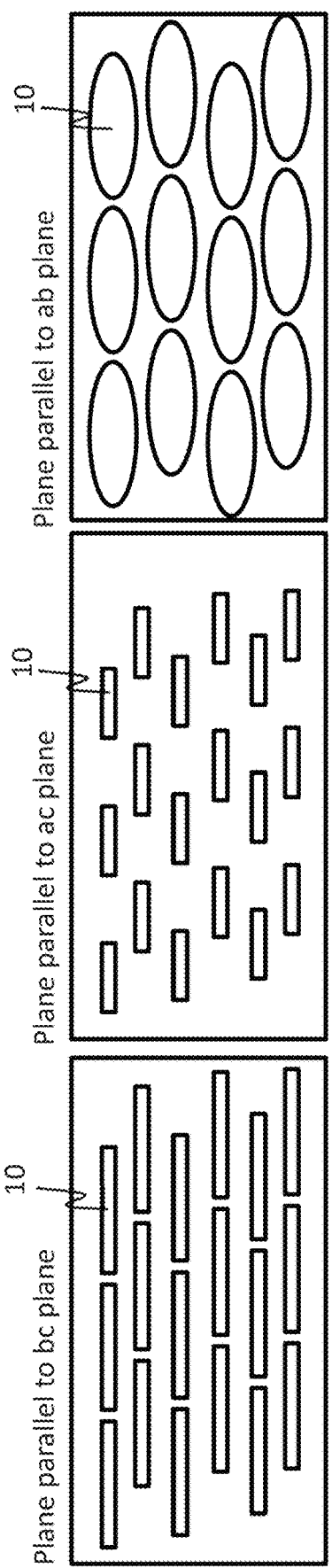

FIG.13
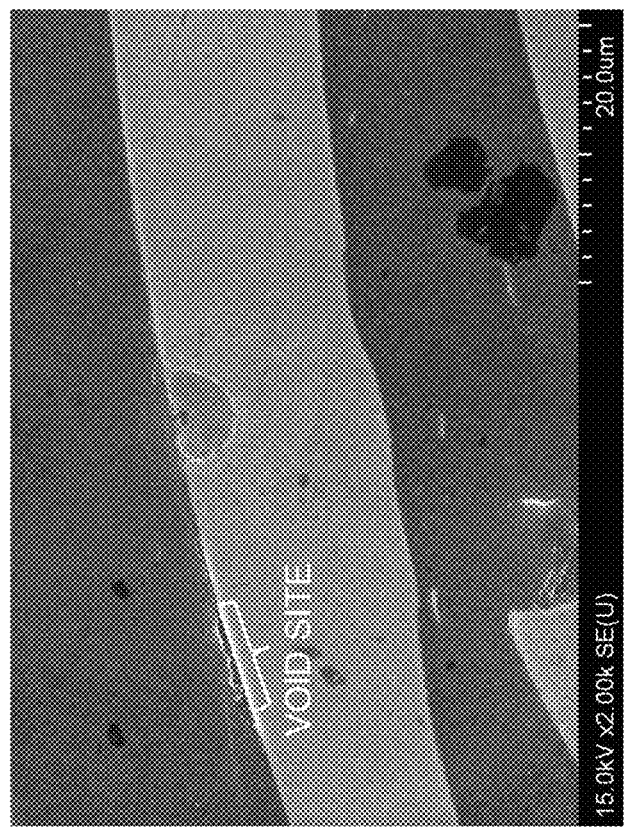
Embodiment
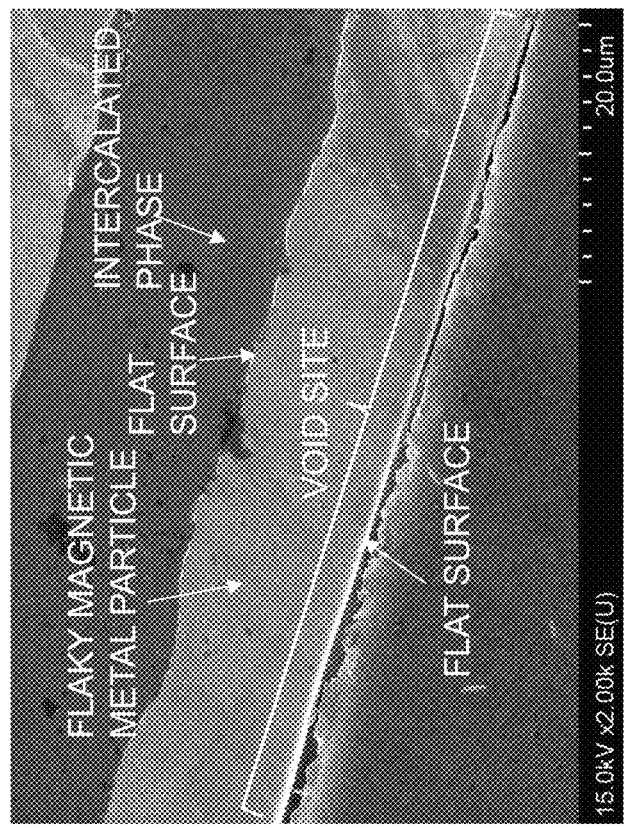
Comparative Embodiment

EVEN IF THERMOSETTING RESIN SUCH AS BISMALEIMIDE IS USED,
PRESSED POWDER BODY WITH FEWER INTERFACIAL DEFECTS CAN BE OBTAINED

FIG.16
CONTROL SYSTEM BASED ON PLL
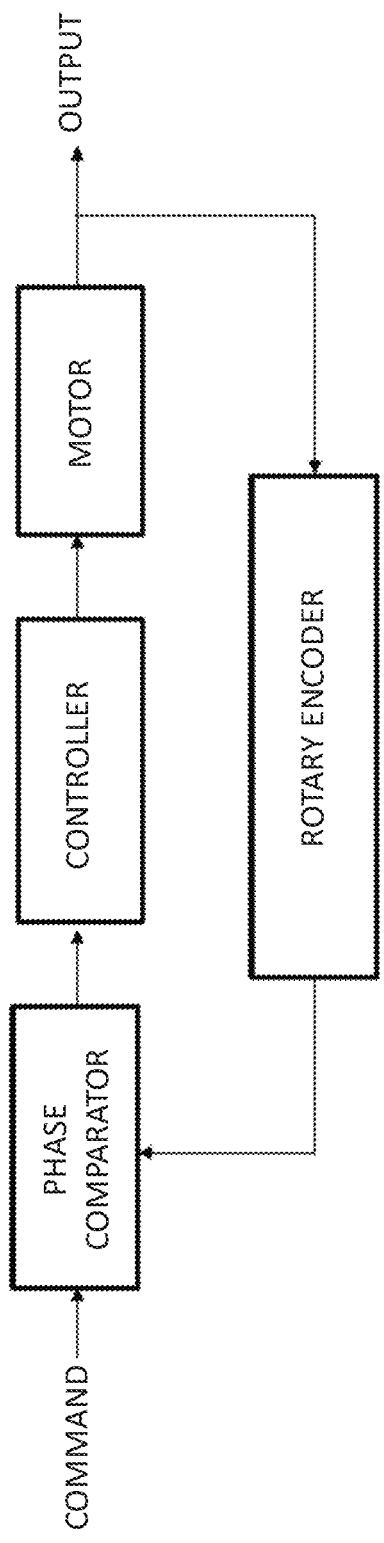
CONTROL SYSTEM BASED ON INVERTER
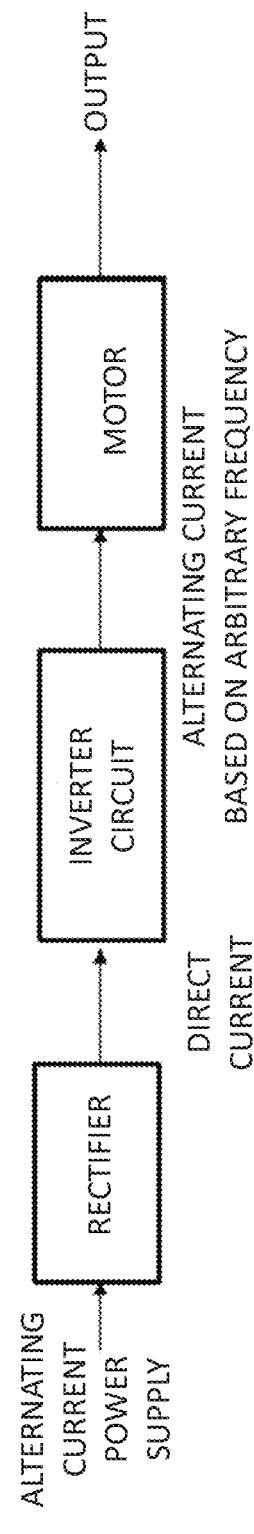

PRESSED POWDER MATERIAL AND ROTATING ELECTRIC MACHINE

CROSS-REFERENCE TO RELATED APPLICATION

This application is based upon and claims the benefit of priority from Japanese Patent Application No. 2020-047333, filed on Mar. 18, 2020, the entire contents of which are incorporated herein by reference.

FIELD

Embodiments described herein relate generally to a pressed powder material and a rotating electric machine.

BACKGROUND

Currently, soft magnetic materials are applied to the component parts of various systems and devices, such as rotating electric machines (for example, motors and generators), potential transformers, inductors, transformers, magnetic inks, and antenna devices. Thus, soft magnetic materials are regarded as very important materials. In these component parts, the real part of the magnetic permeability (real part of the relative magnetic permeability), $\mu'$, of a soft magnetic material is utilized, and therefore, in the case of actual use, it is preferable to control $\mu'$ in accordance with the working frequency band. Furthermore, in order to realize a highly efficient system, it is preferable to use a material having a loss that is as low as possible. That is, it is preferable to make the imaginary part of the magnetic permeability (imaginary part of the relative magnetic permeability), $\mu''$ (corresponding to a loss), as low as possible. In regard to the loss, the loss factor, $\tan \delta \ (=\mu''/\mu' \times 100(\%))$ serves as a criterion, and as $\mu''$ becomes smaller relative to $\mu'$, the loss factor $\tan \delta$ becomes smaller, which is preferable. In order to attain such conditions, it is preferable to make the core loss for the conditions of actual operation small, that is, it is preferable to make the eddy current loss, hysteresis loss, ferromagnetic resonance loss, and residual loss (other losses) as small as possible. In order to make the eddy current loss small, it is effective to increase the electrical resistance, decrease the sizes of metal parts, or finely divide the magnetic domain structure. In order to make the hysteresis loss small, it is effective to reduce coercivity or increase the saturation magnetization. In order to make the ferromagnetic resonance loss small, it is effective to make the ferromagnetic resonance frequency higher by increasing the anisotropic magnetic field of the material. Furthermore, in recent years, since there is an increasing demand for handling of high electric power, it is required that losses are small, particularly under the operation conditions in which the effective magnetic field applied to the material is large, such as high current and high voltage. To attain this end, it is preferable that the saturation magnetization of a soft magnetic material is as large as possible so as not to bring about magnetic saturation. Furthermore, in recent years, since size reduction of equipment is enabled by utilization of high frequency, increase of the working frequency bands in systems and device equipment is underway, and there is an urgent need for the development of a magnetic material having high magnetic permeability and low losses at high frequency and having excellent characteristics.

Furthermore, in recent years, due to the heightened awareness of the issues on energy saving and environmental issues, there is a demand to increase the efficiency of systems as high as possible. Particularly, since motor systems are responsible for a major portion of electric power consumption in the world, efficiency enhancement of motors is very important. Above all, a core and the like that constitute a motor are formed from soft magnetic materials, and it is requested to increase the magnetic permeability or saturation magnetization of soft magnetic materials as high as possible, or to make the losses as low as possible. Furthermore, in regard to magnetic wedges that are used in some motors, there is a demand for minimizing losses as far as possible. There is the same demand also for systems that use transformers. In motors, transformers and the like, the demand for size reduction is also high, along with efficiency enhancement. In order to realize size reduction, it is essential to maximize the magnetic permeability and saturation magnetization of the soft magnetic materials as far as possible. Furthermore, in order to also prevent magnetic saturation, it is important to make saturation magnetization as high as possible. Moreover, the need for increasing the operation frequency of systems is also high, and thus, there is a demand to develop a material having low losses in high frequency bands.

Soft magnetic materials having high magnetic permeability and low losses are also used in inductance elements, antenna devices and the like, and particularly above all, in recent years, attention has been paid to the application of soft magnetic materials in power inductance elements that are used in power semiconductor devices. In recent years, the importance of energy saving and environmental protection has been actively advocated, and reduction of the amount of $CO_2$ emission and reduction of the dependency on fossil fuels have been required. As the result, development of electric cars or hybrid cars that substitute gasoline cars is in active progress. Furthermore, technologies for utilizing natural energy such as solar power generation and wind power generation are regarded as key technologies for an energy saving society, and many developed countries are actively pushing ahead with the development of technologies for utilizing natural energy. Furthermore, the importance of establishment of home energy management system (HEMS) and building and energy management system (BEMS), which control the electric power generated by solar power generation, wind power generation or the like by a smart grid and supply the electric power to homes, offices and plants with high efficiency, as environment-friendly power saving systems, has been actively advocated. In such a movement of energy saving, power semiconductor devices play a key role. Power semiconductor devices are semiconductor devices that control high electric power or energy with high efficiency, and examples thereof include individual power semiconductor devices such as an insulated gate bipolar transistor (IGBT), a metal oxide semiconductor field effect transistor (MOSFET), a power bipolar transistor, and a power diode; power supply circuits such as a linear regulator and a switching regulator; and a large-scale integration (LSI) logic circuit for power management to control the above-mentioned devices. Power semiconductor devices are widely used in all sorts of equipment including home electrical appliances, computers, automobiles and railways, and since expansion of the supply of these applied apparatuses, and an increase in the mounting ratio of power semiconductor devices in these apparatuses can be expected, a rapid growth in the market for power semiconductor devices in the future is anticipated. For example, inverters that are installed in many home electrical appliances use power semiconductor devices nearly in all parts, and thereby extensive energy saving is made possible. Currently, silicon (Si) occupies a major part in power semiconductor devices; however, for a further increase in efficiency or further size reduction of equipment, utilizing silicon carbide (SiC) and gallium nitride (GaN) is considered effective. Since SiC and GaN have larger band gaps and larger breakdown fields than Si, and the breakdown voltage can be made higher, elements can be made thinner. Therefore, the on-resistance of semiconductor devices can be lowered, and it is effective for loss reduction and efficiency enhancement. Furthermore, since SiC or GaN has high carrier mobility, the switching frequency can be made higher, and this is effective for size reduction of elements. Furthermore, since SiC in particular has higher thermal conductivity than Si, the heat dissipation ability is higher, and operation at high temperature is enabled. Thus, cooling mechanisms can be simplified, and this is effective for size reduction. From the viewpoints described above, development of SiC and GaN power semiconductor devices is actively in progress. However, in order to realize the development, development of power inductor elements that are used together with power semiconductor devices, that is, development of soft magnetic materials having high magnetic permeability (high magnetic permeability and low losses), is indispensable. Regarding the characteristics required for magnetic materials in this case, high magnetic permeability and low magnetic loss in the driving frequency bands, as well as high saturation magnetization that can cope with a large electric current are preferable. In a case in which saturation magnetization is high, it is difficult to induce magnetic saturation even if a high magnetic field is applied, and a decrease in the effective inductance value can be suppressed. As a result, the direct current superimposition characteristics of the device are enhanced, and the efficiency of the system is increased.

Furthermore, a magnetic material having high magnetic permeability and low losses at high frequency is expected to be applied to high frequency communication equipment devices such as antenna devices. As a method for achieving size reduction and power saving of antennas, there is a method of using an insulated substrate having high magnetic permeability (high magnetic permeability and low losses) as an antenna substrate, and performing transmission and reception of electric waves by dragging the electric waves that should reach an electronic component or a substrate inside a communication apparatus from antennas into the antenna substrate, without allowing the electric waves to reach the electronic component or substrate. As a result, size reduction of antennas and power saving are made possible, and at the same time, the resonance frequency band of the antennas can also be broadened, which is preferable.

Furthermore, examples of other characteristics that are required when magnetic materials are incorporated into the various systems and devices described above include high thermal stability, high strength, and high toughness. Also, in order for the magnetic materials to be applied to complex shapes, a pressed powder body is more preferable than materials having a sheet shape or a ribbon shape. However, generally, when a pressed powder body is used, it is known that characteristics such as saturation magnetization, magnetic permeability, losses, strength, toughness, and hardness are deteriorated. Thus, enhancement of characteristics is preferable.

Next, in regard to existing soft magnetic materials, the types of the soft magnetic materials and their problems will be described.

Examples of an existing soft magnetic material for systems of 10 kH or less include a silicon steel sheet (FeSi). A silicon steel sheet is a material that is employed in most of rotating electric machines that have been used for a long time and handle large power, and the core materials of transformers. Characteristics enhancement from non-directional silicon steel sheets to directional silicon steel sheets can be attempted, and compared to the early stage of discovery, a progress has been made; however, in recent years, it is considered that characteristics improvement has reached an endpoint. Regarding the characteristics, it is particularly critical to simultaneously satisfy high saturation magnetization, high magnetic permeability, and low losses. Studies on materials that surpass silicon steel sheets are actively conducted globally, mainly based on the compositions of amorphous materials and nanocrystalline materials; however, a material composition that surpasses silicon steel sheets in all aspects has not yet been found. Furthermore, studies also have been conducted on pressed powder bodies that are applicable to complex shapes; however, pressed powder bodies have a defect that they have poor characteristics compared to sheets or ribbons.

Examples of existing soft magnetic materials for systems of 10 kHz to 100 kHz include Sendust (Fe—Si—Al), nanocrystalline FINEMET (Fe—Si—B—Cu—Nb), ribbons or pressed powder bodies of Fe-based or Co-based amorphous glass, and MnZn-based ferrite materials. However, all of these materials do not completely satisfy characteristics such as high magnetic permeability, low losses, high saturation magnetization, high thermal stability, high strength, high toughness, and high hardness, and the materials are insufficient.

Examples of existing soft magnetic materials of 100 kHz or higher (MHz frequency band or higher) include NiZn-based ferrites and hexagonal ferrites; however, these materials have insufficient magnetic characteristics at high frequency.

From the circumstances described above, development of a magnetic material having high saturation magnetization, high magnetic permeability, low losses, high thermal stability, and excellent mechanical characteristics is preferable.

BRIEF DESCRIPTION OF THE DRAWINGS

FIG. 1 is a conceptual diagram illustrating an example of a method for determining the thickness of a flaky magnetic metal particle according to a first embodiment.

FIG. 9 is a schematic diagram illustrating a disposition example of the flaky magnetic metal particles in faces parallel to the respective cross-sections according to the third embodiment.

FIG. 13 is a microscopic (SEM) photograph of a predetermined cross-section of the pressed powder material according to the third embodiment.

FIG. 16 is a conceptual diagram of a motor system according to a fourth embodiment.

DETAILED DESCRIPTION

Figure 2A:
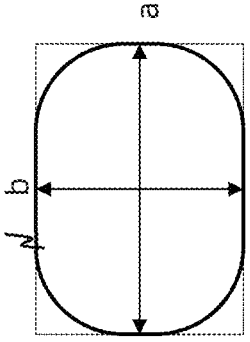
FIGS. 2A to 2C are conceptual diagrams for describing a method for determining the maximum length and the minimum length in a flat surface of a flaky magnetic metal particle according to the first embodiment.

In the following description, embodiments will be described using the attached drawings. In the diagrams, an identical or similar reference numeral will be assigned to identical or similar sites.

First Embodiment

A plurality of flaky magnetic metal particles of the present embodiment is a plurality of flaky magnetic metal particles, each flaky magnetic metal particle including: a flat surface; and a magnetic metal phase containing iron (Fe), cobalt (Co), and silicon (Si), the magnetic metal phase containing Co in an amount of from 0.001 at % to 80 at % with respect to the total amount of Fe and Co and containing Si in an amount of from 0.001 at % to 30 at % with respect to the total amount of the magnetic metal phase, in which the average thickness of the flaky magnetic metal particles is from 10 nm to 100 μm, the average value of the ratio of the average length in the flat surface to the thickness is from 5 to 10,000, and the flaky magnetic metal particles have the difference in coercivity on the basis of direction within the flat surface.

Furthermore, a plurality of flaky magnetic metal particles of the present embodiment is a plurality of flaky magnetic metal particles, each flaky magnetic metal particle having a flat surface; and a magnetic metal phase formed from at least one first element selected from the group consisting of Fe, Co, and Ni, and additive elements, in which the additive elements include B and Hf, the additive elements are included in a total amount of from 0.002 at % to 80 at % with respect to the total amount of the magnetic metal phase, the average thickness of the flaky magnetic metal particles is from 10 nm to 100 μm, the average value of the ratio of the average length in the flat surface to the thickness is from 5 to 10,000, and the flaky magnetic metal particles have the difference in coercivity on the basis of direction within the flat surface.

Flaky magnetic metal particles are flaky particles (or flattened particles) having a flaky shape (or a flattened shape).

A thickness means an average thickness of a single flaky magnetic metal particle. Regarding the method for determining the thickness, the method is not limited as long as it is a method capable of determining the average thickness in one flaky magnetic metal particle. For example, a method of observing a cross-section that is perpendicular to a flat surface of a flaky magnetic metal particle by transmission electron microscopy (TEM), scanning electron microscopy (SEM), optical microscopy, or the like, selecting any arbitrary ten or more sites in the in-plane direction of the flat surface in a cross-section of the flaky magnetic metal particle thus observed, measuring the thicknesses at the various selected sites, and employing the average value of the thicknesses, may be used. Furthermore, a method of selecting ten or more sites in the observed cross-section of the flaky magnetic metal particle from an end toward the other end at an equal interval in an in-plane direction within the flat surface (at this time, since the end and the other end are special places, it is preferable not to select the end parts), measuring the thickness at each of the sites thus selected, and employing the average value of the thicknesses, may also be used. FIG. 1 is a conceptual diagram illustrating an example of a method for determining the thickness of a flaky magnetic metal particle according to the first embodiment. In FIG. 1, the method for determining the thickness in this case is specifically illustrated. All of the methods are preferable because when measurement is made at sites as many as possible, average information can be obtained. Meanwhile, in a case in which the contour lines of the cross-section has intense irregularities, or the surface has a rough contour line, and it is difficult to determine the average thickness in an intact state, it is preferable that the contour line is smoothened into an average straight line or curve appropriately according to the circumstance, and then the above-described method is carried out.

Furthermore, the average thickness refers to the average value of the thickness of a plurality of flaky magnetic metal particles, and the average thickness is distinguished from the simple "thickness" described above. When the average thickness is to be determined, it is preferable to employ an average value calculated for twenty or more flaky magnetic metal particles. Furthermore, it is preferable to determine the average thickness for as many flaky magnetic metal particles as possible as the objects of measurement, because average information can be obtained. Furthermore, in a case in which an observation of twenty or more flaky magnetic metal particles cannot be made, it is preferable that an observation of as many flaky magnetic metal particles as possible is made, and an average value calculated for those particles is employed. The average thickness of the flaky magnetic metal particles is preferably from 10 nm to 100 µm, more preferably from 10 nm to 1 µm, and even more preferably from 10 nm to 100 nm. Furthermore, it is preferable that the flaky magnetic metal particles include particles having a thickness of from 10 nm to 100 µm, more preferably from 10 nm to 1 µm, and even more preferably from 10 nm to 100 nm. As a result, when a magnetic field is applied in a direction parallel to the flat surface, the eddy current loss can be made sufficiently small, which is preferable. Furthermore, a smaller thickness is preferred because the magnetic moment is confined in a direction parallel to the flat surface, and magnetization is likely to proceed by rotation magnetization. In a case in which magnetization proceeds by rotation magnetization, since magnetization is likely to proceed reversibly, coercivity is decreased, and the hysteresis loss can be reduced thereby, which is preferable.

Figure 2B:
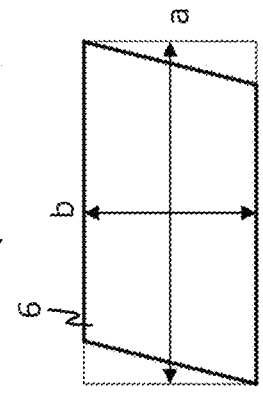
Figure 2C:
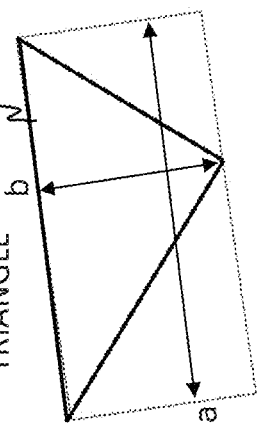

The average length of a flaky magnetic metal particle is defined by the formula: $(a+b)/2$, using the maximum length a and the minimum length b in the flat surface. The maximum length a and the minimum length b can be determined as follows. For example, among rectangles that circumscribe the flat surface, a rectangle having the smallest area is considered. Then, the length of the long side of the rectangle is designated as maximum length a, and the length of the short side is designated as minimum length b. FIGS. 2A to 2C are conceptual diagrams for describing a method for determining the maximum length and the minimum length in the flat surface of a flaky magnetic metal particle according to the first embodiment. FIGS. 2A to 2C are schematic diagrams illustrating the maximum length a and the minimum length b determined by the above-described method by taking several flaky magnetic metal particles as examples. The maximum length a and the minimum length b can be determined, similarly to the case of the average thickness, by observing the flaky magnetic metal particles by TEM, SEM, optical microscopy, or the like. Furthermore, it is also possible to determine the maximum length a and the minimum length b by performing an image analysis of microscopic photographs with a computer. For all of them, it is preferable to determine the maximum length and the minimum length for twenty or more flaky magnetic metal particles as the objects of measurement. Furthermore, it is preferable to determine the maximum length and the minimum length for as many flaky magnetic metal particles as possible as the objects of measurement, because average information can be obtained. Furthermore, in a case in which it is not possible to observe twenty or more flaky magnetic metal particles, it is preferable that an observation of as many flaky magnetic metal particles as possible is made, and average values obtained for those metal particles are employed. Furthermore, in this case, since it is preferable to determine the maximum length and the minimum length as average values as far as possible, it is preferable to perform an observation or an image analysis in a state in which the flaky magnetic metal particles are uniformly dispersed (in a state in which a plurality of flaky magnetic metal particles having different maximum lengths and minimum lengths is dispersed in a manner as random as possible). For example, it is preferable that an observation or an image analysis is carried out by sufficiently stirring a plurality of flaky magnetic metal particles and adhering the flaky magnetic metal particles onto a tape in that stirred state, or by dropping a plurality of flaky magnetic metal particles from above to fall down and adhering the particles onto a tape.

Figure 3:
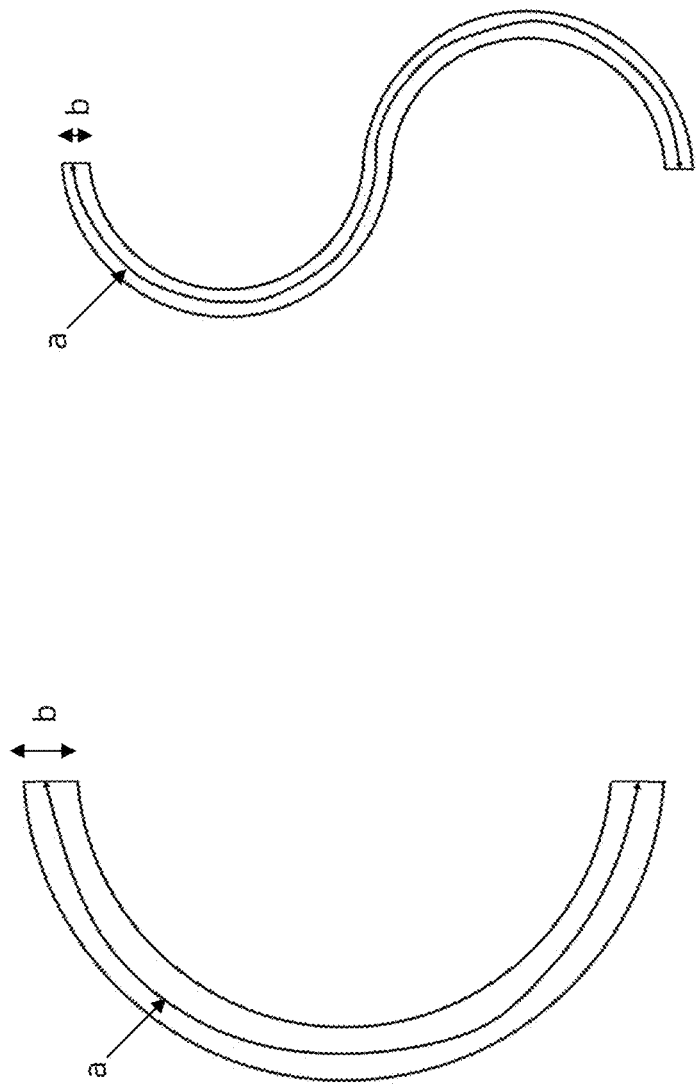
FIG. 3 is a conceptual diagram for describing another example of the method for determining the maximum length and the minimum length in a flat surface of a flaky magnetic metal particle according to the first embodiment.

However, depending on the flaky magnetic metal particles, there are occasions in which when the maximum length a and the minimum length b are determined by the method described above, the method may become a determination method that does not have any regard to the essence. FIG. 3 is a conceptual diagram for describing another example of the method for determining the maximum length and the minimum length in a flat surface of a flaky magnetic metal particle according to the first embodiment. For example, in a case similar to FIG. 3, the flaky magnetic metal particles are in a state of being elongatedly curved state; however, in this case, the maximum length and the minimum length of the flaky magnetic metal particles are essentially the lengths of a and b illustrated in FIGS. 2A to 2C. As such, the method for determining the maximum length a and the minimum length b cannot be decided completely uniformly, and basically, there is no problem with a method of "considering a rectangle having the smallest area among the rectangles circumscribing the flat surface, and designating the length of the long side of the rectangle as the maximum length a and the length of the short side as the minimum length b". However, depending on the shape of the particles, in a case in which the essence is disregarded in this method, the maximum length a and the minimum length b are determined as the maximum length a and the minimum length b, for which the essence is considered, according to the circumstances. The thickness t is defined as the length in a direction perpendicular to the flat surface. The ratio A of the average length within the flat surface with respect to the thickness is defined by the formula: $A=((a+b)/2)/t$, using the maximum length a, minimum length b, and thickness t.

The average value of the ratio of the average length in the flat surface to the thickness of the flaky magnetic metal particles is preferably from 5 to 10,000. This is because the magnetic permeability increases according to the ratio. Furthermore, it is because since the ferromagnetic resonance frequency can be increased, the ferromagnetic resonance loss can be reduced.

Regarding the ratio of the average length in the flat surface with respect to the thickness, an average value is employed. Preferably, it is preferable to employ an average value calculated for twenty or more flaky magnetic metal particles. It is also preferable to determine the average value by taking as many flaky magnetic metal particles as possible as the objects of measurement, because average information can be obtained. In a case in which an observation of twenty or more flaky magnetic metal particles cannot be made, it is preferable that an observation is made for as many flaky magnetic metal particles as possible, and an average value calculated for those particles is employed. In addition, for example, in a case in which there are particle Pa, particle Pb, and particle Pc, and the thicknesses of the particles are referred to as Ta, Tb, and Tc, respectively, while the average lengths in the flat surface are referred to as La, Lb, and Lc, respectively, the average thickness is calculated by the formula: $(Ta+Tb+Tc)/3$, and the average value of the ratio of the average length in the flat surface with respect to the thickness is calculated by the formula: $(La/Ta+Lb/Tb+Lc/Tc)/3$.

It is preferable that the flaky magnetic metal particles have the difference in coercivity on the basis of direction within the flat surface. It is more preferable as the proportion of the difference in coercivity on the basis of direction is larger, and it is preferable that the proportion is 1% or more.

More preferably, the proportion of the difference in coercivity is 10% or more; even more preferably, the proportion of the difference in coercivity is 50% or more; and still more preferably, the proportion of the difference in coercivity is 100% or more. The proportion of the difference in coercivity as used herein is defined by the formula: (Hc(max)−Hc(min))/Hc(min)×100(%), using the maximum coercivity Hc(max) and the minimum coercivity Hc(min) within the flat surface. Meanwhile, the coercivity can be evaluated using a vibrating sample magnetometer (VSM) or the like. In the case of having low coercivity, even a coercivity of 0.1 Oe or less can be measured by using a low magnetic field unit. In regard to the direction of the magnetic field to be measured, measurement is made by varying the direction within the flat surface.

Figure 4:
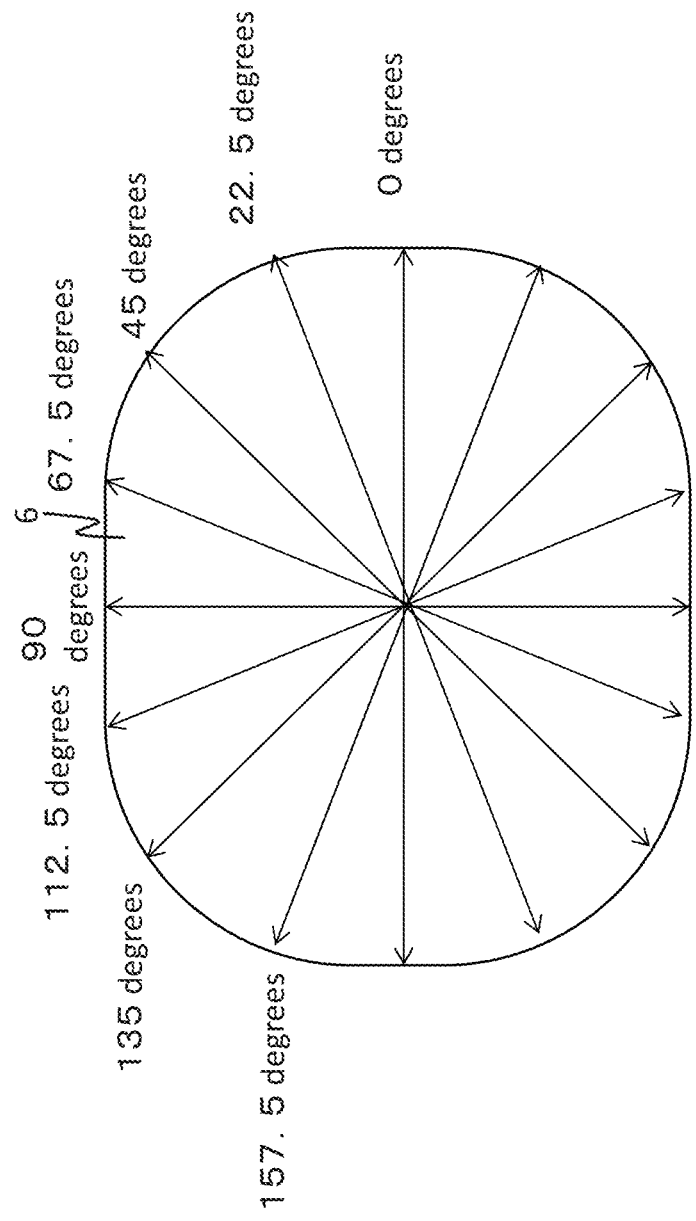
FIG. 4 is a schematic diagram illustrating the directions used when the coercivity was measured by varying the direction at an interval of 22.5° over an angle range of 360° in a flat surface of a flaky magnetic metal particle according to the first embodiment.

Meanwhile, the phrase "having the difference in coercivity" implies that when a magnetic field is applied in the direction of 360° in the flat surface and the coercivity is measured, there exist a direction in which maximum coercivity is obtained, and a direction in which minimum coercivity is obtained. For example, when the coercivity is measured by varying the direction at an interval of 22.5° over an angle range of 360° in the flat surface, in a case in which the difference in coercivity is exhibited, that is, there are an angle at which the coercivity becomes larger and an angle at which the coercivity becomes smaller, the concept of "having the difference in coercivity" applies. FIG. 4 is a schematic diagram illustrating the directions used when the coercivity is measured by varying the direction at an interval of 22.5° over an angle range of 360° in the flat surface of a flaky magnetic metal particle according to the first embodiment. By having the difference in coercivity within the flat surface, the minimum coercivity value becomes smaller compared to the case of isotropy with almost no difference in coercivity, which is preferable. In regard to a material having magnetic anisotropy within the flat surface, there is the difference in coercivity on the basis of direction within the flat surface, and the minimum coercivity value becomes small compared to a magnetically isotropic material. As a result, the hysteresis loss is reduced, and the magnetic permeability is increased, which is preferable.

Coercivity may be discussed using the approximation formula: $Hc=\alpha Ha-NMs$ (Hc: coercivity, Ha: magnetocrystalline anisotropy, Ms: saturation magnetization, $\alpha$, N: values that vary depending on the composition, texture, shape, or the like) in connection with magnetocrystalline anisotropy. That is, generally, there is a tendency that when the magnetocrystalline anisotropy increases, coercivity is likely to increase, whereas when the magnetocrystalline anisotropy decreases, coercivity is likely to decrease. However, the $\alpha$ value and the N value in the approximation formula are values that vary significantly depending on the composition, texture, or shape of the material, and even if the magnetocrystalline anisotropy is high, the coercivity may have a relatively small value (in a case in which the $\alpha$ value is small or the N value is large), or even if the magnetocrystalline anisotropy is small (in a case in which the $\alpha$ value is large or the N value is small), the coercivity may have a relatively large value. That is, magnetocrystalline anisotropy is a characteristic intrinsic to a substance, which is defined by the composition of the material; however, coercivity is a characteristic that is not defined only by the composition of the material but can greatly vary depending on the texture, shape, or the like. Furthermore, the magnetocrystalline anisotropy is not a factor that directly affects the hysteresis loss but is a factor that indirectly affects the hysteresis loss; however, coercivity is a factor that directly affects the loop area of a direct current magnetization curve (this area corresponds to the magnitude of the hysteresis loss). Therefore, coercivity is a factor that almost directly determines the magnitude of the hysteresis loss. That is, it can be said that unlike the magnetocrystalline anisotropy, coercivity is a very important factor that affects the hysteresis loss directly and significantly.

Furthermore, even when a flaky magnetic metal particle has magnetic anisotropy including magnetocrystalline anisotropy, it cannot be necessarily said that the difference in coercivity is exhibited depending on the direction of the flat surface of the flaky magnetic metal particle. As described above, it is because coercivity is not a value that is decided uniformly by the magnetocrystalline anisotropy but is a characteristic that varies anyhow depending on the composition, texture, or shape of the material. Also, as described above, the factor that affects the hysteresis loss directly and significantly is not the magnetic anisotropy but is rather coercivity. Thus, a condition that is highly preferable toward characteristics improvement is "having the difference in coercivity on the basis of direction within the flat surface". Thereby, the hysteresis loss is reduced, and the magnetic permeability is also increased, which is preferable.

The ratio a/b of the maximum length a with respect to the minimum length b in the flat surface is preferably 2 or greater on the average, more preferably 3 or greater, even more preferably 5 or greater, and still more preferably 10 or greater. It is preferable that the ratios a/b of the maximum length a with respect to the minimum length b in the flat surface include a ratio value of 2 or greater, more preferably a ratio value of 3 or greater, even more preferably a ratio value of 5 or greater, and still more preferably a ratio value of 10 or greater. Thereby, magnetic anisotropy can be induced easily, which is desirable. When magnetic anisotropy is induced, the difference in coercivity emerges within the flat surface, and the minimum coercivity value becomes smaller compared to magnetically isotropic materials. Thereby, the hysteresis loss is reduced, and the magnetic permeability is enhanced, which is preferable. More preferably, in regard to the flaky magnetic metal particles, it is desirable that either or both of a plurality of concavities and a plurality of convexities described below have their first directions arranged in the maximum length direction. In a case in which the flaky magnetic metal particles are powder-compacted, since the ratio of a to b of the flaky magnetic metal particles is large, the area (or area proportion) in which the flat surfaces of individual flaky magnetic metal particles overlap with one another becomes large, and the strength of the pressed powder body increases, which is preferable. Furthermore, when the ratio of the maximum length to the minimum length is larger, the magnetic moment is confined in a direction parallel to the flat surface, and magnetization is likely to proceed by rotation magnetization, which is preferable. In a case in which magnetization proceeds by rotation magnetization, since magnetization is likely to proceed reversibly, coercivity becomes small, and the hysteresis loss can be reduced thereby, which is preferable. On the other hand, from the viewpoint of improving the strength, it is preferable that the ratio a/b of the maximum length a to the minimum length b in the flat surface is, on the average, 1 or higher and lower than 2, and more preferably, 1 or higher and lower than 1.5. Thereby, fluidity or the packing property of the particles is enhanced, which is desirable. Furthermore, the strength in a direction perpendicular to the flat surface is increased compared to the case of having a large value of the ratio of a to b, and it is preferable from the viewpoint of improving the strength of the flaky magnetic metal particles. Furthermore, when the particles are powder-compacted, there is less chance that the particles are powder-compacted in a bent state, and the stress to the particles is likely to be reduced. That is, strain is reduced, and this leads to reduction of the coercivity and the hysteresis loss. Also, since stress is reduced, thermal stability and mechanical characteristics such as strength and toughness are likely to be enhanced.

Furthermore, a particle having a corner in at least a portion of the contour shape of the flat surface is preferably used. For example, a contour shape such as a square or a rectangle, in other words, a contour shape having an angle of a corner of approximately 90°, is desirable. As a result, symmetry of the atomic arrangement is decreased at the corner parts, the electron orbits are confined, and therefore, magnetic anisotropy can be easily induced to the flat surface, which is desirable.

On the other hand, from the viewpoint of loss reduction or strength improvement, it is desirable that the contour shape of the flat surface is formed by a roundish curve. In an extreme example, it is desirable to employ a round contour shape such as a circle or an ellipse. As a result, abrasion resistance of the particles is enhanced, which is desirable. Furthermore, stress is not likely to be concentrated around the contour shape, the magnetic strain of the flaky magnetic metal particle is reduced, coercivity is decreased, and the hysteresis loss is reduced, which is desirable. Since stress concentration is reduced, thermal stability and mechanical characteristics such as strength and toughness are also likely to be enhanced, which is desirable.

It is desirable that the flaky magnetic metal particles have a magnetic metal phase containing Fe, Co, and Si. Hereinafter, this case will be described in detail. In the magnetic metal phase, the amount of Co is preferably from 0.001 at % to 80 at % with respect to the total amount of Fe and Co, and more preferably, the amount of Co is preferably from 1 at % to 60 at %, more preferably from 5 at % to 40 at %, and even more preferably from 10 at % to 20 at %. Thereby, appropriately high magnetic anisotropy is likely to be induced, and the above-described magnetic characteristics are enhanced, which is therefore preferable. Furthermore, an Fe—Co system is preferred because high saturation magnetization can be easily realized. Furthermore, when the composition range of Fe and Co is included in the above-described range, higher saturation magnetization can be realized, which is preferable. Furthermore, the amount of Si is preferably from 0.001 at % to 30 at % with respect to the total amount of the magnetic metal phase, and more preferably, the amount of Si is preferably from 1 at % to 25 at %, and more preferably from 5 at % to 20 at %. Thereby, the magnetocrystalline anisotropy acquires an appropriate magnitude, coercivity is likely to be reduced, and low hysteresis loss and high magnetic permeability can be easily realized, which is preferable.

Meanwhile, in a case in which the magnetic metal phase is a system containing Fe, Co, and Si, and the amount of Co and the amount of Si are respectively included in the above-described ranges, a particularly significant effect about the induced magnetic anisotropy as described above is exhibited. As compared to a monatomic system of Fe or Co only, or a diatomic system composed of Fe and Si only, or of Fe and Co only, in a triatomic system of Fe, Co, and Si, particularly, appropriately high magnetic anisotropy is likely to be induced, coercivity is decreased, and thereby the hysteresis loss is reduced, while the magnetic permeability is enhanced, which is preferable. This significant effect is brought about particularly only when the composition is included in the above-described composition range. Furthermore, when the composition of the triatomic system of Fe, Co, and Si is within the composition range described above, thermal stability and oxidation resistance are also noticeably enhanced, which is preferable. Furthermore, since thermal stability and oxidation resistance are enhanced, mechanical characteristics at high temperature are also enhanced, and it is preferable. Furthermore, also with regard to mechanical characteristics at room temperature, mechanical characteristics such as strength, hardness, and abrasion resistance are enhanced, and it is preferable. When the flaky magnetic metal particles are synthesized, in a case in which flaky magnetic metal particles are obtained by synthesizing a ribbon by a roll quenching method or the like and pulverizing this ribbon, the flaky magnetic metal particles can be particularly easily pulverized in a case in which the magnetic metal phase is a triatomic system of Fe, Co, and Si, and the amount of Co and the amount of Si are respectively included in the above-described ranges, and thereby, a state in which it is relatively difficult for the flaky magnetic metal particles to be distorted can be realized, which is preferable. When the flaky magnetic metal particles are not easily distorted, coercivity is likely to be reduced, and low hysteresis loss and high magnetic permeability are easily realized, which is preferable. Furthermore, when distortion is reduced, stability over time is increased, thermal stability is increased, and mechanical characteristics such as strength, hardness, and abrasion resistance are excellent. Therefore, it is preferable.

The average crystal grain size of the magnetic metal phase is preferably 1 μm or more, more preferably 10 μm or more, even more preferably 50 μm or more, and still more preferably 100 μm or more. When the average crystalline grain size of the magnetic metal phase increases, the proportion of the surface of the magnetic metal phase is decreased, and therefore, the pinning sites are reduced. Thereby, coercivity is reduced, and the hysteresis loss is reduced, which is preferable. Furthermore, when the average crystalline grain size of the magnetic metal phase increases within the range described above, appropriately high magnetic anisotropy can be easily induced, and the above-described magnetic characteristics are enhanced, which is therefore preferable.

Particularly, in a case in which the magnetic metal phase is a system containing Fe, Co, and Si, and the amount of Co and the amount of Si are respectively included in the above-described ranges, and in a case in which the average crystal grain size of the magnetic metal phase is included in the above-described range, appropriately high magnetic anisotropy can be easily induced, the magnetic characteristics described above are noticeably enhanced, and thus it is more preferable. Above all, particularly, in a case in which the magnetic metal phase is a system containing Fe, Co, and Si; the amount of Co is from 5 at % to 40 at %, and more preferably from 10 at % to 20 at %, with respect to the total amount of Fe and Co; the amount of Si is from 1 at % to 25 at %, and more preferably from 5 at % to 20 at %, with respect to the total amount of the magnetic metal phase; and the average crystal grain size of the magnetic metal phase is 10 μm or more, more preferably 50 μm or more, and even more preferably 100 μm or more, appropriately high magnetic anisotropy can be easily induced, and the above-described magnetic characteristics are particularly noticeably enhanced. Thus, it is more preferable.

It is also preferable that the magnetic metal phase has a portion having a crystal structure of the body-centered cubic structure (bcc). Thereby, appropriately high magnetic anisotropy can be easily induced, and the above-mentioned magnetic characteristics are enhanced, which is therefore preferable. Also with a "crystal structure of a mixed phase of bcc and face-centered cubic (fcc)", which partially has the fcc crystal structure, appropriately high magnetic anisotropy can be easily induced, and the above-mentioned magnetic characteristics are enhanced, which is therefore preferable.

It is preferable that the flat surfaces of the flaky magnetic metal particles are crystallographically approximately oriented. The direction of orientation is preferably the (110) plane orientation. Thereby, appropriately high magnetic anisotropy can be easily induced, and the above-described magnetic characteristics are enhanced. Therefore, it is preferable. A more preferred direction of orientation is the (110)[111] direction. Thereby, appropriately high magnetic anisotropy can be easily induced, and the above-described magnetic characteristics are enhanced, which is therefore preferable. The crystal planes of the flat surface of the flaky magnetic metal particles are such that the peak intensity ratio of a crystal plane other than the (110)(220) plane (for example, (200), (211), (310), or (222)) with respect to (110) as measured by X-ray diffractometry (XRD) is preferably 10% or less, more preferably 5% or less, and even more preferably 3% or less. Thereby, appropriately high magnetic anisotropy can be easily induced, and the above-described magnetic characteristics are enhanced, which is therefore preferable.

In order to have the flat surfaces of the flaky magnetic metal particles (110)-oriented, it is effective to select adequate heat treatment conditions. It is preferable to set the heat treatment temperature to be from 800° C. to 1,200° C., more preferably from 850° C. to 1,100° C., even more preferably from 900° C. to 1,000° C., and still more preferably from 920° C. to 980° C. (near 940° C. is preferred). When the heat treatment temperature is too low or too high, the (110) orientation will not proceed readily, and a heat treatment temperature in the above-described range is most preferred. Furthermore, the heat treatment time is preferably 10 minutes or longer, more preferably 1 hour or longer, and even more preferably about 4 hours. When the heat treatment time is too short or too long, the (110) orientation will not proceed readily, and a heat treatment time of about 4 hours is most preferred. The heat treatment atmosphere is desirably a vacuum atmosphere with a low oxygen concentration, an inert atmosphere, or a reducing atmosphere, and more desirably a reducing atmosphere of $H_2$ (hydrogen), CO (carbon monoxide), $CH_4$ (methane), or the like. Thereby, oxidation of the flaky magnetic metal particles is suppressed, and oxidized parts can be reduced, which is therefore preferable. When the heat treatment conditions described above are selected, the (110) orientation can proceed readily, and the peak intensity ratio of a crystal plane other than the (110)(220) plane (for example, (200), (211), (310), or (222)) with respect to the (110) plane as measured by X-ray diffractometry (XRD) can be 10% or less, more preferably 5% or less, and even more preferably 3% or less, for the first time. Furthermore, strain can also be appropriately removed, and a state in which oxidation is suppressed (brought to a reduced state) can also be realized, which is preferable.

Furthermore, it is preferable that the flaky magnetic metal particles have a magnetic metal phase containing at least one first element selected from the group consisting of Fe, Co, and Ni; and additive elements. Hereinafter, this case will be described in detail. It is more preferable that the additive elements include B and Hf. Furthermore, it is preferable that the additive elements are included in a total amount of from 0.002 at % to 80 at %, more preferably from 5 at % to 80 at %, even more preferably from 5 at % to 40 at %, and still more preferably from 10 at % to 40 at %, with respect to the total amount of the magnetic metal phase. Thereby, amorphization proceeds, magnetic anisotropy can be easily induced, and the above-described magnetic characteristics are enhanced. Therefore, it is preferable. Furthermore, it is preferable that Hf is included in an amount of from 0.001 at % to 40 at %, more preferably from 1 at % to 30 at %, even more preferably from 1 at % to 20 at %, still more preferably from 1 at % to 15 at %, and even more preferably from 1 at % to 10 at %, with respect to the total amount of the magnetic metal phase. Thereby, amorphization proceeds, magnetic anisotropy can be easily induced, and the above-described magnetic characteristics are enhanced. Therefore, it is preferable.

Meanwhile, in a case in which the magnetic metal phase is a system containing the first element; and B and Hf as the additive elements, and the total amount of the additive elements and the amount of Hf are respectively included in the ranges described above, a particularly significant effect about the induced magnetic anisotropy as described above is exhibited. This significant effect is brought about particularly only when the amounts are within the composition range described above. Furthermore, compared to systems of other additive elements, particularly in a system containing Hf, amorphization can proceed easily with a small amount, magnetic anisotropy is easily induced, and a balance with high saturation magnetization is easily realized, which is preferable. Furthermore, Hf has a high melting point, and when Hf is included in the magnetic metal phase in the amount range described above, thermal stability and oxidation resistance are markedly enhanced, which is preferable. Furthermore, since thermal stability and oxidation resistance are enhanced, mechanical characteristics at high temperature are also enhanced, and thus it is preferable. In addition, also for mechanical characteristics at room temperature, mechanical characteristics such as strength, hardness, and abrasion resistance are enhanced, and it is preferable. Furthermore, at the time of synthesizing the flaky magnetic metal particles, when flaky magnetic metal particles are obtained by synthesizing a ribbon by a roll quenching method or the like and pulverizing this ribbon, in a case in which the magnetic metal phase is a system containing the first element; and B and Hf as the additive elements, and in a case in which the total amount of the additive elements and the amount of Hf are respectively included in the ranges described above, particularly, the flaky magnetic metal particles can be pulverized relatively easily, and thereby a state in which it is relatively difficult for the flaky magnetic metal particles to be distorted can be realized, which is preferable. When the flaky magnetic metal particles are not easily distorted, coercivity is likely to be reduced, and low hysteresis loss and high magnetic permeability are likely to be realized. Thus, it is preferable. Furthermore, when distortion occurs to a less extent, stability over time is increased, thermal stability is increased, or mechanical characteristics such as strength, hardness, or abrasion resistance are excellent. Therefore, it is preferable.

Furthermore, in a case in which the magnetic metal phase is a system containing the first element; and B and Hf as the additive elements, and the total amount of the additive elements and the amount of Hf are respectively included in the above-described ranges, since thermal stability is excellent, it is possible to set the heat treatment conditions that are optimal for the flaky magnetic metal particles to be high. That is, in the method for producing flaky magnetic metal particles, it is preferable that a ribbon is synthesized, a ribbon thus obtained is subjected (may not be subjected) to a heat treatment and pulverized, and then a heat treatment is carried out in order to remove strain (more preferably, a heat treatment in a magnetic field is preferred); however, it is possible to set the heat treatment temperature at this time relatively highly. Thereby, strain can be easily relieved, and a material having low losses and less strain is likely to be realized. For example, by performing a heat treatment at 500° C. or higher, a material having low losses can be easily realized (lowering of the losses can be realized at a heat treatment temperature higher than that for other systems or compositions. In other systems or compositions, for example, about 400° C. is the optimal heat treatment temperature).

It is preferable that the additive elements further include one or more "other different elements", in addition to B and Hf. Preferred examples of the "other different element" include C, Ta, W, P, N, Mg, Al, Si, Ca, Zr, Ti, Zn, Mn, Ba, Sr, Cr, Mo, Ag, Ga, Sc, V, Nb, Pb, Cu, In, Sn, and rare earth elements, and among these, rare earth elements are more preferred. Even more preferably, Y is preferred. As the "other different element" is included, diffusion of the elements included in the magnetic metal phase is effectively suppressed, amorphization proceeds, and magnetic anisotropy is easily induced. Thus, it is more preferable (low coercivity, low hysteresis loss, and high magnetic permeability can be easily realized, and it is preferable). Particularly, when the "other different element" has an atomic radius different from those of B and Hf, diffusion of the elements included in the magnetic metal phase is effectively suppressed. For example, since Y and the like have larger atomic radii than B and Hf, diffusion of the elements included in the magnetic metal phase can be very effectively suppressed. In the following description, a case in which the "other different element" is Y will be described as an example, and an appropriate composition range will be described. The amount of Y is preferably from 1 at % to 80 at %, more preferably from 2 at % to 60 at %, and even more preferably from 4 at % to 60 at %, with respect to the total amount of Hf and Y. Furthermore, it is preferable that Hf and Y are included in a total amount of from 0.002 at % to 40 at %, more preferably from 1 at % to 30 at %, even more preferably from 1 at % to 20 at %, still more preferably from 1 at % to 15 at %, and even more preferably from 1 at % to 10 at %, with respect to the total amount of the magnetic metal phase. Thereby, amorphization proceeds, magnetic anisotropy can be easily induced, and the above-mentioned magnetic characteristics are enhanced. Therefore, it is preferable. When the composition is within the composition range described above, compared to a case in which the additive elements are B and Hf only, a particularly significant effect about the induced magnetic anisotropy as described above is exhibited. This particularly significant effect is brought about only when the composition is within the above-described composition range in particular. Furthermore, amorphization can proceed easily with a small amount, magnetic anisotropy can be easily induced, and a balance with high saturation magnetization can be easily realized, which is preferable. When the composition is appropriately selected to be a system having Y incorporated therein, it is possible to realize, for the first time, characteristics that cannot be realized with a B-Hf system. Furthermore, thermal stability and oxidation resistance are markedly enhanced, and it is preferable. Since thermal stability and oxidation resistance are enhanced, mechanical characteristics at high temperature are also enhanced, which is preferable. In addition, also regarding the mechanical characteristics at room temperature, mechanical characteristics such as strength, hardness, and abrasion resistance are enhanced, and thus it is preferable.

Furthermore, the average crystal grain size of the magnetic metal phase is preferably 100 nm or less, more preferably 50 nm or less, even more preferably 20 nm or less, and still more preferably 10 nm or less. It is more preferable as the average crystal grain size is smaller, and the average crystal grain size is more preferably 5 nm or less, and even more preferably 2 nm or less. Thereby, anisotropy can be easily induced, and magnetic characteristics are enhanced. Therefore, it is preferable. Furthermore, since a smaller crystal grain size means that the substance is closer to amorphousness, electrical resistance is increased compared to highly crystalline substances, and thereby the eddy current loss is likely to be reduced, which is preferable. Also, it is preferable because corrosion resistance and oxidation resistance are excellent compared to highly crystalline substances.

Meanwhile, in a case in which the additive elements further include one or more "other different elements (for example, Y)" in addition to B and Hf, and the amount of the "other different elements (for example, Y)" and the total amount of Hf and the "other different elements (for example, Y)" are within the ranges described above, an average crystal grain size of 30 nm or less can be realized relatively easily, and therefore, it is preferable. That is, since the state is closer to amorphousness, electrical resistance becomes high compared to highly crystalline substances, and thereby the eddy current loss is likely to be reduced, which is preferable. Furthermore, it is preferable because corrosion resistance and oxidation resistance are excellent compared to highly crystalline substances. Furthermore, it is preferable because anisotropy can be easily induced, and the magnetic characteristics described above are enhanced.

Particularly, in a case in which the magnetic metal phase is a system containing the first element; and B and Hf as the additive elements, and the total amount of the additive elements and the amount of Hf are respectively within the ranges described above, and in a case in which the average crystal grain size of the magnetic metal phase is in the above-described range, the effects of enhancement of magnetic characteristics based on induced magnetic anisotropy, increase in the electrical resistance caused by amorphization (reduction of eddy current loss), high corrosion resistance, and high oxidation resistance are markedly enhanced, and thus it is more preferable. Above all, particularly, in a case in which the magnetic metal phase is a system including the first element; and B and Hf as the additive elements, the total amount of the additive elements is from 5 at % to 40 at %, and more preferably from 10 at % to 40 at %, with respect to the total amount of the magnetic metal phase, the amount of Hf is from 1 at % to 20 at %, more preferably from 1 at % to 15 at %, and even more preferably from 1 at % to 10 at %, with respect to the total amount of the magnetic metal phase, and the average crystal grain size of the magnetic metal phase is 50 nm or less, more preferably 20 nm or less, and even more preferably 10 nm or less, the effects of enhancement of the magnetic characteristics based on induced magnetic anisotropy, increase in the electrical resistance caused by amorphization (reduction of eddy current loss), high corrosion resistance, and high oxidation resistance are particularly noticeably enhanced, and thus it is more preferable.

Meanwhile, a crystal grain size of 100 nm or less can be calculated simply by Scherrer's formula based on XRD measurement, and the crystal grain size can also be determined by making an observation of a large number of magnetic metal phases by transmission electron microscope (TEM) observation and averaging the particle sizes of the magnetic metal phases. In a case in which the crystal grain size is small, it is preferable to determine the crystal grain size by XRD measurement, and in a case in which the crystal grain size is large, it is preferable to determine the crystal grain size by TEM observation. However, it is preferable to select the measurement method according to the circumstances, or to use the two methods in combination and determine the crystal grain size in a comprehensive manner.

It is preferable that the flaky magnetic metal particles have high saturation magnetization, and the saturation magnetization is preferably 1 T or greater, more preferably 1.5 T or greater, even more preferably 1.8 T or greater, and still more preferably 2.0 T or greater. Thereby, magnetic saturation is suppressed, and magnetic characteristics can be exhibited sufficiently in the system, which is preferable. However, depending on the use application (for example, magnetic wedges of a motor), the flaky magnetic metal particles can be used sufficiently even in a case in which the saturation magnetization is relatively low, and it may be rather preferable that the flaky magnetic metal particles are specialized for low losses. Meanwhile, the magnetic wedges of a motor are lid-like objects for the slot parts into which coils are inserted. Usually, non-magnetic wedges are used; however, when magnetic wedges are employed, the sparseness or denseness of the magnetic flux density is moderated, the harmonic loss is reduced, and the motor efficiency is increased. At this time, it is preferable that saturation magnetization of the magnetic wedges is higher; however, even with relatively low saturation magnetization, sufficient effects are exhibited. Therefore, it is important to select the composition depending on the use application.

The lattice strain of the flaky magnetic metal particles is preferably from 0.01% to 10%, more preferably from 0.01% to 5%, even more preferably from 0.01% to 1%, and still more preferably from 0.01% to 0.5%. Thereby, appropriately high magnetic anisotropy can be easily induced, and the magnetic characteristics described above are enhanced, which is therefore preferable.

Meanwhile, the lattice strain can be calculated by analyzing in detail the line widths obtainable by X-ray diffraction (XRD). That is, by drawing a Halder-Wagner plot or a Hall-Williamson plot, the extent of contribution made by expansion of the line width can be separated into the crystal grain size and the lattice strain. The lattice strain can be calculated thereby. A Halder-Wagner plot is preferable from the viewpoint of reliability. In regard to the Halder-Wagner plot, for example, N. C. Halder, C. N. J. Wagner, Acta Cryst., 20 (1966), 312-313 may be referred to. Here, a Halder-Wagner plot is represented by the following expression:

$$(\beta: 積分幅, K: 定数, \lambda: 波長, D: 結晶粒径) \quad [\text{Math. 1}]$$

$$\sqrt{\varepsilon^2}: 格子歪み\ (\cdots 乗平均平方根))$$

$$\frac{\beta^2}{\tan^2\theta} = \frac{K\lambda}{D}\frac{\beta}{\tan\theta\sin\theta} + 16\varepsilon^2, \quad \varepsilon = \varepsilon_{max} = \frac{\sqrt{2\pi}}{2}\sqrt{\varepsilon^2}$$

($\beta$: integrated width, K: constant, $\lambda$: wavelength, D: crystal grain size, $\sqrt{\varepsilon^2}$: lattice strain (root-mean-square))

That is, $\beta^2/\tan^2\theta$ is plotted on the vertical axis, and $\beta/\tan\theta\sin\theta$ is plotted on the horizontal axis. The crystal grain size D is calculated from the gradient of the approximation straight line of the plot, and the lattice strain $\varepsilon$ is calculated from the ordinate intercept. When the lattice strain obtained by a Halder-Wagner plot of the expression described above (lattice strain (root-mean-square)) is from 0.01% to 10%, more preferably from 0.01% to 5%, even more preferably from 0.01% to 1%, and still more preferably from 0.01% to 0.5%, appropriately high magnetic anisotropy can be easily induced, and the magnetic characteristics described above are enhanced, which is therefore preferable.

The lattice strain analysis described above is a technique that is effective in a case in which a plurality of peaks can be detected by XRD; however, on the other hand, in a case in which the peak intensities in XRD are weak, and there are few peaks that can be detected (for example, when only one peak is detected), it is difficult to perform an analysis. In such a case, it is preferable to calculate the lattice strain by the following procedure. First, the composition is determined by high-frequency inductively coupled plasma (ICP) emission spectroscopy, energy dispersive X-ray spectroscopy (EDX), or the like, and the composition ratio of three magnetic metal elements, namely, Fe, Co and Ni, is calculated (in a case in which there are only two magnetic metal elements, the composition ratio of two elements; in a case in which there is only one magnetic metal element, the composition ratio of one element (=100%)). Next, an ideal lattice spacing do is calculated from the composition of Fe—Co—Ni (refer to the values published in the literature, or the like. In some cases, an alloy having the composition is produced, and the lattice spacing is calculated by making a measurement). Subsequently, the amount of strain can be determined by determining the difference between the lattice spacing d of the peaks of an analyzed sample and the ideal lattice spacing do. That is, in this case, the amount of strain is calculated by the expression: $(d-d_0)/d_0 \times 100(\%)$. Thus, in regard to the analysis of the lattice strain, it is preferable to use the two above-described techniques appropriately depending on the state of peak intensity, and depending on cases, it is preferable to evaluate the lattice strain by using the two techniques in combination.

The lattice spacing in the flat surface varies depending on the direction, and the proportion of the difference between the maximum lattice spacing $d_{max}$ and the minimum lattice spacing $d_{min}$ ($=(d_{max}-d_{min})/d_{min}\times100(\%)$) is preferably from 0.01% to 10%, more preferably from 0.01% to 5%, even more preferably from 0.01% to 1%, and still more preferably from 0.01% to 0.5%. Thereby, appropriately high magnetic anisotropy can be easily induced, and the magnetic characteristics described above are enhanced, which is therefore preferable. Furthermore, the lattice spacing can be conveniently determined by an XRD measurement. When this XRD measurement is carried out while the direction is varied within a plane, the differences in the lattice constant depending on the direction can be determined.

In regard to crystallites of the flaky magnetic metal particles, it is preferable that either the crystallites are unidirectionally linked in a row within the flat surface, or the crystallites are rod-shaped and are unidirectionally oriented in the flat surface. Thereby, appropriately high magnetic anisotropy can be easily induced, and the magnetic characteristics described above are enhanced, which is therefore preferable.

It is preferable that the flat surface of a flaky magnetic metal particle has either or both of a plurality of concavities and a plurality of convexities, the concavities and the convexities being arranged in a first direction and each of the concavities and the convexities having a width of 0.1 μm or more, a length of 1 μm or more, and an aspect ratio of 2 or higher. Thereby, magnetic anisotropy is easily induced in the first direction, and the difference in coercivity on the basis of direction within the flat surface is increased, which is preferable. From this point of view, it is more preferable that the width is 1 μm or more and the length is 10 μm or more. The aspect ratio is preferably 5 or higher, and more preferably 10 or higher. Furthermore, by including such concavities or convexities, the adhesiveness between the flaky magnetic metal particles is enhanced at the time of synthesizing a pressed powder material by powder-compacting the flaky magnetic metal particles (the concavities or convexities bring an anchoring effect of attaching the particles to neighboring particles), and thereby, thermal stability and mechanical characteristics such as strength and hardness are enhanced. Therefore, it is preferable.

Figure 5:
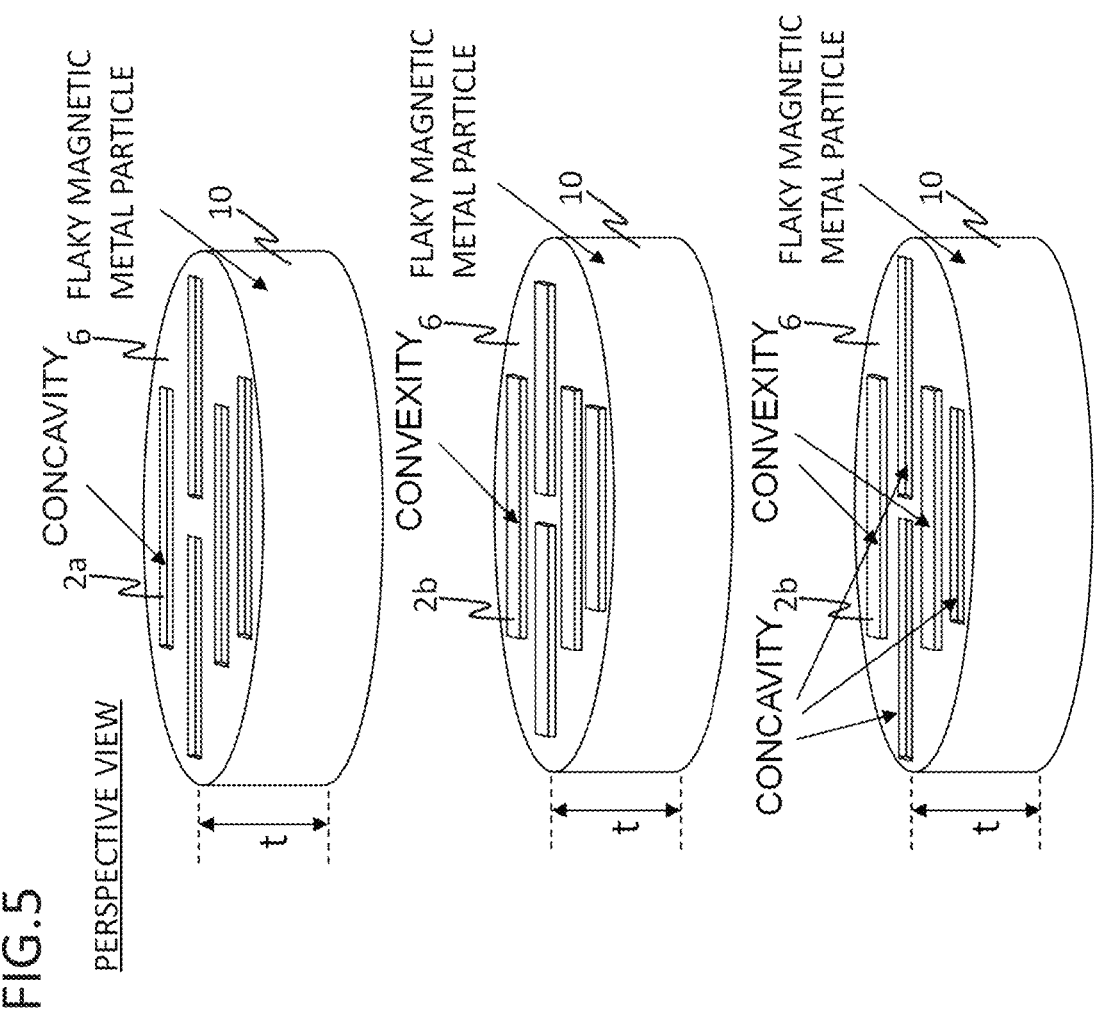
FIG. 5 is a schematic perspective view of the flaky magnetic metal particles according to the first embodiment.
Figure 6:
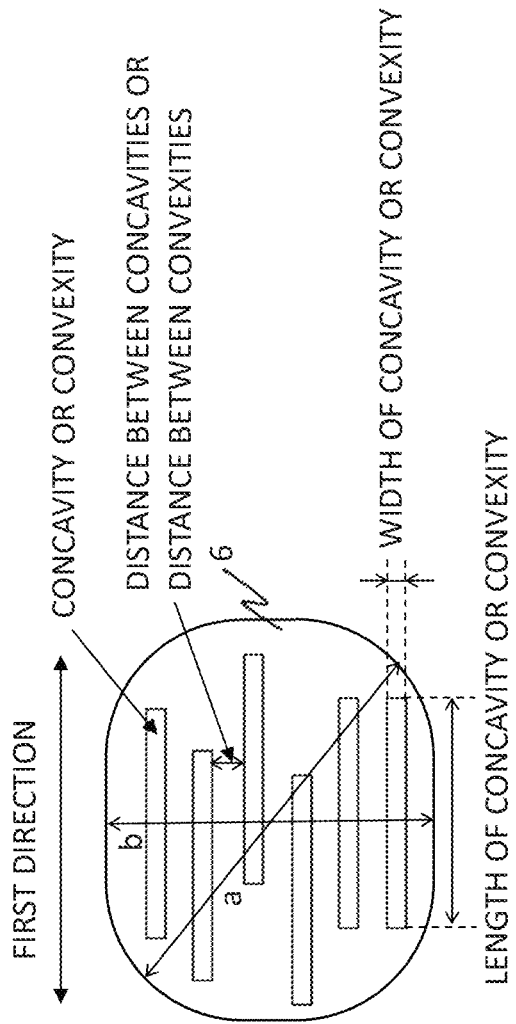
FIG. 6 is a schematic diagram of a flaky magnetic metal particle according to the first embodiment as viewed from above.

FIG. 5 is a schematic perspective view of the flaky magnetic metal particles according to the first embodiment. Meanwhile, in the upper diagram of FIG. 5, only concavities are provided, and in the middle diagram of FIG. 5, only convexities are provided; however, as illustrated in the lower diagram of FIG. 5, one flaky magnetic metal particle may have both concavities and convexities. FIG. 6 is a schematic diagram of a flaky magnetic metal particle according to the first embodiment as viewed from above. The width and length of the concavities or convexities, and the distance between concavities or convexities are illustrated. One flaky magnetic metal particle may have both concavities and convexities. The aspect ratio of a concavity or a convexity is the ratio of the length of the major axis to the length of the minor axis. That is, when the length side of a concavity or a convexity is larger (longer) than the width, the aspect ratio is defined as the ratio of length to width, and when the width is larger (longer) than the length, the aspect ratio is defined as the ratio of width to length. As the aspect ratio is higher, the flaky magnetic metal particle is more likely to have magnetic uniaxial anisotropy (anisotropy), which is more preferable. FIG. 6 illustrates concavities $2a$, convexities $2b$, flat surfaces 6, and flaky magnetic metal particles 10.

Furthermore, the phrase "(being) arranged in the first direction" implies that concavities or convexities are arranged such that the longer side between the length and the width of the concavities or the convexities is parallel to the first direction. Meanwhile, when concavities or convexities are arranged such that the longer side between the length and the width of the concavities or the convexities is within ±30° in a direction parallel to the first direction, it is said that the concavities or convexities are "arranged in the first direction". Thereby, the flaky magnetic metal particles are likely to exhibit magnetic uniaxial anisotropy in the first direction by a shape magnetic anisotropy effect, which is preferable. It is preferable that the flaky magnetic metal particles have a magnetic anisotropy in one direction within the flat surface, and this will be described in detail. First, in a case in which the magnetic domain structure of the flaky magnetic metal particles is a multi-domain structure, the magnetization process proceeds by domain wall displacement; however, in this case, the coercivity in the easy axis direction within the flat surface becomes lower than that in the hard axis direction, and losses (hysteresis loss) are decreased. Furthermore, magnetic permeability in the easy axis direction becomes higher than that in the hard axis direction. Furthermore, compared to the case of flaky magnetic metal particles that are isotropic, particularly the coercivity in the easy axis direction becomes lower in the case of flaky magnetic metal particles having magnetic anisotropy, and as a result, losses become smaller, which is preferable. Also, magnetic permeability becomes high, and it is preferable. That is, when the flaky magnetic metal particles have magnetic anisotropy in a direction in the flat surface, magnetic characteristics are enhanced as compared to an isotropic material. Particularly, magnetic characteristics are superior in the easy axis direction in the flat surface than in the hard axis direction, which is preferable. Next, in a case in which the magnetic domain structure of the flaky magnetic metal particles is a single domain structure, the magnetization process proceeds by rotation magnetization; however, in this case, the coercivity in the hard axis direction in the flat surface becomes lower than that in the easy axis direction, and losses become small. In a case in which magnetization proceeds completely by rotation magnetization, the coercivity becomes zero, and the hysteresis loss becomes zero, which is preferable. Meanwhile, whether magnetization will proceed by domain wall displacement (domain wall displacement type) or by rotation magnetization (rotation magnetization type) can be determined on the basis of whether the magnetic domain structure becomes a multi-domain structure or a single domain structure. At this time, whether the magnetic domain structure becomes a multi-domain structure or a single domain structure is determined on the basis of the size (thickness or aspect ratio) of the flaky magnetic metal particles, composition, the condition of the magnetic interaction between particles, and the like. For example, as the thickness t of the flaky magnetic metal particles is smaller, the magnetic domain structure is more likely to become a single domain structure, and when the thickness is from 10 nm to 1 μm, and particularly when the thickness is from 10 nm to 100 nm, the magnetic domain structure is likely to become a single domain structure. Regarding the composition, in a composition having high magnetocrystalline anisotropy, even if the thickness is large, it tends to be easy to maintain a single domain structure. In a composition having low magnetocrystalline anisotropy, if the thickness is not small, it tends to be difficult to maintain a single domain structure. That is, the thickness of the borderline between being a single domain structure or a multi-domain structure varies depending also on the composition. Furthermore, when the flaky magnetic metal particles magnetically interact with neighboring particles, and the magnetic domain structure is stabilized, the magnetic domain structure is likely to become a single domain structure. The determination of whether the magnetization behavior is of the domain wall displacement type or of the rotation magnetization type can be made simply as follows. First, within a plane of the material (a plane that is parallel to the flat surface of a flaky magnetic metal particle), magnetization is analyzed by varying the direction in which a magnetic field is applied, and two directions in which the difference in the magnetization curve becomes the largest (at this time, the two directions are directions tilted by 90° from each other) are found out. Next, a comparison is made between the curves of the two directions, and thereby it can be determined whether the magnetization behavior is of the domain wall displacement type or the rotation magnetization type.

As described above, it is preferable that the flaky magnetic metal particles have magnetic anisotropy in one direction within the flat surface; however, more preferably, when the flaky magnetic metal particles have either or both of a plurality of concavities and a plurality of convexities, the concavities or convexities being arranged in a first direction, and each of the concavities and the convexities having a width of 0.1 μm or more, a length of 1 μm or more, and an aspect ratio of 2 or higher, magnetic anisotropy is more easily induced in the first direction, which is more preferable. From this point of view, a width of 1 μm or more and a length of 10 µm or more are more preferred. The aspect ratio is preferably 5 or higher, and more preferably 10 or higher. By having such concavities or convexities provided on the flaky magnetic metal particles, the adhesiveness between the flaky magnetic metal particles is enhanced at the time of synthesizing a pressed powder material by powder-compacting the flaky magnetic metal particles (the concavities or convexities bring an anchoring effect of attaching the particles to neighboring particles). As a result, mechanical characteristics such as strength and hardness, and thermal stability are enhanced, and therefore, it is preferable.

In regard to the flaky magnetic metal particles, it is preferable that the largest portion of the first directions of either or both of a plurality of concavities and a plurality of convexities is arranged in the direction of the easy magnetization axis. That is, in a case in which there are a large number of directions of arrangement (=first directions) in the flat surface of a flaky magnetic metal particle, it is preferable that the direction of arrangement (=first direction) that accounts for the largest proportion in the large number of directions of arrangement (=first directions), coincides with the direction of the easy axis of the flaky magnetic metal particles. Since the length direction in which the concavities or convexities are arranged, namely, the first direction, is likely to become the easy magnetization axis as a result of the effect of shape magnetic anisotropy, when the flaky magnetic metal particles are oriented with respect to this direction as the easy magnetization axis, magnetic anisotropy can be easily induced, which is preferable.

In regard to either or both of a plurality of concavities and a plurality of convexities, it is desirable that five or more on the average of those are included in one flaky magnetic metal particle. Here, five or more concavities may be included, five or more convexities may be included, or the sum of the number of concavities and the number of convexities may be 5 or larger. More preferably, it is desirable that ten or more of concavities or convexities are included. It is also desirable that the average distance in the width direction between the respective concavities or convexities is from 0.1 µm to 100 µm. It is also desirable that a plurality of extraneous metal particles containing at least one first element selected from the group consisting of Fe, Co and Ni and having an average size of from 1 nm to 1 µm, is arranged along the concavities or convexities. Regarding the method for determining the average size of the extraneous metal particles, the average size is calculated by averaging the sizes of a plurality of extraneous metal particles arranged along the concavities or convexities, based on observation by TEM, SEM, optical microscopy, or the like. When these conditions are satisfied, magnetic anisotropy is easily induced in one direction, which is preferable. Furthermore, the adhesiveness between the flaky magnetic metal particles is enhanced when a pressed powder material is synthesized by powder-compacting the flaky magnetic metal particles (the concavities or convexities bring an anchoring effect of attaching the particles to neighboring particles), and thereby, mechanical characteristics such as strength and hardness, and thermal stability are enhanced, which is preferable.

It is desirable that each of the flaky magnetic metal particles further includes a plurality of small magnetic metal particles, that is, five or more particles on the average, on the flat surface. The small magnetic metal particles contain at least one first element selected from the group consisting of Fe, Co, and Ni, and the average particle size is from 10 nm to 1 µm. More preferably, the small magnetic metal particles have a composition that is equal to that of the flaky magnetic metal particles. As the small magnetic metal particles are provided on the surface of the flat surface, or the small magnetic metal particles are integrated with the flaky magnetic metal particles, the surface of the flaky magnetic metal particles is brought to an artificially slightly damaged state. As a result, when the flaky magnetic metal particles are powder-compacted together with an intercalated phase that will be described below, adhesiveness is greatly enhanced. Thereby, thermal stability and mechanical characteristics such as strength and toughness can be easily enhanced. In order to exhibit such effects at the maximum level, it is desirable that the average particle size of the small magnetic metal particles is adjusted to be from 10 nm to 1 µm, and five or more small magnetic metal particles on the average are integrated with the surface, that is, the flat surface, of the flaky magnetic metal particles. Meanwhile, when the small magnetic metal particles are unidirectionally arranged within the flat surface, magnetic anisotropy can be easily induced in the flat surface, and high magnetic permeability and low losses can be easily realized. Therefore, it is more preferable. The average particle size of the small magnetic metal particles is determined by observing the particles by TEM, SEM, optical microscopy, or the like.

The variation in the particle size distribution of the flaky magnetic metal particles can be defined by the coefficient of variation (CV value). That is, CV value (%)=[standard deviation of particle size distribution (W/average particle size (µm)]×100. It can be said that as the CV value is smaller, a sharp particle size distribution with less variation in the particle size distribution is obtained. When the CV value defined as described above is from 0.1% to 60%, low coercivity, low hysteresis loss, high magnetic permeability, and high thermal stability can be realized, which is preferable. Furthermore, since the variation is small, it is also easy to realize a high yield. A more preferred range of the CV value is from 0.1% to 40%.

One effective method for inducing the difference in coercivity on the basis of direction within the flat surface of a flaky magnetic metal particle is a method of subjecting the flaky magnetic metal particle to a heat treatment in a magnetic field. It is desirable to perform a heat treatment while a magnetic field is applied unidirectionally within the flat surface. Before the heat treatment is performed in a magnetic field, it is desirable to find the easy axis direction within the flat surface (find the direction in which coercivity is lowest), and to perform the heat treatment while applying a magnetic field in that direction. It is more preferable if the magnetic field to be applied is larger, and it is preferable to apply a magnetic field of 1 kOe or greater, while it is more preferable to apply a magnetic field of 10 kOe or greater. As a result, magnetic anisotropy can be exhibited in the flat surfaces of the flaky magnetic metal particles, the difference in coercivity on the basis of direction can be induced, and excellent magnetic characteristics can be realized. Therefore, it is preferable. The heat treatment is preferably carried out at a temperature of from 50° C. to 800° C. Regarding the atmosphere for the heat treatment, a vacuum atmosphere at a low oxygen concentration, an inert atmosphere, or a reducing atmosphere is desirable. More desirably, a reducing atmosphere of $H_2$ (hydrogen), CO (carbon monoxide), $CH_4$ (methane), or the like is preferred. The reason for this is that even if the flaky magnetic metal particles have been oxidized, the oxidized metal can be reduced and restored into simple metal by subjecting the metal particles to a heat treatment in a reducing atmosphere. As a result, flaky magnetic metal particles that have been oxidized and have lowered saturation magnetization can be reduced, and thereby saturation magnetization can also be restored. When crystallization of the flaky magnetic metal particles proceeds noticeably due to the heat treatment, characteristics are deteriorated (coercivity increases, and magnetic permeability decreases). Therefore, it is preferable to select the conditions so as to suppress excessive crystallization.

Furthermore, when flaky magnetic metal particles are synthesized, in a case in which the flaky magnetic metal particles are obtained by synthesizing a ribbon by a roll quenching method or the like and pulverizing this ribbon, either or both of a plurality of concavities and a plurality of convexities can be easily arranged in the first direction at the time of ribbon synthesis (concavities or convexities can be easily attached in the direction of rotation of the roll). As a result, the difference in coercivity on the basis of direction can be easily induced within the flat surface, and it is therefore preferable. That is, the direction in which either or both of a plurality of concavities and a plurality of convexities are arranged in the first direction within the flat surface, is likely to become the direction of the easy magnetization axis, and the difference in coercivity on the basis of direction is effectively induced within the flat surface, which is preferable.

According to the present embodiment, flaky magnetic metal particles having excellent magnetic characteristics such as low magnetic loss can be provided.

Second Embodiment

A plurality of the flaky magnetic metal particles of the present embodiment is different from the first embodiment, from the viewpoint that at least a portion of the surface of the flaky magnetic metal particles is covered with a coating layer that has a thickness of from 0.1 nm to 1 μm and contains at least one second element selected from the group consisting of oxygen (O), carbon (C), nitrogen (N), and fluorine (F).

Meanwhile, any matters overlapping with the contents of the first embodiment will not be described repeatedly.

Figure 7A:
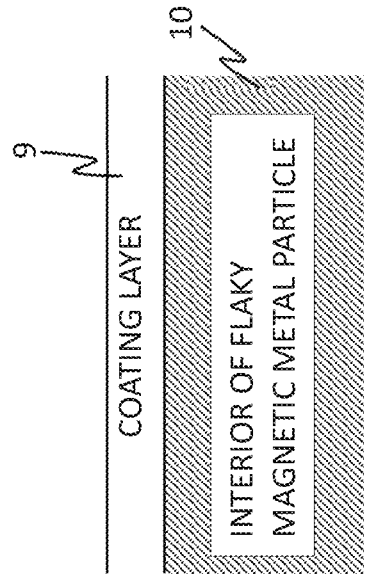
FIGS. 7A and 7B are schematic diagrams of flaky magnetic metal particles according to a second embodiment.
Figure 7B:
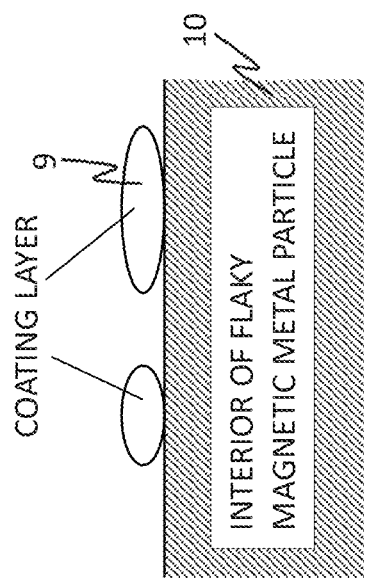

FIGS. 7A and 7B are schematic diagrams of the flaky magnetic metal particles according to a second embodiment. The diagrams illustrate a coating layer 9.

It is more preferable that the coating layer contains at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and also contains at least one second element selected from the group consisting of oxygen (O), carbon (C), nitrogen (N), and fluorine (F). The non-magnetic metal is particularly preferably Al or Si, from the viewpoint of thermal stability. In a case in which the flaky magnetic metal particles contain at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, it is more preferable that the coating layer contains at least one non-magnetic metal that is the same as the non-magnetic metal as one of the constituent components of the flaky magnetic metal particles. Among oxygen (O), carbon (C), nitrogen (N), and fluorine (F), it is preferable that the coating layer contains oxygen (O), and it is preferable that coating layer contains an oxide or a composite oxide. This is from the viewpoints of the ease of formation of the coating layer, oxidation resistance, and thermal stability. As a result of the above-described matters, the adhesiveness between the flaky magnetic metal particles and the coating layer can be enhanced, and the thermal stability and oxidation resistance of the pressed powder material that will be described below can be enhanced. The coating layer can not only enhance the thermal stability and oxidation resistance of the flaky magnetic metal particles, but can also enhance the electrical resistance of the flaky magnetic metal particles. By increasing the electrical resistance, the eddy current loss can be suppressed, and the frequency characteristics of the magnetic permeability can be enhanced. Therefore, it is preferable that a coating layer 14 is electrically highly resistant, and for example, it is preferable that the coating layer 14 has an electrical resistance value of 1 mΩ·cm or greater.

Furthermore, the presence of the coating layer is preferable also from the viewpoint of magnetic characteristics. In regard to the flaky magnetic metal particles, since the size of the thickness is small relative to the size of the flat surface, the metal particles may be regarded as a pseudo-thin film. At this time, a product obtained by forming a coating layer on the surface of the flaky magnetic metal particles and integrating the coating layer with the particles may be considered to have a pseudo-laminated thin film structure, and the magnetic domain structure is stabilized in terms of energy. As a result, coercivity can be reduced (hysteresis loss is reduced thereby), which is preferable. At this time, the magnetic permeability also becomes high, and it is preferable. From such a viewpoint, it is more preferable that the coating layer is non-magnetic (magnetic domain structure is easily stabilized).

From the viewpoints of thermal stability, oxidation resistance, and electrical resistance, it is more preferable as the thickness of the coating layer is larger. However, if the thickness of the coating layer is too large, the saturation magnetization becomes small, and the magnetic permeability also becomes small, which is not preferable. Furthermore, also from the viewpoint of magnetic characteristics, if the thickness is too large, the "effect by which the magnetic domain structure is stabilized, and a decrease in coercivity, a decrease in losses, and an increase in magnetic permeability are brought about" is reduced. In consideration of the above-described matters, a preferred thickness of the coating layer is from 0.1 nm to 1 μm, and more preferably from 0.1 nm to 100 μm.

Thus, according to the present embodiment, flaky magnetic metal particles having excellent characteristics such as high magnetic permeability, low losses, excellent mechanical characteristics, and high thermal stability can be provided.

Third Embodiment

The pressed powder material of the present embodiment is a pressed powder material including: a plurality of flaky magnetic metal particles, each flaky magnetic metal particle having a flat surface and a magnetic metal phase containing Fe, Co, and Si, the amount of Co being from 0.001 at % to 80 at % with respect to the total amount of Fe and Co, the amount of Si being from 0.001 at % to 30 at % with respect to the total amount of the magnetic metal phase, the average thickness being from 10 nm to 100 μm, the average value of the ratio of the average length within the flat surface to the thickness being from 5 to 10,000; and an intercalated phase existing between the flaky magnetic metal particles and containing at least one second element selected from the group consisting of oxygen (O), carbon (C), nitrogen (N), and fluorine (F), in which the pressed powder material has the difference in coercivity on the basis of direction within the plane of the pressed powder material.

Furthermore, the pressed powder material of the present embodiment is a pressed powder material including: a plurality of flaky magnetic metal particles, each flaky magnetic metal particle having a flat surface and a magnetic metal phase containing at least one first element selected from the group consisting of Fe, Co, and Ni, and additive elements, the additive elements including B and Hf, the additive elements being included in a total amount of from 0.002 at % to 80 at % with respect to the total amount of the magnetic metal phase, the average thickness being from 10 nm to 100 μm, and the average value of the ratio of the average length within the flat surface to the thickness being from 5 to 10,000; and an intercalated phase existing between the flaky magnetic metal particles and containing at least one second element selected from the group consisting of oxygen (O), carbon (C), nitrogen (N), and fluorine (F), in which the pressed powder material has the difference in coercivity on the basis of direction within the plane. A pressed powder material of the embodiments is a pressed powder material including: a plurality of flaky magnetic metal particles, each flaky magnetic metal particle having a flat surface and a magnetic metal phase containing at least one first element selected from the group consisting of Fe, Co, and Ni, the flaky magnetic metal particles having an average thickness of from 10 nm to 100 μm and an average value of the ratio of the average length in the flat surface to the thickness of from 5 to 10,000; and an intercalated phase existing between the flaky magnetic metal particles and containing at least one second element selected from the group consisting of oxygen (O), carbon (C), nitrogen (N), and fluorine (F), in which the pressed powder material includes a plane, and in which the pressed powder material includes, in a predetermined cross-section perpendicular to the flat surfaces, a void site at the boundary part between the flat surface of a flaky magnetic metal particle and the intercalated phase in contact with the flat surface, and the ratio of the length of the void site is 20% or less with respect to the length of the flat surface.

In regard to the composition, the average crystal grain size, and the crystal orientation (approximate (110) orientation) of the magnetic metal phase, it is preferable that the requirements described in the first embodiment are satisfied; however, since the requirements overlap in this embodiment, further description will not be repeated herein. Meanwhile, as an example of the pressed powder material, a pressed powder material obtained by compression-molding the flaky magnetic metal particles described in the first embodiment or the second embodiment may be mentioned.

It is preferable that saturation magnetization of the pressed powder material is high, and the saturation magnetization is preferably 0.2 T or higher, more preferably 0.5 T or higher, even more preferably 1.0 T or higher, still more preferably 1.8 T or higher, and even more preferably 2.0 T or higher. Thereby, magnetization saturation is suppressed, and the magnetic characteristics can be sufficiently exhibited in the system, which is preferable. However, depending on the use application (for example, magnetic wedges of a motor), the pressed powder material can be used satisfactorily even in a case in which saturation magnetization is relatively low, and it is preferable that the pressed powder material is rather specialized for low losses. Therefore, it is important to select the composition according to the use applications.

Figure 8:
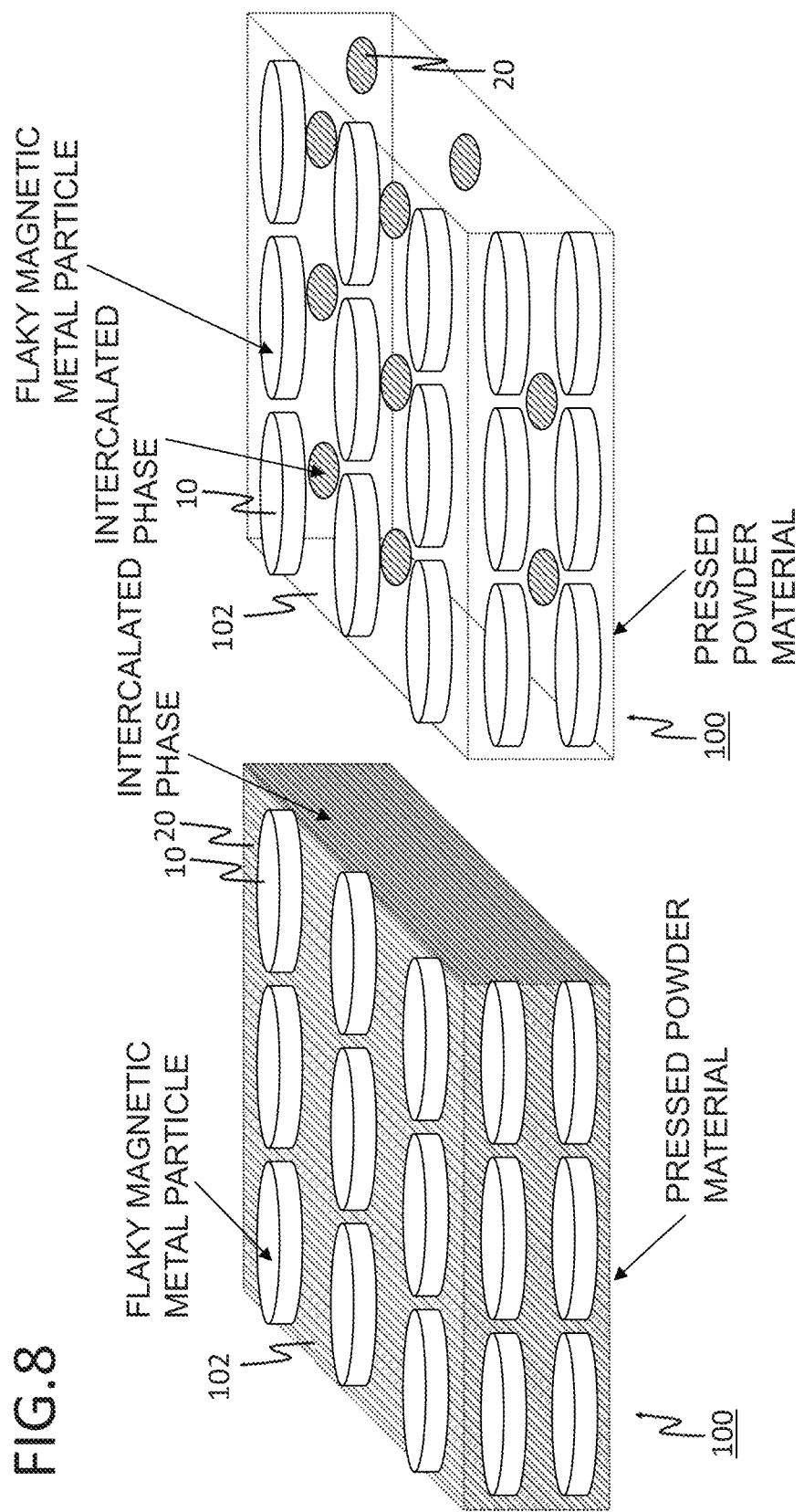
FIG. 8 is a schematic diagram of a pressed powder material according to a third embodiment.

FIG. 8 is a schematic diagram of the pressed powder material of the third embodiment. The diagram illustrates an intercalated phase 20, a pressed powder material 100, and a plane 102 of the pressed powder material. The diagram illustrated in the right-hand side of FIG. 8 is a schematic diagram produced by removing hatching from the diagram illustrated in the left-hand side of FIG. 8, in order to make the intercalated phase easily recognizable.

An example of the predetermined cross-sections 22a and 22b are shown on the right-hand side of FIG. 8. According to the present embodiment, the flat surfaces 6 are oriented to be parallel to the plane 102 of the pressed powder material. The "predetermined cross-section 22" is a cross-section of the pressed powder material 100, which is perpendicular to this plane 102. Meanwhile, the method for determining a "predetermined cross-section 22" is, of course, not limited as specified in FIG. 8.

FIG. 9 is a schematic diagram illustrating a disposition example of the flaky magnetic metal particles in faces parallel to the respective cross-sections according to the third embodiment. The pressed powder material 100 shown as an example in FIG. 9 has a rectangular parallelepiped shape having vertical length a, transverse length b, and height c. The face 102 of the pressed powder material in FIG. 9 is designated as the top face (or bottom face) of the pressed powder material 100. In this case, since the flaky magnetic metal particles are oriented to be parallel to the face 102 (face ab) of the pressed powder material, the disposition of the flaky magnetic metal particles is achieved as shown in, for example, the lower diagram of FIG. 9 (incidentally, in the case of FIG. 9, slender flaky magnetic metal particles in which the ratio a/b of the maximum length a to the minimum length b in the flat surface of a flaky magnetic metal particle are used). Furthermore, a face perpendicular to the face ab becomes the "predetermined cross-section". For example, a face parallel to the face bc, or a face parallel to the face ac can become a "predetermined cross-section" (in addition to those, a face perpendicular to the face ab can be arbitrarily determined, and that face can be designated as the "predetermined cross-section"). Incidentally, the method for appointing the "face of the pressed powder material" and the "predetermined cross-section" is not limited to this.

As the angle formed by a face parallel to the flat surface of a flaky magnetic metal particle and a plane of the pressed powder material is closer to 0°, it is defined that the flaky magnetic metal particle is oriented. FIG. 9 is a schematic diagram illustrating the angle formed by a face parallel to the flat surface of a flaky magnetic metal particle and a plane of the pressed powder material, according to the third embodiment. The above-mentioned angle is determined for a large number, that is, ten or more, of flaky magnetic metal particles, and it is desirable that the average value of the angles is preferably from 0° to 45°, more preferably from 0° to 30°, and even more preferably from 0° to 10°. That is, in regard to a pressed powder material, it is preferable that the flat surfaces of the flaky magnetic metal particles are oriented into a layered form such that the flat surfaces are parallel to one another or approximately parallel to one another. Thereby, the eddy current loss of the pressed powder material can be reduced, which is preferable. Furthermore, since the diamagnetic field can be made small, the magnetic permeability of the pressed powder material can be made high, which is preferable. Furthermore, since the ferromagnetic resonance frequency can be made high, the ferromagnetic resonance loss can be made small, which is preferable. Furthermore, such a laminated structure is preferable because the magnetic domain structure is stabilized, and low magnetic loss can be realized.

In the case of measuring the coercivity on the basis of direction within the plane (within a plane parallel to the flat surface of a flaky magnetic metal particle) of the pressed powder material, the coercivity is measured by, for example, varying the direction at an interval of 22.5° over the angle of 360° in the plane.

By having the difference in coercivity within the above-mentioned plane of a pressed powder material, the minimum coercivity value becomes small compared to an isotropic case in which there is almost no difference in coercivity, and thus it is preferable. A material having magnetic anisotropy within the plane has the difference in coercivity on the basis of direction within the plane, and the minimum coercivity value becomes small compared to a magnetically isotropic material. As a result, the hysteresis loss is reduced, and the magnetic permeability is increased, which is preferable.

In the above-mentioned plane of a pressed powder material (in the plane parallel to the flat surface of a flaky magnetic metal particle), it is more preferable as the proportion of the difference in coercivity on the basis of direction is larger, and the proportion is preferably 1% or greater. The proportion of the difference in coercivity is more preferably 10% or greater; the proportion of the difference in coercivity is even more preferably 50% or greater; and the proportion of the difference in coercivity is still more preferably 100% or greater. The proportion of the difference in coercivity as used herein is defined by the formula: $(Hc(max)-Hc(min))/Hc(min) \times 100(\%)$, by using the maximum coercivity, $Hc(max)$, and the minimum coercivity, $Hc(min)$, within a flat surface.

Meanwhile, coercivity can be evaluated conveniently by using a vibrating sample magnetometer (VSM) or the like. When the coercivity is low, even a coercivity of 0.1 Oe or less can be measured using a low magnetic field unit. Measurement is carried out by varying the direction within the above-mentioned plane of the pressed powder material (within the plane parallel to the flat surface of a flaky magnetic metal particle) with respect to the direction of the magnetic field to be measured.

When coercivity is calculated, a value obtained by dividing the difference between the magnetic fields at two points that intersect with the axis of abscissa (magnetic fields H1 and H2 where magnetization is zero) by 2 can be employed (that is, coercivity can be calculated by the formula: coercivity=|H2−H1|/2).

From the viewpoint of inducing magnetic anisotropy, it is preferable that the magnetic metal particles are arranged so as to have the maximum length directions aligned. Whether the maximum length directions are aligned is determined by making an observation of the magnetic metal particles included in the pressed powder material by TEM, SEM, optical microscopy or the like, determining the angle formed by the maximum length direction and an arbitrarily determined reference line, and judging the condition according to the degree of variation. Preferably, it is preferable to determine the average degree of variation for twenty or more flaky magnetic metal particles; however, in a case in which an observation of twenty or more flaky magnetic metal particles cannot be made, it is preferable that an observation of as many flaky magnetic metal particles as possible is made, and an average degree of variation is determined for those particles. According to the present specification, it is implied that the maximum length directions are aligned when the degree of variation is in the range of ±30°. It is more preferable that the degree of variation is in the range of ±20°, and it is even more preferable that the degree of variation is in the range of ±10°. As a result, magnetic anisotropy can be easily induced in the pressed powder material, which is desirable. More preferably, it is desirable that the first directions of either or both of a plurality of concavities and a plurality of convexities in the flat surface are arranged in the maximum length direction. Significant magnetic anisotropy can be induced thereby, and thus it is desirable.

In regard to the pressed powder material, it is preferable that the "proportion of arrangement" at which approximate first directions are arranged in a second direction is 30% or higher. The "proportion of arrangement" is more desirably 50% or higher, and even more desirably 75% or higher. As a result, the magnetic anisotropy becomes appropriately high, and the magnetic characteristics are enhanced as described above, which is preferable. First, for all of the flaky magnetic metal particles to be evaluated in advance, the direction in which the direction of arrangement of the concavities or convexities carried by various flaky magnetic metal particles accounts for the largest proportion is respectively defined as a first direction. The direction in which the largest number of the first directions of the various flaky magnetic metal particles will be arranged in the pressed powder material as a whole is defined as a second direction. Next, directions obtained by dividing the angle of 360° into angles at an interval of 45° with respect to the second direction are determined. Next, the first directions of the various flaky magnetic metal particles are sorted according to the direction of angle to which the first directions are arranged most closely, and that direction is defined as the "approximate first direction". That is, the first directions are sorted into four classes, namely, the direction of 0°, the direction of 45°, the direction of 90°, and the direction of 135°. The proportion in which the approximate first directions are arranged in the same direction with respect to the second direction is defined as the "proportion of arrangement". When this "proportion of arrangement" is evaluated, four consecutive neighboring flaky magnetic metal particles are selected, and the four particles are evaluated. This is carried out repeatedly several times, for at least three or more times (the more the better; for example, five or more times is desirable, and ten or more times is more desirable), and thereby, the average value is employed as the proportion of arrangement. Meanwhile, flaky magnetic metal particles in which the directions of the concavities or the convexities cannot be determined are excluded from the evaluation, and an evaluation of the flaky magnetic metal particles immediately adjacent thereto is performed. For example, in many of flaky magnetic metal particles obtained by pulverizing a ribbon synthesized with a single roll quenching apparatus, concavities or convexities attach only on one of the flat surfaces, and the other flat surface does not have any concavities or convexities attached thereto. When such flaky magnetic metal particles are observed by SEM, the situation in which the flat surface without any concavities or convexities attached thereto is shown on the image of observation may also occur at a probability of about 50% (in this case, too, actually there may be concavities or convexities attached to the flat surface on the rear side; however, these flaky magnetic metal particles have been excluded from the evaluation).

Furthermore, it is preferable that the largest number of the approximate first directions is arranged in the direction of the easy magnetization axis of the pressed powder material. That is, it is preferable that the easy magnetization axis of the pressed powder material is parallel to the second direction. Since the length direction in which the concavities or convexities are arranged is likely to become the easy magnetization axis due to the effect of shape magnetic anisotropy, it is preferable to align the directions by taking this direction as the easy magnetization axis, because magnetic anisotropy is easily induced.

It is preferable that a portion of the intercalated phase is attached along the first direction. In other words, it is preferable that a portion of the intercalated phase is attached along the direction of the concavities or convexities on the flat surfaces of the flaky magnetic metal particles. Thereby, magnetic anisotropy can be easily induced unidirectionally, which is preferable. Such attachment of the intercalated phase is preferable because the adhesiveness between the flaky magnetic metal particles is enhanced, and consequently, mechanical characteristics such as strength and hardness and thermal stability are enhanced. It is also preferable that the intercalated phase includes a particulate phase. As a result, the adhesiveness between the flaky magnetic metal particles is maintained in an adequate state appropriately, strain is reduced (since there is a particulate intercalated phase between the flaky magnetic metal particles, the stress applied to the flaky magnetic metal particles is relieved), and coercivity can be easily reduced (hysteresis loss is reduced, and magnetic permeability is increased), which is preferable.

Figure 11:
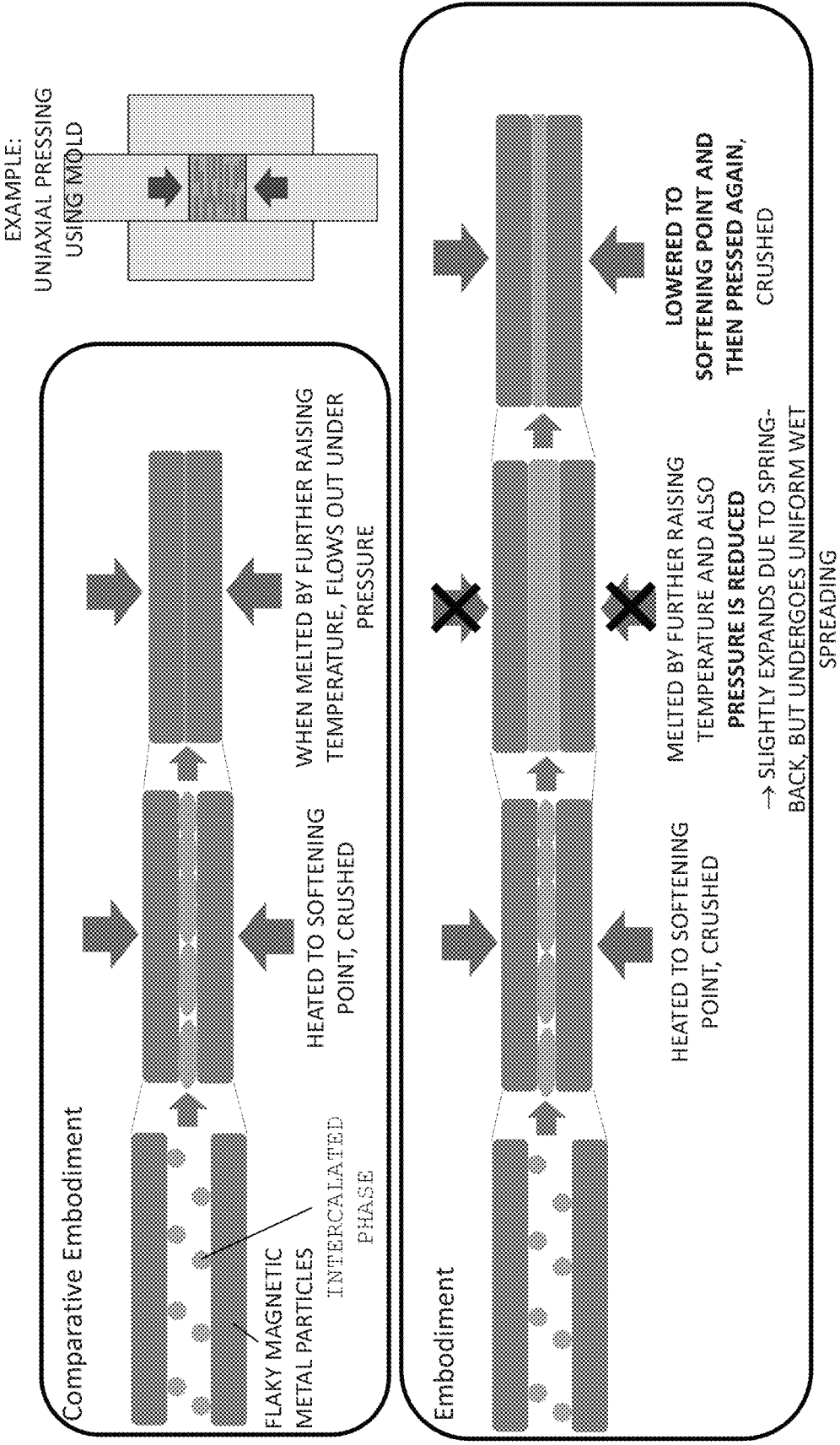
FIG. 11 is a schematic diagram illustrating a method for producing the pressed powder material according to the third embodiment.
Figure 12:
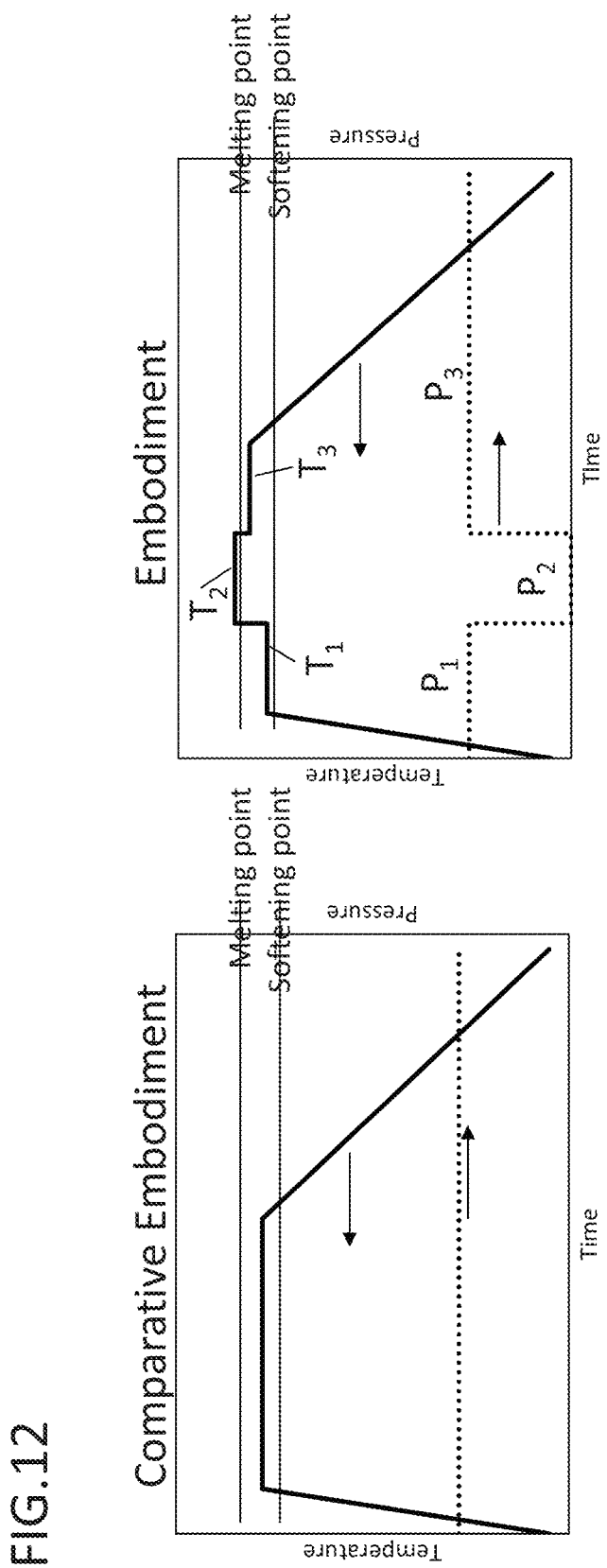
FIG. 12 is a graph schematically showing an example of temperature and pressure at the time of production according to the third embodiment.

FIG. 11 is a schematic diagram illustrating a method for producing a pressed powder material of the third embodiment. FIG. 12 is a graph schematically showing an example of the temperature and pressure at the time of production in the third embodiment. Here, production of a pressed powder material by uniaxial pressing using a mold is assumed. In a comparative embodiment, for example, a thermoplastic intercalated phase of a polyimide resin or the like is inserted between flaky magnetic metal particles, and pressing is performed using the above-mentioned mold while the material is heated to the softening point of the intercalated phase, or up to a temperature equal to or higher than the softening point. The magnitude of the pressure to be applied is constant, as shown in the left-side diagram of FIG. 12. In this case, there was a problem that when the temperature is raised to a temperature that largely exceeds the softening point, fluidity of the above-mentioned intercalated phase increases, the intercalated phase flows out due to the pressure exerted by pressing, the effect of adhering the flaky magnetic metal particles is lowered, and the strength of the pressed powder material is decreased. Thus, in the present embodiment, as shown in the right-side diagram of FIG. 12, pressing by pressure $P_1$ is performed while the material is heated to the softening point of the above-mentioned intercalated phase, or to a temperature equal to or higher than the softening point ($T_1$ in the right-side diagram of FIG. 12), subsequently the temperature is further raised to $T_2$, which is equal to or higher than the melting point of the intercalated phase, for example, so as to melt the material and also, for example, to release the pressure of the pressing for the time being, and the pressure is decreased to $P_2$. Meanwhile, $P_2$ as used herein may be zero, or may be a finite pressure to the extent that outflow of the intercalated phase does not occur. In this case, as the above-mentioned intercalated phase melts, in the case of a pressed powder material such as that of the present embodiment using flaky magnetic metal particles, the volume expands due to a spring-back effect originating from the flaky shape. However, it is considered that at this time, the melted intercalated phase uniformly undergoes wet spreading on the surface of the flaky magnetic metal particles. Subsequently, when the temperature is raised to temperature $T_3$ that is equal to or higher than the softening point, and then pressing is performed at pressure $P_3$, the expanded volume is caused to shrink again by spring-back, and the material becomes compact. Thereby, the binding capacity between the surface of the flaky magnetic metal particles and the intercalated phase is enhanced while outflow of the intercalated phase is suppressed, and thus, it is possible to produce a pressed powder material having high strength. Incidentally, as a matter of fact, it is not necessary to say that the pressed powder material of the present embodiment can be preferably produced, even without performing uniaxial pressure using a mold.

FIG. 13 is a microscopic (SEM) photograph of a predetermined cross-section of the pressed powder material according to the third embodiment. A microscopic (SEM) photograph of a cross-section of a pressed powder material of a comparative embodiment is shown on the left-hand side of FIG. 13. A void site is observed at the boundary part between the flat surface of a flaky magnetic metal particle and the intercalated phase. This void site is formed along the flat surface. Since a void site is provided, there exists a site where the flaky magnetic metal particle and the intercalated phase do not adhere. Since this site where the flaky magnetic metal particle and the intercalated phase do not adhere has low strength, this site lowers the strength of the pressed powder material. In contrast, in the pressed powder material of the embodiment shown on the right-hand side of FIG. 12, there are fewer voids at the boundary parts between the flat surfaces of the flaky magnetic metal particles and the intercalated phase, and there are many sites where the intercalated phase is adhered. Since there are many sites where the flat surfaces of the flaky magnetic metal particles and the intercalated phase adhere, the strength of the pressed powder material is enhanced. Specifically, in a case in which the pressed powder material is observed with a microscope in a direction parallel to a flat surface, when the length of a void site where the intercalated phase does not adhere is 20% or less on the average with respect to the length of the flat surface for a plurality of flaky magnetic metal particles, a pressed powder material having high strength can be obtained. Preferably, it is desirable that the length of the void site is 10% or less. Even more preferably, it is desirable that the length of the void site is 5% or less. It is possible to produce and provide a pressed powder material having high strength by the present embodiment.

Figure 14:
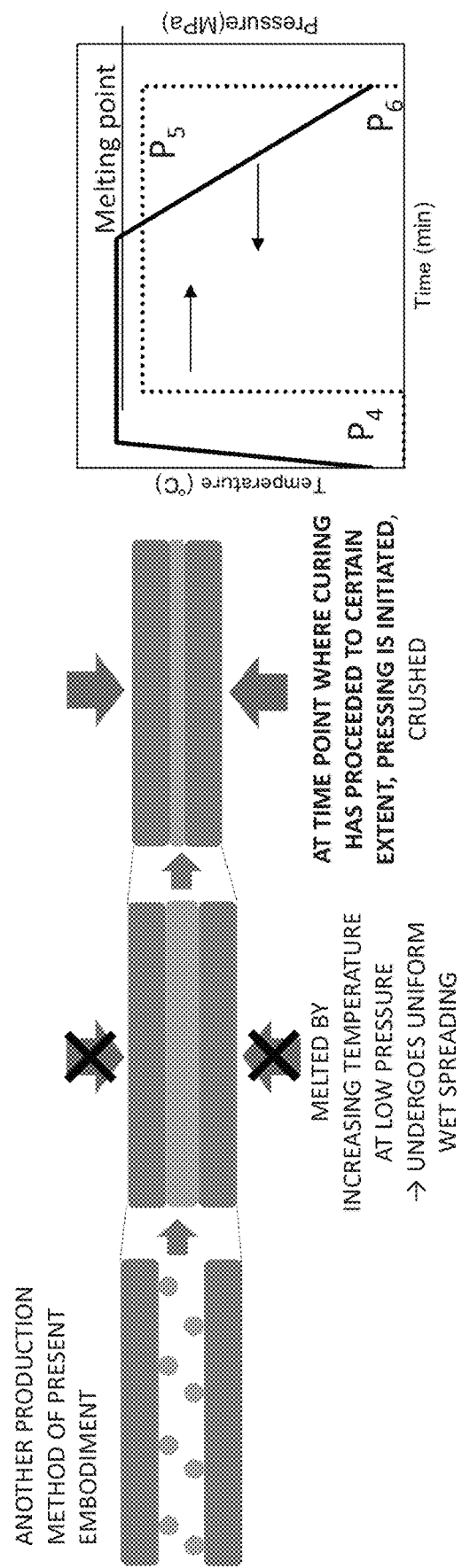
FIG. 14 is a schematic diagram illustrating a method for producing a pressed powder material according to another mode of the third embodiment.

FIG. 14 is a schematic diagram illustrating a method for producing a pressed powder material according to another mode of the third embodiment. Here, for example, a thermosetting intercalated phase of bismaleimide or the like is used. Further, the temperature is increased to a temperature higher than the melting point of this thermosetting intercalated phase at pressure $P_4$ (it does not matter whether pressure $P_4$ is zero). Here, the intercalated phase undergoes uniform wet spreading. In a case in which a thermosetting intercalated phase is used, curing of the intercalated phase proceeds gradually. Then, after such curing of the intercalated phase has proceeded, the pressure is increased from $P_4$ to $P_5$. Thereafter, the pressure is lowered to $P_6$ (it does not matter whether pressure $P_6$ is zero). Even in such a method, it is possible to preferably produce the pressed powder material of the present embodiment.

Incidentally, the ratio of the length of a void site to the length of a flat surface can be determined from, for example, an observed image obtainable using scanning electron microscope-energy dispersive X-ray spectroscopy (SEM-EDX), transmission electron microscope-energy dispersive X-ray spectroscopy (TEM-EDX), or the like.

Figure 15:
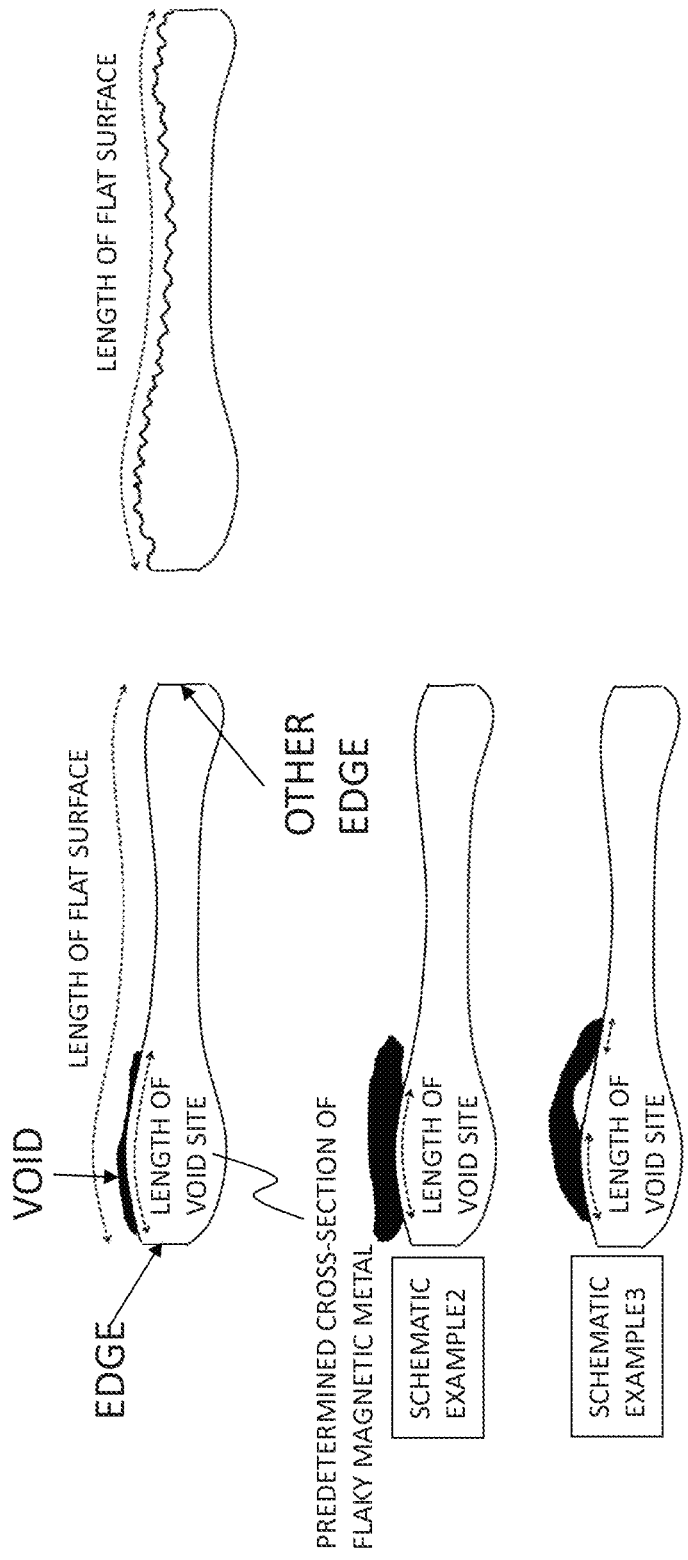
FIG. 15 is a schematic diagram illustrating the lengths of a flat surface and a void site in a predetermined cross-section of the pressed powder material according to the third embodiment.

FIG. 15 is a schematic diagram illustrating the lengths of a flat surface and a void site in a predetermined cross-section of the pressed powder material of the third embodiment. For instance, a method of calculating the length ratio of a void site to a flat surface using SEM-EDX will be described below. First, a conductive coating film such as carbon is formed on a surface as an object of observation of a pressed powder material, and a predetermined cross-section that is perpendicular to a flat surface of a flaky magnetic metal particle is observed. At this time, 50 or more of the above-mentioned average lengths of the flaky magnetic metal particles are measured for the flaky magnetic metal particles, a distribution of the above-mentioned average lengths is calculated, and flaky magnetic metal particles having average lengths that are included in the range of (average value±20%) in the distribution of the average length of the flaky magnetic metal particles are selected as objects of observation. Furthermore, a SEM-EDX image is obtained by setting the magnification ratio to a magnification ratio of the extent that the entire length of a flat surface of a particle as an object of observation is included in the obtained SEM image. Within the SEM-EDX image, a region containing any one element among iron (Fe), cobalt (Co), and nickel (Ni) as a main component is defined as a magnetic metal phase; a region containing any one element among oxygen (O), carbon (C), nitrogen (N), and fluorine (F) in a larger amount than in the magnetic metal phase is defined as an intercalated phase; and a region that does not contain any element (or contains any of those elements only in an amount equal to or less than the detection limit) is defined as a void. At the interface between the magnetic metal phase and the intercalated phase, there are voids, and a site where the magnetic metal phase and the intercalated phase are not in contact is defined as a void site. The length of the flat surface of a flaky magnetic metal particle, and the length of a void site where the intercalated phase is not in contact in the flat surface within the image of observation, are respectively measured. The length of a flat surface and the length of a void site are respectively measured along the curve of the flat surface. The length of a curve may be physically measured using a measuring instrument on a SEM image, and when the image is electronically obtained, the length is measured by a method of detecting a smooth boundary line by means of a boundary line detection algorithm, and calculating the length of this boundary line, or the like. However, as in the case of the schematic diagram shown on the left-hand side of FIG. 15, regarding the length of a void site, only the length of a site where the flat surface and the intercalated phase are not in contact will be measured, irrespective of the shape of the void. Furthermore, in a case in which the flat surface has very fine surface unevenness, the length is measured as the length of a curve that smoothly approximates these sites, as shown on the right-hand side of FIG. 15. In an image of observation obtained by observing at least twenty or more flaky magnetic metal particles that satisfy the above-described conditions, the whole length of the flat surface and the length of the void site are respectively measured for each particle, and a value obtained by dividing the sum of the whole lengths of the flat surfaces by the sum of the lengths of the void sites is calculated as the length ratio of the void site to the flat surface in this pressed powder material. In a case in which twenty or more flaky magnetic metal particles cannot be observed, it is preferable to observe as many as possible flaky magnetic metal particles, and to determine the average degree of variation for those particles.

Furthermore, regarding the average angle of orientation between a flat surface and a plane of a pressed powder material, for example, in the case of a pressed powder material formed from flaky magnetic metal particles which have an average thickness of 10 to 20 μm and in which an average value of the ratio of the average length in the flat surface to the thickness is about 5 to 20, the average angle of orientation can be calculated according to the following method using SEM. First, a SEM-EDX image having an area of observation of 500 μm×500 μm is obtained. Meanwhile, the area of observation may be appropriately modified within the scope of general knowledge, depending on the size (average thickness, and average value of the ratio of the average length within the flat surface to the thickness) of the flaky magnetic metal particles; however, it is preferable to select an area in which twenty or more flaky magnetic metal particles are included at least within the area of observation. In the SEM-EDX image thus obtained, a region containing any one element among iron (Fe), cobalt (Co), and nickel (Ni) as a main component is identified as a flaky magnetic metal particle. Among rectangles circumscribing the flaky magnetic metal particle, a rectangle having the smallest area is considered, and the angle formed by the long side direction of that rectangle with respect to the plane of the pressed powder material is defined as the angle of orientation of the flaky magnetic metal particle. For all of the flaky magnetic metal particles within the same visual field of observation, the angle of orientation of each flaky magnetic metal particle is calculated, and a value obtained by averaging the values remaining after the maximum value and the minimum value are excluded is designated as the angle of orientation of the surface as an object of observation. However, among the flaky magnetic metal particles, particles that cannot be easily distinguished are also included, and in that case, those particles may be excluded from the objects of observation within the scope of general knowledge. By a similar calculation method, the angle of orientation is calculated for all other planes of the pressed powder material, and the angle of orientation of the plane having the smallest angle of orientation is defined as the angle of orientation of the pressed powder material.

Furthermore, it is preferable that the proportion of lattice mismatch between the intercalated phase and the flaky magnetic metal particles is from 0.1% to 50%. Thereby, appropriately high magnetic anisotropy can be easily induced, and the above-described magnetic characteristics are enhanced, which is therefore preferable. In order to set the lattice mismatch to the range described above, the range of lattice mismatch can be realized by selecting the combination of the composition of the intercalated phase and the composition of the flaky magnetic metal particles 10. For example, Ni of the fcc structure has a lattice constant of 3.52 Å, and MgO of the NaCl type structure has a lattice constant of 4.21 Å. Thus, the lattice mismatch of the two is (4.21−3.52)/3.52×100=20%. That is, the lattice mismatch can be set to 20% by employing Ni of the fcc structure as the main composition of the flaky magnetic metal particles and employing MgO for the intercalated phase 20. As such, the lattice mismatch can be set to the range described above by selecting the combination of the main composition of the flaky magnetic metal particles and the main composition of the intercalated phase.

The intercalated phase contains at least one second element selected from the group consisting of oxygen (O), carbon (C), nitrogen (N), and fluorine (F). It is because the electrical resistance can be increased thereby. It is preferable that the electrical resistivity of the intercalated phase is higher than the electrical resistivity of the flaky magnetic metal particles. It is because the eddy current loss of the flaky magnetic metal particles can be reduced thereby. Since the intercalated phase exists so as to surround the flaky magnetic metal particles, the oxidation resistance and thermal stability of the flaky magnetic metal particles can be enhanced, which is preferable. Above all, it is more preferable that the intercalated phase contains oxygen from the viewpoint of having high oxidation resistance and high thermal stability. Since the intercalated phase also plays a role of mechanically adhering flaky magnetic metal particles to neighboring flaky magnetic metal particles, it is preferable also from the viewpoint of high strength.

The intercalated phase may satisfy at least one of the following three conditions: "being a eutectic oxide", "containing a resin", and "containing at least one magnetic metal selected from Fe, Co, and Ni". This will be described below.

First, the first "case in which the intercalated phase is a eutectic oxide" will be described. In this case, the intercalated phase contains a eutectic oxide containing at least two third elements selected from the group consisting of B (boron), Si (silicon), Cr (chromium), Mo (molybdenum), Nb (niobium), Li (lithium), Ba (barium), Zn (zinc), La (lanthanum), P (phosphorus), Al (aluminum), Ge (germanium), W (tungsten), Na (sodium), Ti (titanium), As (arsenic), V (vanadium), Ca (calcium), Bi (bismuth), Pb (lead), Te (tellurium), and Sn (tin). Particularly, it is preferable that the intercalated phase contains a eutectic system containing at least two elements from among B, Bi, Si, Zn, and Pb. As a result, the adhesiveness between the flaky magnetic metal particles and the intercalated phase becomes strong (bonding strength increases), and thermal stability and mechanical characteristics such as strength and toughness can be easily enhanced.

Furthermore, the eutectic oxide preferably has a softening point of from 200° C. to 600° C., and more preferably from 400° C. to 500° C. Even more preferably, the eutectic oxide is preferably a eutectic oxide containing at least two elements from among B, Bi, Si, Zn, and Pb, the eutectic oxide having a softening point of from 400° C. to 500° C. Thereby, the bonding between the flaky magnetic metal particles and the eutectic oxide becomes strong, and thermal stability and mechanical characteristics such as strength and toughness can be easily enhanced. When the flaky magnetic metal particles are integrated with the eutectic oxide, the two components are integrated while performing a heat treatment at a temperature near the softening point of the eutectic oxide, and preferably at a temperature slightly higher than the softening point. Thereby, the adhesiveness between the flaky magnetic metal particles and the eutectic oxide is increased, and mechanical characteristics can be enhanced. Generally, as the temperature of the heat treatment is higher to a certain extent, the adhesiveness between the flaky magnetic metal particles and the eutectic oxide increases, and the mechanical characteristics are enhanced. However, when the temperature of the heat treatment becomes too high, the coefficient of thermal expansion is increased, and therefore, the adhesiveness between the flaky magnetic metal particles and the eutectic oxide may be decreased on the contrary (when the difference between the coefficient of thermal expansion of the flaky magnetic metal particles and the coefficient of thermal expansion of the eutectic oxide becomes large, the adhesiveness may be further decreased). Furthermore, in a case in which the crystallinity of the flaky magnetic metal particles is non-crystalline or amorphous, when the temperature of the heat treatment is high, crystallization proceeds, and coercivity increases. Therefore, it is not preferable. For this reason, in order to achieve both the mechanical characteristics and the coercivity characteristics, it is preferable to adjust the softening point of the eutectic oxide to a value of from 200° C. to 600° C., and more preferably from 400° C. to 500° C., and to integrate the flaky magnetic metal particles and the eutectic oxide while performing a heat treatment at a temperature near the softening point of the eutectic oxide, and preferably at a temperature slightly higher than the softening point. Furthermore, regarding the temperature at which the integrated material is actually used in a device or a system, it is preferable to use the material at a temperature lower than the softening point.

Furthermore, it is desirable that the eutectic oxide has a glass transition temperature. Furthermore, it is desirable that the eutectic oxide has a coefficient of thermal expansion of from $0.5 \times 10^{-6}/°$ C. to $40 \times 10^{-6}/°$ C. Thereby, the bonding between the flaky magnetic metal particles 10 and the eutectic oxide becomes strong, and thermal stability and mechanical characteristics such as strength and toughness can be easily enhanced.

Furthermore, it is more preferable that at least one or more eutectic particles that are in a particulate form (preferably a spherical form) having a particle size of from 10 nm to 10 μm are included. These eutectic particles contain a material that is the same as the eutectic oxide but is not in a particulate form. In a pressed powder material, voids may also exist in some part, and thus, it can be easily observed that a portion of the eutectic oxide exists in a particulate form, and preferably in a spherical form. Even in a case in which there are no voids, the interface of the particulate form or spherical form can be easily discriminated. The particle size of the eutectic particles is more preferably from 10 nm to 1 μm, and even more preferably from 10 nm to 100 nm. As a result, when stress is appropriately relieved during the heat treatment while the adhesiveness between the flaky magnetic metal particles is maintained, the strain applied to the flaky magnetic metal particles can be reduced, and coercivity can be reduced. Thereby, the hysteresis loss is also reduced, and the magnetic permeability is increased. Meanwhile, the particle size of the eutectic particles can be measured by making an observation by TEM or SEM.

Furthermore, it is preferable that the intercalated phase has a softening point that is higher than the softening point of the eutectic oxide, and it is more preferable that the intercalated phase has a softening point higher than 600° C. and further contains intermediate intercalated particles containing at least one element selected from the group consisting of oxygen (O), carbon (C), nitrogen (N), and fluorine (F). When the intermediate intercalated particles exist in between the flaky magnetic metal particles, on the occasion in which the magnetic material is exposed to high temperature, the flaky magnetic metal particles can be prevented from being thermally fused with one another and undergoing deterioration of characteristics. That is, it is desirable that the intermediate intercalated particles exist mainly for the purpose of providing thermal stability. Meanwhile, when the softening point of the intermediate intercalated particles is higher than the softening point of the eutectic oxide, and more preferably, the softening point is 600° C. or higher, thermal stability can be further increased.

It is preferable that the intermediate intercalated particles contain at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and contain at least one element selected from the group consisting of oxygen (O), carbon (C), nitrogen (N), and fluorine (F). More preferably, from the viewpoints of high oxidation resistance and high thermal stability, an oxide or composite oxide containing oxygen is more preferred. Particularly, oxides such as aluminum oxide ($Al_2O_3$), silicon dioxide ($SiO_2$), titanium oxide ($TiO_2$), and zirconium oxide ($ZrO_3$); and composite oxides such as Al—Si—O are preferred from the viewpoints of high oxidation resistance and high thermal stability.

Regarding the method for producing a pressed powder material containing intermediate intercalated particles, for example, a method of mixing the flaky magnetic metal particles and the intermediate intercalated particles (aluminum oxide ($Al_2O_3$) particles, silicon dioxide ($SiO_2$) particles, titanium oxide ($TiO_2$) particles, zirconium oxide ($ZrO_3$) particles, and the like) using a ball mill or the like to obtain a dispersed state, and then integrating the flaky magnetic metal particles and the intermediate intercalated particles by press molding or the like, may be used. The method of dispersing the particles is not particularly limited as long as it is a method capable of appropriately dispersing particles.

Next, the second "case in which the intercalated phase contains a resin" will be described. In this case, the resin is not particularly limited, and a polyester-based resin, a polyethylene-based resin, a polystyrene-based resin, a polyvinyl chloride-based resin, a polyvinyl butyral resin, a polyvinyl alcohol resin, a polybutadiene-based resin, a TEFLON (registered trademark, polytetrafluoroethylene)-based resin, a polyurethane resin, a cellulose-based resin, an ABS resin, a nitrile-butadiene-based rubber, a styrene-butadiene-based rubber, a silicone resin, other synthetic rubbers, natural rubber, an epoxy resin, a phenolic resin, an allyl resin, a polybenzimidazole resin, an amide-based resin, a polyimide-based resin, a polyamideimide resin, or copolymers of those resins are used. Particularly, in order to realize high thermal stability, it is preferable that the intercalated phase includes a silicone resin or a polyimide resin, both of which have high heat resistance. As a result, the bonding between the flaky magnetic metal particles and the intercalated phase becomes strong, and thermal stability and mechanical characteristics such as strength and toughness can be easily enhanced.

Regarding the resin, it is preferable that the weight reduction percentage after heating for 3,000 hours at 180° C. in an air atmosphere is 5% or less, more preferably 3% or less, even more preferably 1% or less, and still more preferably 0.1% or less. Furthermore, the weight reduction percentage after heating for 200 hours at 220° C. in an air atmosphere is preferably 5% or less, more preferably 3% or less, even more preferably 1% or less, and still more preferably 0.1% or less. Furthermore, the weight reduction percentage after heating for 200 hours at 250° C. in an air atmosphere is preferably 5% or less, more preferably 3% or less, even more preferably 1% or less, and still more preferably 0.1% or less. An evaluation of these weight reduction percentages is carried out using a material in an unused state. An unused state refers to a state that can be used after shaping, and is a state in which the usable state has not been exposed to heat (for example, heat at a temperature of 40° C. or higher), chemicals, sunlight (ultraviolet radiation), or the like. The weight reduction percentage is calculated by the following formula from the masses obtained before and after heating: weight reduction percentage (%)= [mass (g) before heating−mass (g) after heating]/mass (g) before heating×100. It is also preferable that the strength after heating for 20,000 hours at 180° C. in an air atmosphere is a half or more of the strength before heating. It is more preferable that the strength after heating for 20,000 hours at 220° C. in an air atmosphere is a half or more of the strength before heating. Furthermore, it is preferable that the resin satisfies the area division H defined by the Japanese Industrial Standards (JIS). Particularly, it is preferable that the resin satisfies the heat resistance condition of enduring a maximum temperature of 180° C. More preferably, it is preferable that the resin satisfies the area division H defined by the Japanese National Railways Standards (JRE). Particularly, it is preferable that the resin satisfies the heat resistance condition of enduring a temperature increase of 180° C. with respect to the ambient temperature (standard: 25° C., maximum: 40° C.). Examples of a resin preferable for these conditions include a polysulfone, a polyether sulfone, polyphenylene sulfide, polyether ether ketone, an aromatic polyimide, an aromatic polyamide, an aromatic polyamideimide, polybenzoxazole, a fluororesin, a silicone resin, and a liquid crystal polymer. These resins have high intermolecular cohesive power, and therefore, the resins have high heat resistance, which is preferable. Among them, an aromatic polyimide and polybenzoxazole have higher heat resistance and are preferable, because the proportions occupied by rigid units in the molecules are high. Furthermore, it is preferable that the resin is a thermoplastic resin. The specifications about the weight reduction percentage upon heating, the specifications about strength, and the specifications about resin type as described above are respectively effective for increasing the heat resistance of the resin. Due to these, when a pressed powder material including a plurality of flaky magnetic metal particles and an intercalated phase (herein, a resin) is formed, the heat resistance of the pressed powder material is increased (thermal stability is increased), and the mechanical characteristics such as strength and toughness after being exposed to a high temperature (for example, 200° C. or 250° C. described above) or while being under a high temperature (for example, 200° C. or 250° C. described above), are likely to be enhanced, which is preferable. Also, since a large amount of the intercalated phase exists so as to surround the periphery of the flaky magnetic metal particles even after heating, the pressed powder material has excellent oxidation resistance and does not easily undergo deterioration of the magnetic characteristics caused by oxidation of the flaky magnetic metal particles, which is preferable.

Furthermore, in regard to the pressed powder material, it is preferable that the weight reduction percentage after heating for 3,000 hours at 180° C. is 5% or less, more preferably 3% or less, even more preferably 1% or less, and still more preferably 0.1% or less. Furthermore, the pressed powder material is such that the weight reduction percentage after heating for 3,000 hours at 220° C. is preferably 5% or less, more preferably 3% or less, even more preferably 1% or less, and still more preferably 0.1% or less. Furthermore, the weight reduction percentage of the pressed powder material after heating for 200 hours at 250° C. in an air atmosphere is preferably 5% or less, more preferably 3% or less, even more preferably 1% or less, and still more preferably 0.1% or less. Meanwhile, the evaluation of the weight reduction percentage is similar to the case of the resin as described above. Furthermore, preferably, it is preferable that the strength of the pressed powder material after heating for 20,000 hours at 180° C. in an air atmosphere is a half or more of the strength before heating. It is more preferable that the strength of the pressed powder material after heating for 20,000 hours at 220° C. in an air atmosphere is a half or more of the strength before heating. Furthermore, it is preferable that the pressed powder material satisfies the area division H defined by the Japanese Industrial Standards (JIS). Particularly, it is preferable that the pressed powder material satisfies the heat resistance condition of enduring a maximum temperature of 180° C. More preferably, it is preferable that the pressed powder material satisfies the area division H defined by the Japanese National Railways Standards (JRE). Particularly, it is preferable that the pressed powder material satisfies the heat resistance condition of enduring a temperature increase of 180° C. with respect to the ambient temperature (standard: 25° C., maximum: 40° C.). The specifications about the weight reduction percentage upon heating, the specifications about strength, and the specifications about resin type as described above are respectively effective for increasing the heat resistance of the pressed powder material, and a material having high reliability can be realized. Since the heat resistance of the pressed powder material is increased (thermal stability is increased), and the mechanical characteristics such as strength and toughness after being exposed to a high temperature (for example, 200° C. or 250° C. described above) or while being under a high temperature (for example, 200° C. or 250° C. described above) are can be easily enhanced, which is preferable. Also, since a large amount of the intercalated phase exists so as to surround the periphery of the flaky magnetic metal particles even after heating, the pressed powder material has excellent oxidation resistance and does not easily undergo deterioration of the magnetic characteristics caused by oxidation of the flaky magnetic metal particles, which is preferable.

Furthermore, it is preferable that the pressed powder material includes a crystalline resin that does not have a glass transition point up to the thermal decomposition temperature. It is also preferable that the pressed powder material includes a resin having a glass transition temperature of 180° C. or higher, and it is more preferable that the pressed powder material includes a resin having a glass transition temperature of 220° C. or higher. It is even more preferable that the pressed powder material includes a resin having a glass transition temperature of 250° C. or higher. Generally, the flaky magnetic metal particles have a larger crystal grain size as the temperature of the heat treatment is higher. Therefore, in a case in which there is a need to make the crystal grain size of the flaky magnetic metal particles small, it is preferable that the glass transition temperature of the resin to be used is not too high, and specifically, it is preferable that the glass transition temperature is 600° C. or lower. Furthermore, it is preferable that the crystalline resin that does not have a glass transition point up to the thermal decomposition temperature includes a resin having a glass transition temperature of 180° C. or higher, and it is more preferable that the crystalline resin includes a resin having a glass transition temperature of 220° C. or higher. Specifically, it is preferable that the crystalline resin includes a polyimide having a glass transition temperature of 180° C. or higher, it is more preferable that the crystalline resin includes a polyimide having a glass transition temperature of 220° C. or higher, and it is even more preferable that the crystalline resin includes a thermoplastic polyimide. As a result, fusion of the resin to the magnetic metal particles is likely to occur, and the resin can be suitably used particularly for powder-compacting molding. The thermoplastic polyimide is preferably a polyimide having an imide bond in the polymer chain of a thermoplastic aromatic polyimide, a thermoplastic aromatic polyamideimide, a thermoplastic aromatic polyetherimide, a thermoplastic aromatic polyesterimide, a thermoplastic aromatic polyimidesiloxane, or the like. Among them, when the glass transition temperature is 250° C. or higher, superior heat resistance is obtained, and thus it is preferable.

An aromatic polyimide and polybenzoxazole exhibit high heat resistance since an aromatic ring and a heterocyclic ring are directly bonded to each other and adopt a planar structure, and those planar structures are immobilized by π-π stacking. Thereby, the glass transition temperature can be increased, and thermal stability can be enhanced. Furthermore, the glass transition temperature can be easily adjusted to a desired glass transition point by appropriately introducing a curved unit such as an ether bond into the molecular structure, and thus it is preferable. Above all, when the benzene ring structure of a unit derived from an acid anhydride that constitutes the imide polymer is any one of a biphenyl structure, a triphenyl structure, and a tetraphenyl structure, it is preferable from the viewpoint of strength. Since the symmetric structure between imide groups, which affects heat resistance, is not damaged, and the orientation property also extends over a long distance, the material strength is also increased. An aromatic polyimide structure preferable for this is represented by the following Chemical Formula (1). In other words, the polyimide resin of the present embodiment includes a repeating unit represented by the following Chemical Formula (1):

[Chemical Formula 1]

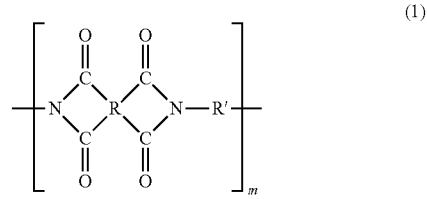

(1)

In Chemical Formula (1), R represents any one of a biphenyl structure, a triphenyl structure, and a tetraphenyl structure; and R' represents a structure having at least one or more aromatic rings in the structure.

When the characteristics (weight reduction percentage, resin type, glass transition temperature, molecular structure, and the like) of an intercalated phase (herein, a resin), which is a constituent component of the pressed powder material, are determined from the pressed powder material, only a portion of resin is cut out from the pressed powder material, and evaluation of various characteristics is carried out. In a case in which it cannot be determined by visual inspection whether the portion is formed from a resin or not, the resin and the magnetic metal particles are distinguished by using an elemental analysis based on EDX, or the like.

When the content of the resin contained in the pressed powder material as a whole is larger, the space between the polymer wetting (covering) a flaky magnetic metal particle and the polymer wetting (covering) an adjacent flaky magnetic metal particle can be filled with a polymer without difficulty, and thus mechanical characteristics such as strength are enhanced. Furthermore, the electrical resistivity is also increased, and the eddy current loss of the pressed powder material can be reduced, which is preferable. On the other hand, as the content of the resin is larger, the proportion of the flaky magnetic metal particles is decreased. Therefore, the saturation magnetization of the pressed powder material decreases, and the magnetic permeability is also decreased, which is not preferable. In order to realize a well-balanced material by comprehensively considering the mechanical characteristics such as strength, and characteristics such as electrical resistivity, eddy current loss, saturation magnetization, and magnetic permeability, it is preferable to adjust the content of the resin contained in the entire pressed powder material to 93 wt % or less, more preferably to 86 wt % or less, even more preferably to the range of from 2 wt % to 67 wt %, and still more preferably to the range of from 2 wt % to 43 wt %. Furthermore, the content of the flaky magnetic metal particles is preferably 7 wt % or more, more preferably 14 wt % or more, even more preferably from 33 wt % to 98 wt %, and still more preferably from 57 wt % to 98 wt %. The flaky magnetic metal particles are such that when the particle size decreases, the surface area increases, and the amount of the resin required is dramatically increased. Therefore, it is preferable that the flaky magnetic metal particles have an appropriately large particle size. As a result, the pressed powder material can be subjected to high saturation magnetization, the magnetic permeability can be made high, and this is advantageous for the size reduction and power output increase of a system.

Next, the third "case in which the intercalated phase contains at least one magnetic metal selected from Fe, Co, and Ni and has magnetic properties" will be described. In this case, it is preferable because, as the intercalated phase has magnetic properties, the flaky magnetic metal particles can readily interact magnetically with neighboring particles, and the magnetic permeability is increased. Furthermore, since the magnetic domain structure is stabilized, the frequency characteristics of the magnetic permeability are also enhanced, which is preferable. Meanwhile, the term "magnetic properties" as used herein means ferromagnetism, ferrimagnetism, feeble magnetism, antiferromagnetism, or the like. Particularly, in the case of ferromagnetism and ferrimagnetism, the magnetic interaction is stronger, and it is preferable. In regard to the issue of whether the intercalated phase has magnetic properties, an evaluation can be made using a vibrating sample magnetometer (VSM) or the like. In regard to the issue of whether the intercalated phase contains at least one magnetic metal selected from Fe, Co, and Ni and has magnetic properties, an investigation can be conducted conveniently using EDX or the like.

Thus, three conditions of the intercalated phase have been described, and it is preferable that at least one of these three conditions is satisfied; however, it is still acceptable that two or more, or all of the three conditions are satisfied. The "case in which the intercalated phase is a eutectic oxide" (first case) exhibits slightly inferior mechanical characteristics such as strength, as compared to a case in which the intercalated phase is a resin (second case); however, on the other hand, the first case is highly excellent from the viewpoint that strain can be easily relieved, and particularly, lowering of coercivity can easily proceed. Therefore, it is preferable (as a result, low hysteresis loss and high magnetic permeability can be easily realized, which is preferable). Furthermore, eutectic oxides have higher heat resistance compared to resins in many cases, and eutectic oxides also have excellent thermal stability, which is preferable. In contrast, the "case in which the intercalated phase contains a resin" (second case) has a defect that since the adhesiveness between the flaky magnetic metal particles and the resin is high, stress is likely to be applied (strain is likely to enter), and as a result, coercivity tends to increase. However, since a resin is highly excellent, particularly in view of mechanical characteristics such as strength, a resin is preferable. The "case in which the intercalated phase contains at least one magnetic metal selected from Fe, Co, and Ni and has magnetic properties" (third case) is preferable because the flaky magnetic metal particles can easily interact magnetically with neighboring particles, and particularly because the intercalated phase becomes highly excellent in view of high magnetic permeability and low coercivity (consequently, low hysteresis loss). An intercalated phase that achieves a good balance can be produced by using the three conditions appropriately, or by combining some of the three conditions, based on the above-described advantages and disadvantages.

In regard to the flaky magnetic metal particles included in the pressed powder material, it is desirable that the particles satisfy the requirements described in the first and second embodiments. Here, description of overlapping matters will not be repeated.

In regard to the pressed powder material, it is preferable that the flat surfaces of the flaky magnetic metal particles described above are oriented in a layered form so as to be parallel to each other. The eddy current loss of the pressed powder material can be reduced thereby, and thus, it is preferable. Furthermore, since the diamagnetic field can be made small, the magnetic permeability of the pressed powder material can be made high, which is preferable. Also, since the ferromagnetic resonance frequency can be made high, the ferromagnetic resonance loss can be made small, which is preferable. Such a laminated structure is preferable because the magnetic domain structure is stabilized, and low magnetic loss can be realized. Here, as the angle formed by a face parallel to the flat surface of a flaky magnetic metal particle and a plane of the pressed powder material is closer to 0°, it is defined that the flaky magnetic metal particle is oriented. Specifically, the aforementioned angle is determined for a large number of flaky magnetic metal particles 10, that is, ten or more particles, and it is desirable that the average value is preferably from 0° to 45°, more preferably from 0° to 30°, and even more preferably from 0° to 10°.

The pressed powder material may have a laminated type structure composed of a magnetic layer containing the flaky magnetic metal particles, and an intermediate layer containing any of O, C, and N. In regard to the magnetic layer, it is preferable that the flaky magnetic metal particles are oriented (oriented such that the flat surfaces are made parallel to one another). Furthermore, it is preferable that the magnetic permeability of the intermediate layer is made lower than the magnetic permeability of the magnetic layer. Through these countermeasures, a pseudo thin film laminated structure can be realized, and the magnetic permeability in the layer direction can be made high, which is preferable. In regard to such a structure, since the ferromagnetic resonance frequency can be made high, the ferromagnetic resonance loss can be made small, which is preferable. Furthermore, such a laminated structure is preferable because the magnetic domain structure is stabilized, and low magnetic loss can be realized. In order to further enhance these effects, it is more preferable to make the magnetic permeability of the intermediate layer lower than the magnetic permeability of the intercalated phase (intercalated phase within the magnetic layer). Thereby, the magnetic permeability in the layer direction can be made even higher in a pseudo thin film laminated structure, and therefore, it is preferable. Also, since the ferromagnetic resonance frequency can be made even higher, the ferromagnetic resonance loss can be made small, which is preferable.

Thus, according to the present embodiment, a pressed powder material having excellent magnetic characteristics such as low magnetic loss can be provided.

Fourth Embodiment

Figure 10:
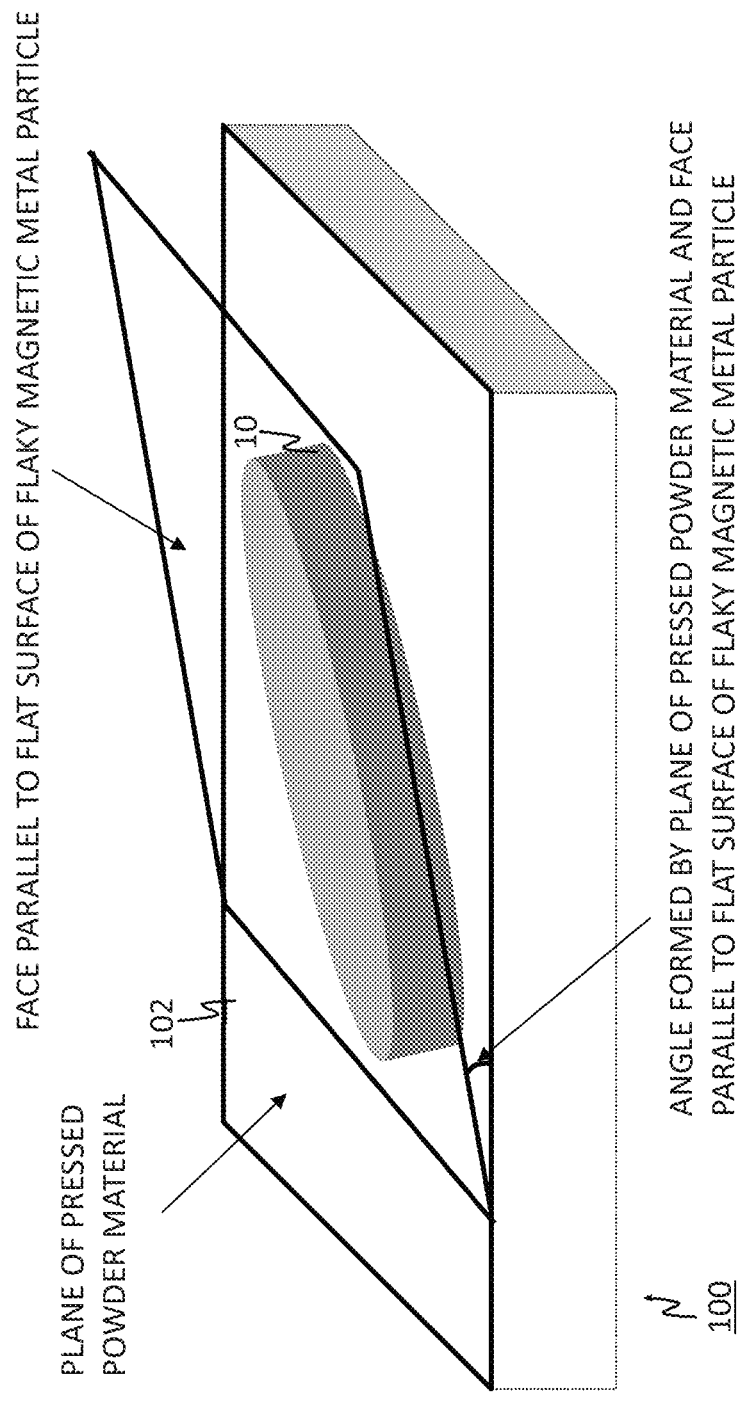
FIG. 10 is a schematic diagram illustrating the angle formed by a face parallel to the flat surface of a flaky magnetic metal particle and a plane of a pressed powder material, according to the third embodiment.

A system and a device apparatus of the present embodiment have the pressed powder material of the third embodiment. Therefore, any matters overlapping with the contents of the first to third embodiments will not be described repeatedly. Examples of the component parts of the pressed powder material included in these system and device apparatus include cores for rotating electric machines such as various motors and generators (for example, motors and generators), potential transformers, inductors, transformers, choke coils, and filters; and magnetic wedges for a rotating electric machine. FIG. 16 is a conceptual diagram of a motor system according to the fourth embodiment. A motor system is an example of the rotating electric machine system. A motor system is one system including a control system for controlling the rotational frequency or the electric power (output power) of a motor. Regarding the mode for controlling the rotational frequency of a motor, there are control methods that are based on control by a bridge servo circuit, proportional current control, voltage comparison control, frequency synchronization control, and phase locked loop (PLL) control. As an example, a control method based on PLL is illustrated in FIG. 16. A motor system that controls the rotational frequency of a motor based on PLL includes a motor; a rotary encoder that converts the amount of mechanical displacement of the rotation of the motor into electrical signals and detects the rotational frequency of the motor; a phase comparator that compares the rotational frequency of the motor given by a certain command, with the rotational frequency of the motor detected by the rotary encoder, and outputs the difference of those rotational frequencies; and a controller that controls the motor so as to make the difference of the rotational frequencies small. On the other hand, examples of the method for controlling the electric power of the motor include control methods that are based on pulse width modulation (PWM) control, pulse amplitude modulation (PAM) control, vector control, pulse control, bipolar drive, pedestal control, and resistance control. Other examples of the control method include control methods based on microstep drive control, multiphase drive control, inverter control, and switching control. As an example, a control method using an inverter is illustrated in FIG. 10. A motor system that controls the electric power of the motor using an inverter includes an alternating current power supply; a rectifier that converts the output of the alternating current power supply to a direct current; an inverter circuit that converts the direct current to an alternating current based on an arbitrary frequency; and a motor that is controlled by this alternating current.

Figure 17:
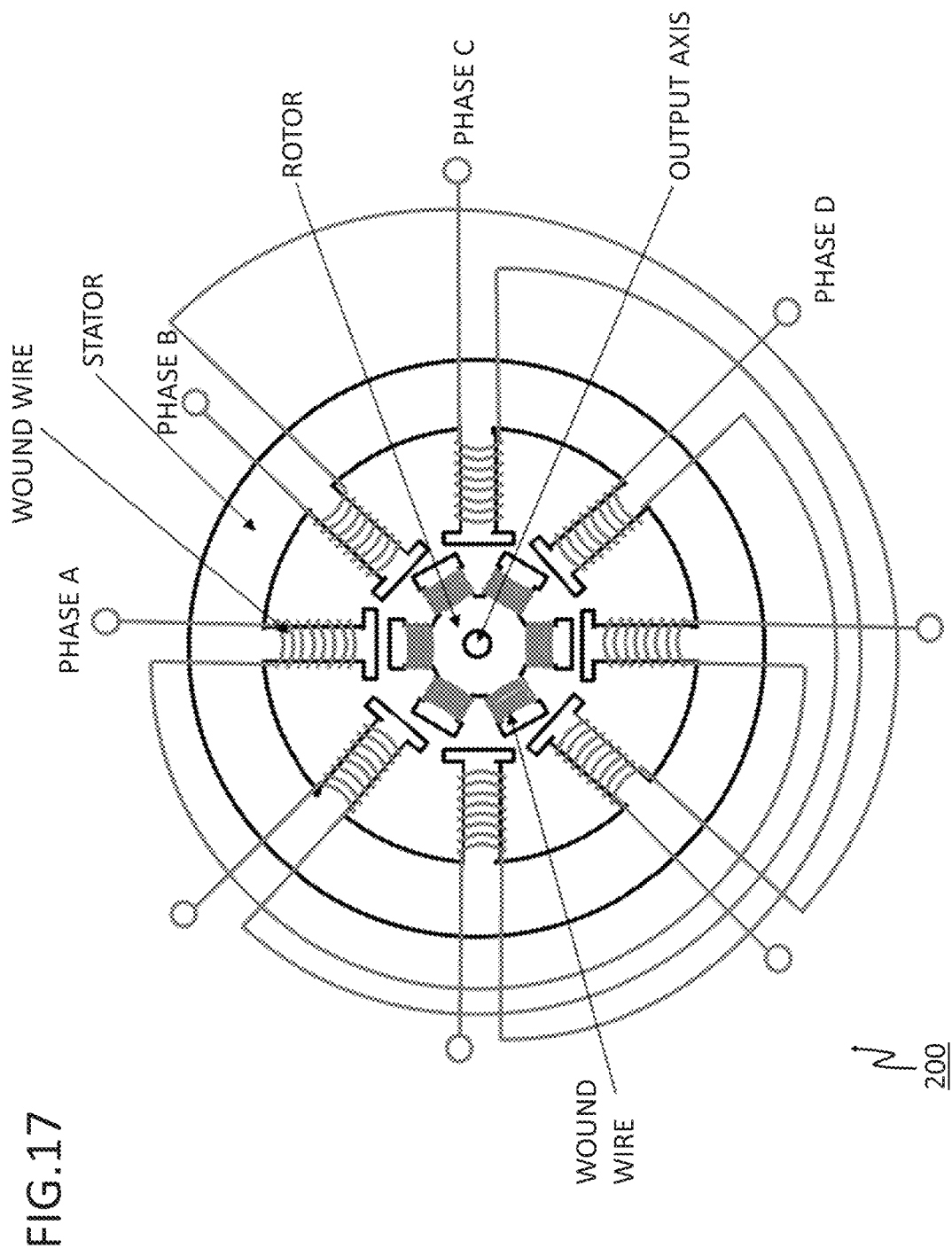
FIG. 17 is a conceptual diagram of a motor according to the fourth embodiment.

FIG. 17 illustrates a conceptual diagram of a motor according to the fourth embodiment. A motor 200 is an example of the rotating electric machine. In the motor 200, a first stator (magneto stator) and a second rotor (rotator) are disposed. The diagram illustrates an inner rotor type motor in which a rotor is disposed on the inner side of a stator; however, an outer rotor type in which the rotor is disposed on the outer side of the stator may also be used.

Figure 18:
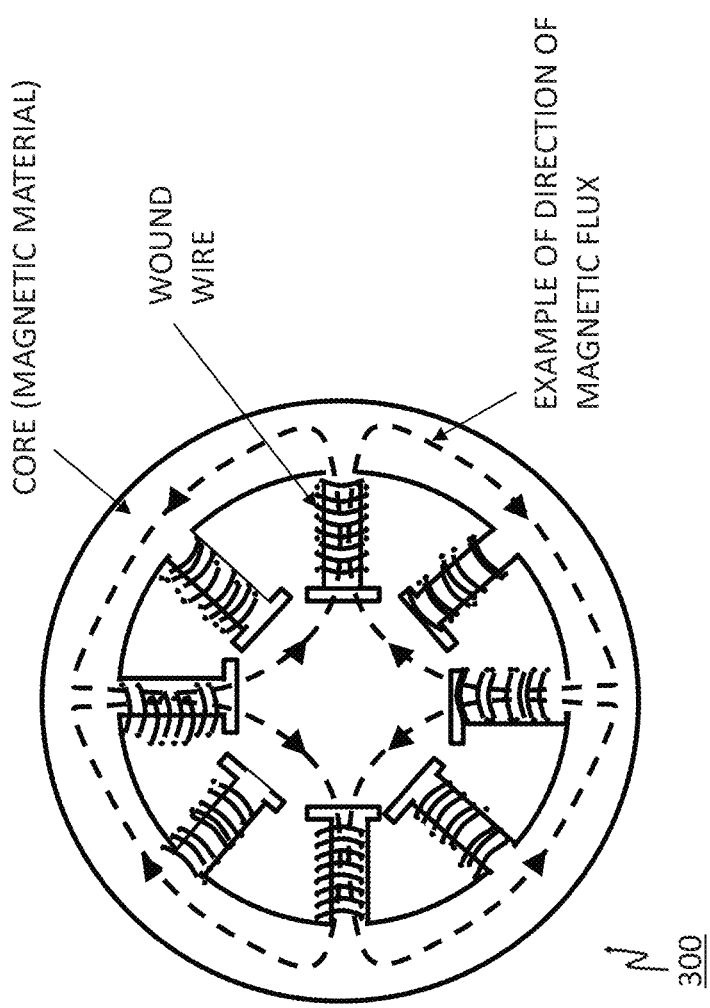
FIG. 18 is a conceptual diagram of a motor core (stator) according to the fourth embodiment.
Figure 19:
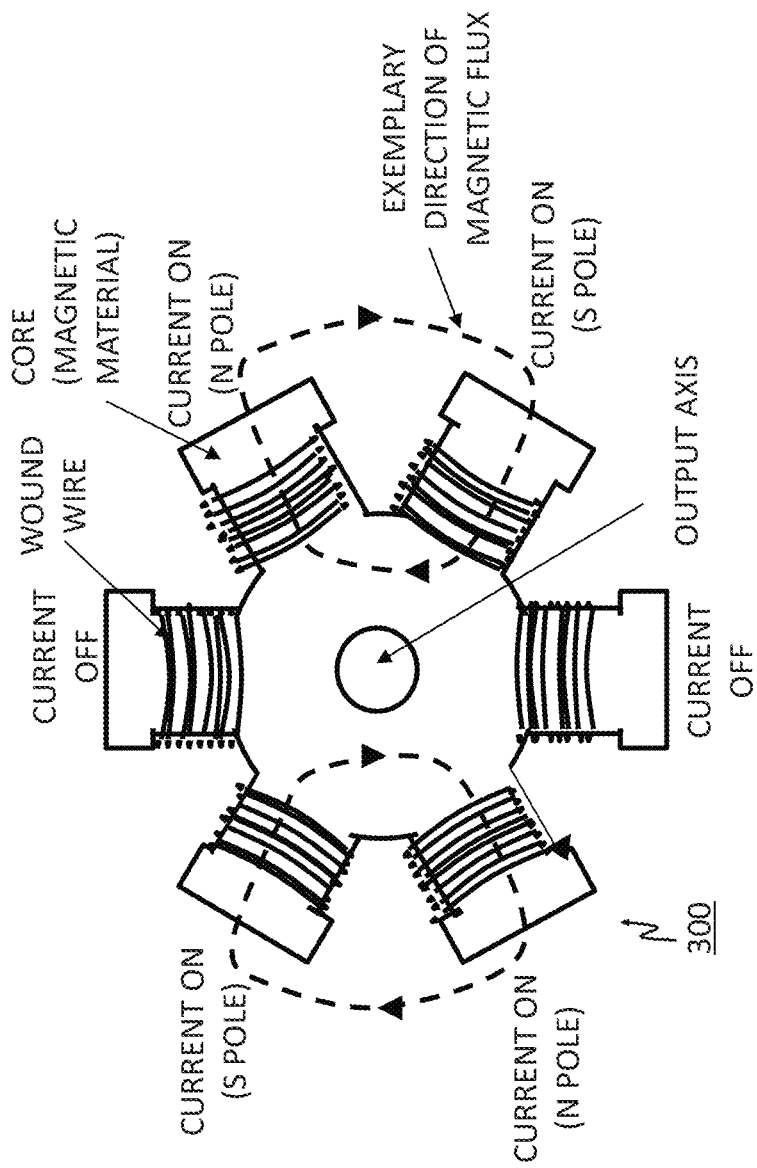
FIG. 19 is a conceptual diagram of a motor core (rotor) according to the fourth embodiment.

FIG. 18 is a conceptual diagram of a motor core (stator) according to the fourth embodiment. FIG. 19 is a conceptual diagram of a motor core (rotor) according to the fourth embodiment. Regarding the motor core 300 (core of a motor), the cores of a stator and a rotor correspond to the motor core. This will be described below. FIG. 18 is an exemplary conceptual cross-sectional diagram of a first stator. The first stator has a core and coils. The coils are wound around some of the protrusions of the core, which are provided on the inner side of the core. In this core, the pressed powder material of the third embodiment can be disposed. FIG. 19 is an exemplary conceptual cross-sectional diagram of the first rotor. The first rotor has a core and coils. The coils are wound around some of the protrusions of the core, which are provided on the outer side of the core. In this core, the pressed powder material of the third embodiment can be disposed.

FIG. 18 and FIG. 19 are intended only for illustrative purposes to describe examples of motors, and the applications of the pressed powder material are not limited to these. The magnetic material can be applied to all kinds of motors as cores for making it easy to lead the magnetic flux.

Figure 20:
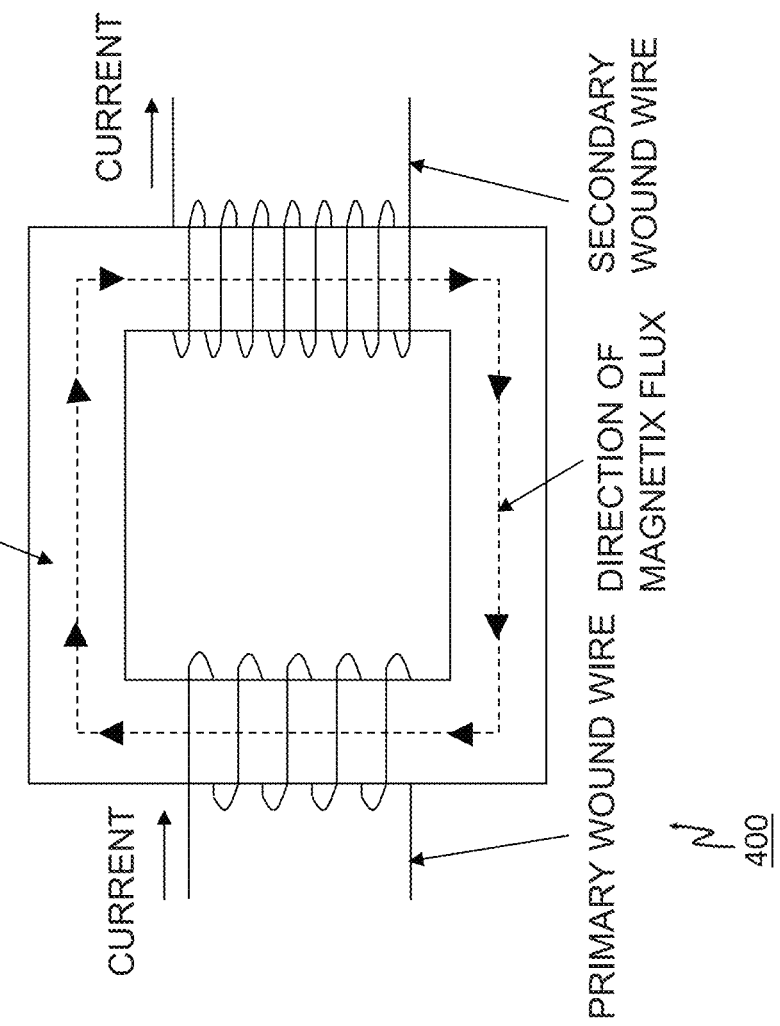
FIG. 20 is a conceptual diagram of a potential transformer or a transformer according to the fourth embodiment.
Figure 21:
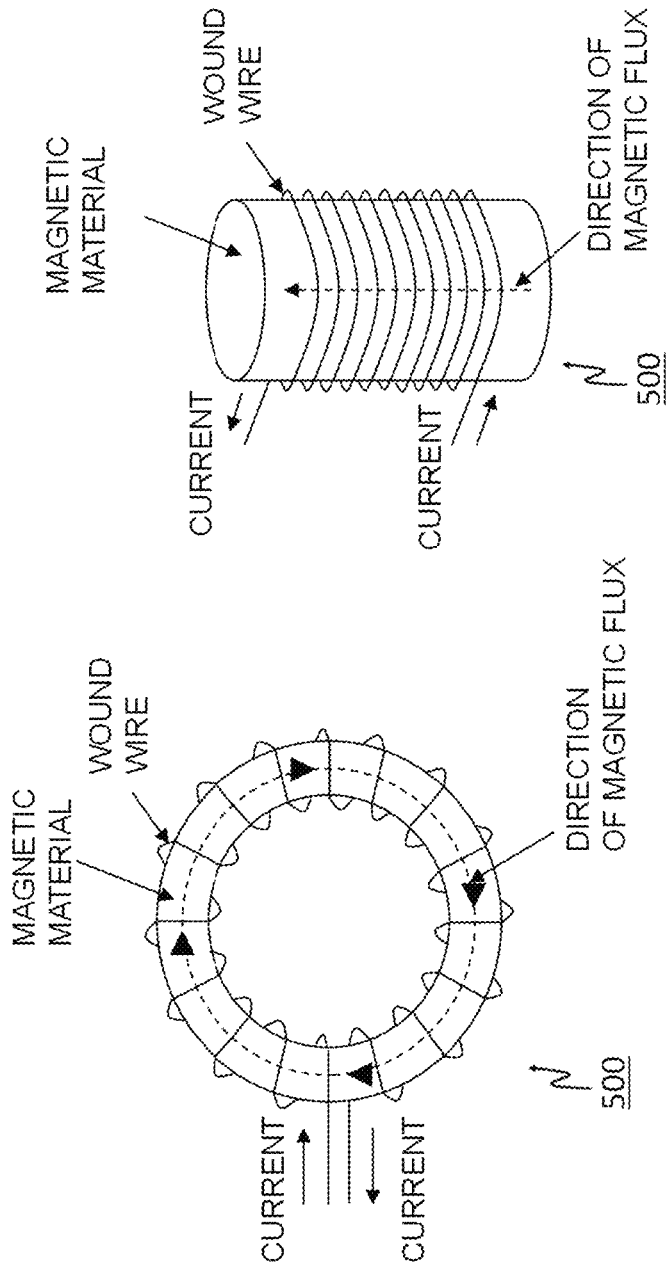
FIG. 21 is a conceptual diagram of inductors (ring-shaped inductor and rod-shaped inductor) according to the fourth embodiment.
Figure 22:
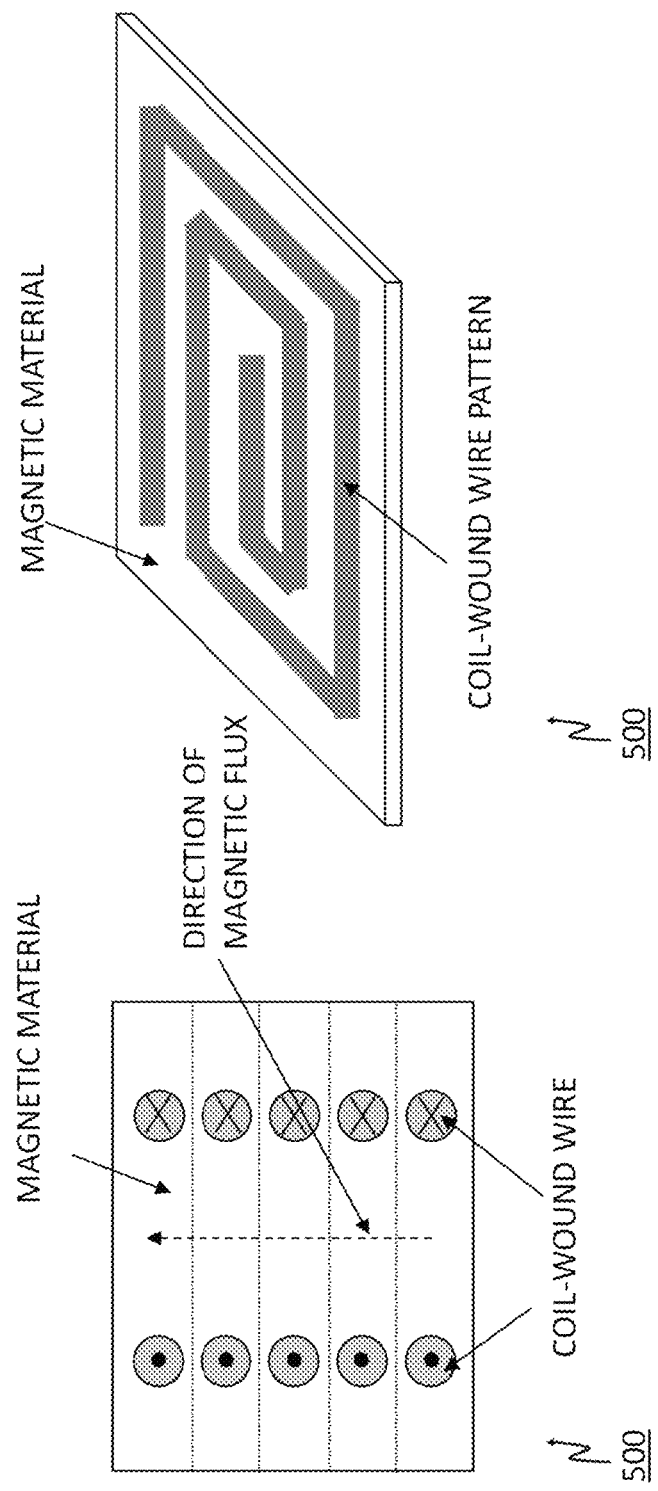
FIG. 22 is a conceptual diagram of inductors (chip inductor and planar inductor) according to the fourth embodiment.

FIG. 20 is a conceptual diagram of a potential transformer or a transformer according to the fourth embodiment. FIG. 21 is a conceptual diagram of inductors (ring-shaped inductor and rod-shaped inductor) according to the fourth embodiment. FIG. 22 is a conceptual diagram of inductors (chip inductor and planar inductor) according to the fourth embodiment. These diagrams are also intended only for illustrative purposes. Also for the potential transformer or transformer 400 and the inductor 500, similarly to the motor core, the pressed powder materials can be applied to all kinds of potential transformers or transformers and inductors in order to make it easy to lead the magnetic flux or to utilize high magnetic permeability.

Figure 23:
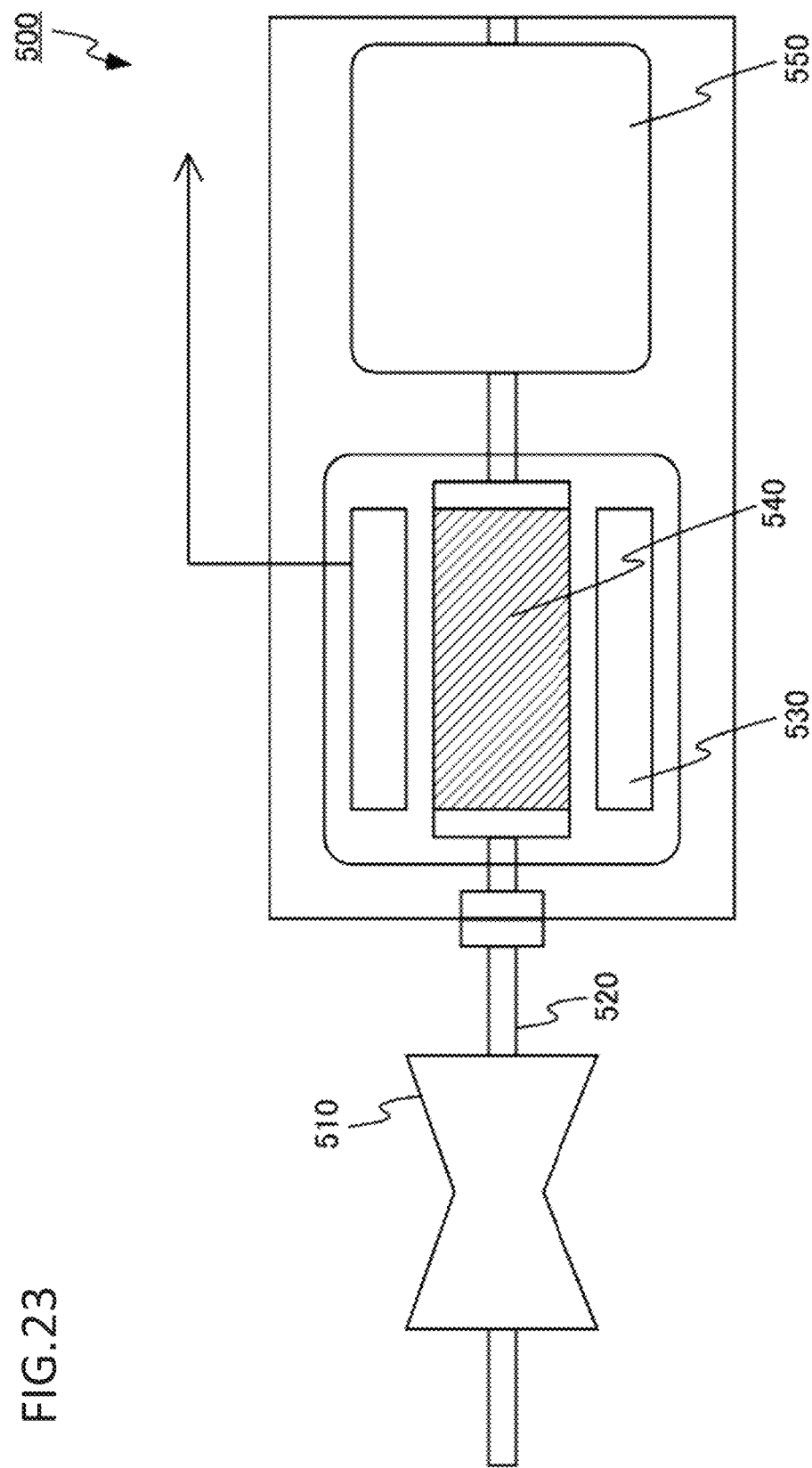
FIG. 23 is a conceptual diagram of a generator according to the fourth embodiment.

FIG. 23 is a conceptual diagram of a generator 500 according to the fourth embodiment. The generator 500 is an example of the rotating electric machine. The generator 500 includes either or both of a second stator (magneto stator) 530 that uses the pressed powder material of the first, second, or third embodiment as the core; and a second rotor (rotator) 540 that uses the pressed powder material of the first, second, or third embodiment as the core. In the diagram, the second rotor (rotator) 540 is disposed on the inner side of the second stator 530; however, the second rotor may also be disposed on the outer side of the second stator. The second rotor 540 is connected to a turbine 510 provided at an end of the generator 500 through a shaft 520. The turbine 510 is rotated by, for example, a fluid supplied from the outside, which is not illustrated in the diagram. Meanwhile, instead of the turbine that is rotated by a fluid, the shaft can also be rotated by transferring dynamic rotation of the regenerative energy of an automobile or the like. Various known configurations can be employed for the second stator 530 and the second rotor 540.

The shaft is in contact with a commutator (not illustrated in the diagram) that is disposed on the opposite side of the turbine with respect to the second rotor. The electromotive force generated by rotation of the second rotor is transmitted, as the electric power of the generator, after undergoing a voltage increase to the system voltage by means of an isolated phase bus that is not illustrated in the diagram, and a main transformer that is not illustrated in the diagram. Meanwhile, in the second rotor, an electrostatic charge is generated due to an axial current generated concomitantly with the static electricity from the turbine or with power generation. Therefore, the generator includes a brush intended for discharging the electrostatic charge of the second rotor.

The rotating electric machine of the present embodiment can be preferably used in railway vehicles. For example, the rotating electric machine can be preferably used in the motor 200 that drives a railway vehicle, or the generator 500 that generates electricity for driving a railway vehicle.

Figure 24:
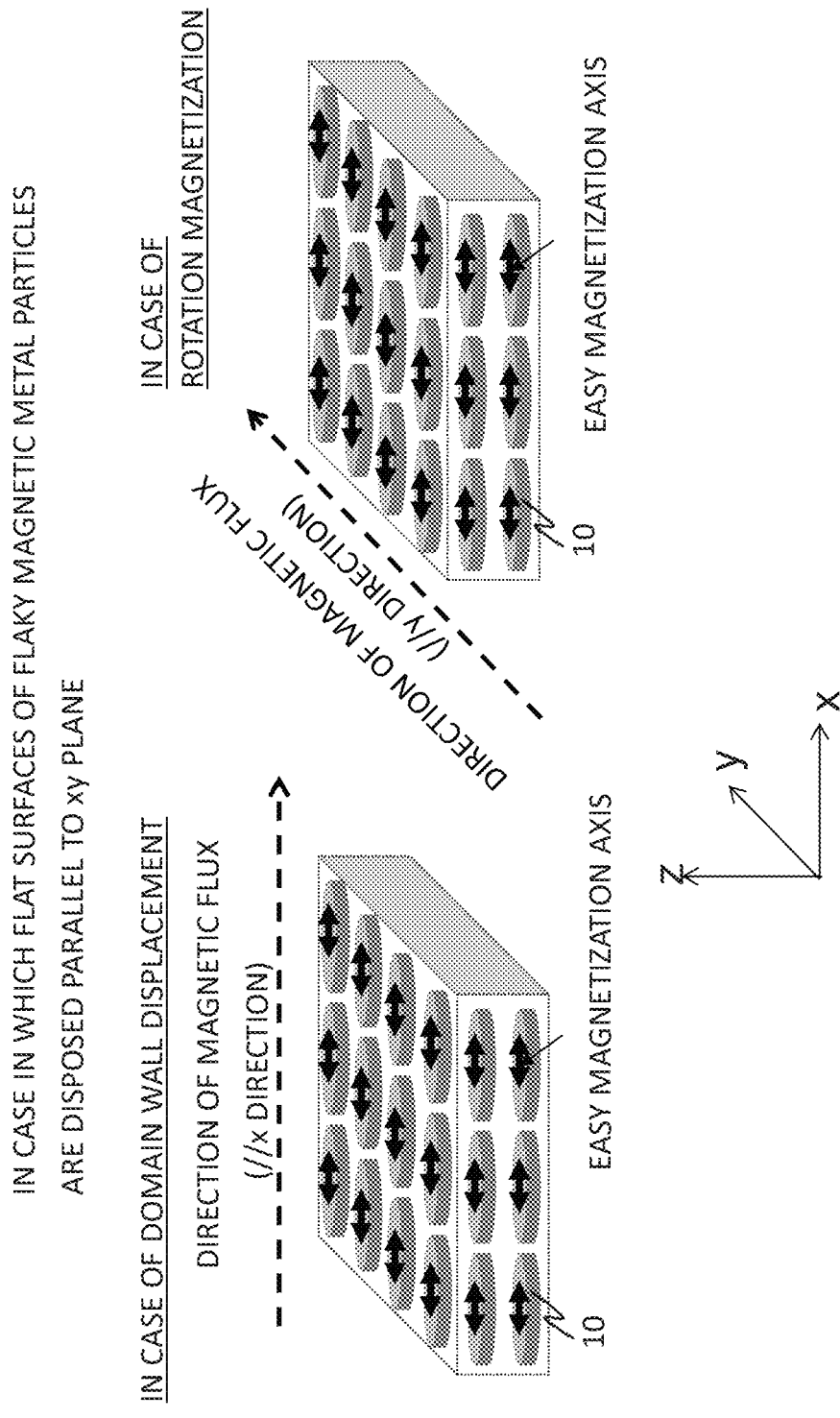
FIG. 24 is a conceptual diagram illustrating the relationship between the direction of the magnetic flux and the direction of disposition of the pressed powder material.

Furthermore, FIG. 24 is a conceptual diagram illustrating the relationship between the direction of the magnetic flux and the direction of disposition of a pressed powder material. First, for both of the domain wall displacement type and the rotation magnetization type, it is preferable that the flat surfaces of the flaky magnetic metal particles included in a pressed powder material are disposed in a direction in which the flat surfaces are parallel to one another as far as possible and are aligned in a layered form, with respect to the direction of the magnetic flux. This is because the eddy current loss can be reduced by making the cross-sectional area of the flaky magnetic metal particles that penetrate through the magnetic flux, as small as possible. Furthermore, in regard to the domain wall displacement type, it is preferable that the easy magnetization axis (direction of the arrow) in the flat surface of a flaky magnetic metal particle is disposed parallel to the direction of the magnetic flux. Thereby, the system can be used in a direction in which coercivity is further decreased, and therefore, the hysteresis loss can be reduced, which is preferable. Furthermore, the magnetic permeability is also made high, and it is preferable. In contrast, in regard to the rotation magnetization type, it is preferable that the easy magnetization axis (direction of the arrow) in the flat surface of a flaky magnetic metal particle is disposed perpendicularly to the direction of the magnetic flux. Thereby, the system can be used in a direction in which coercivity is further decreased, and therefore, the hysteresis loss can be reduced, which is preferable. That is, it is preferable to understand the magnetization characteristics of a pressed powder material, determine whether the pressed powder material is of the domain wall displacement type or the rotation magnetization type (method for determination is as described above), and then dispose the pressed powder material as illustrated in FIG. 18. In a case in which the direction of the magnetic flux is complicated, it may be difficult to dispose the magnetic material perfectly as illustrated in FIG. 18; however, it is preferable to dispose the pressed powder material as illustrated in FIG. 18 as far as possible. It is desirable that the method for disposition described above is applied to all of the systems and device apparatuses of the present embodiment (for example, cores for rotating electric machines such as various motors and generators (for example, motors and generators), potential transformers, inductors, transformers, choke coils, and filters; and magnetic wedges for a rotating electric machine).

In order for a pressed powder material to be applied to these systems and device apparatuses, the magnetic material is allowed to be subjected to various kinds of processing. For example, in the case of a sintered body, the magnetic material is subjected to mechanical processing such as polishing or cutting; and in the case of a powder, the magnetic material is mixed with a resin such as an epoxy resin or polybutadiene. If necessary, the magnetic material is further subjected to a surface treatment. Also, if necessary, a coiling treatment is carried out.

When the system and device apparatus of the present embodiment are used, a motor system, a motor, a potential transformer, a transformer, an inductor, and a generator, all having excellent characteristics (high efficiency and low losses), can be realized.

EXAMPLES

Hereinafter, embodiments will be described in more detail by comparing Examples 1 to 12 with Comparative Example 1. For the pressed powder materials obtainable by Examples and Comparative Examples described below, a summary of the ratio of the lengths of the void site with respect to the flat surface, the average thickness t of the flaky magnetic metal particles, the average value A of the ratio of the average length in the flat surface to the thickness is presented in Table 1.

Example 1

First, a ribbon of Fe—Co—B—Si (Fe:Co:B:Si=552:23:19:6 (at %), Fe:Co=70:30 (at %), the total amount of additive elements B+Si is 25 at % with respect to the total amount of Fe+Co+B+Si) is produced using a single roll quenching apparatus. Next, the ribbon thus obtained is subjected to a heat treatment at 300° C. in a $H_2$ atmosphere. Next, this ribbon is pulverized using a mixer apparatus and is subjected to a heat treatment in a magnetic field at 400° C. in a $H_2$ atmosphere, and thus flaky magnetic metal particles are obtained. The average thickness t of the flaky magnetic metal particles thus obtained is 10 µm, and the average value A of the ratio of the average length in the flat surface to the thickness is 20. The flaky magnetic metal particles thus obtained are mixed with an intercalated phase (polyimide resin), the mixture is subjected to molding in a magnetic field (the flaky particles are oriented), and the resultant is subjected to hot press molding. Meanwhile, regarding the conditions for hot press molding, molding is continuously carried out under three-stage conditions such as 400° C.-140 MPa-1 hour, 420° C.-0.1 MPa-1 hour, and 400° C.-140 MPa-1 hour. Subsequently, the resultant is subjected to a heat treatment in a magnetic field, and thereby a pressed powder material is obtained. In the heat treatment in a magnetic field, a magnetic field is applied in the direction of the easy magnetization axis, and a heat treatment is carried out.

Example 2

The procedure is the same as in Example 1, except that the conditions for hot press molding are controlled, and thereby the ratio of crack sites with respect to the flat surface of the pressed powder material thus obtainable has the value indicated in Example 2 of Table 1.

Examples 3 to 12

The procedure is the same as in Examples 1 and 2, except that the average thickness t of the flaky magnetic metal particles and the ratio A of the average length within the flat surface to the thickness have the values indicated in Examples 3 to 12 of Table 1.

Comparative Example 1

The procedure is the same as in Example 1, except that the conditions for hot press molding are controlled during hot press molding, and thereby the ratio of crack sites with respect to the flat surface of the pressed powder material thus obtainable has the value indicated in Comparative Example 1 of Table 1.

Next, with regard to the materials for evaluation of Examples 1 to 12 and Comparative Example 1, the strength ratio and the strength retention ratio are evaluated by the following methods. The evaluation results are shown in Table 2.

(1) Strength ratio: The flexural strength of a sample for evaluation was measured according to the measurement method of JIS Z2248, and the measurement result was expressed as a ratio with the flexural strength of the sample of Comparative Example 1 (=saturation magnetization of sample for evaluation/saturation magnetization of Comparative Example 1). Furthermore, in a case in which the sample for evaluation is small and does not satisfy the specimen shape as defined in JIS Z2248, the flexural strength of the sample for evaluation is estimated using a calibration curve produced using test pieces having the same size and known flexural strengths, and the estimated value is designated as the value of flexural strength of the sample.

(2) Strength retention ratio: The flexural strength of a sample for evaluation is measured. The sample for evaluation is heated for 3,000 hours in an air atmosphere at a temperature of 180° C., and then the flexural strength of the sample for evaluation is measured again. Thereby, the strength retention ratio (=flexural strength after heating/flexural strength before heating×100(%)) is determined.

TABLE 1

| | Ratio of length of void site to flat surface (%) | t | A |
|---|---|---|---|
| Example 1 | 1 | 10 μm | 20 |
| Example 2 | 18 | 10 μm | 20 |
| Example 3 | 2 | 10 nm | 200 |
| Example 4 | 19 | 10 nm | 200 |
| Example 5 | 1 | 10 nm | 1000 |
| Example 6 | 20 | 10 nm | 1000 |
| Example 7 | 1 | 10 nm | 10000 |
| Example 8 | 20 | 10 nm | 10000 |
| Example 9 | 2 | 1 μm | 100 |
| Example 10 | 18 | 1 μm | 100 |
| Example 11 | 3 | 100 μm | 5 |
| Example 12 | 20 | 100 μm | 5 |
| Comparative Example 1 | 23 | 10 μm | 20 |

TABLE 2

| | Strength ratio | Strength retention ratio (%) |
|---|---|---|
| Example 1 | 1.8 | 94.0 |
| Example 2 | 1.7 | 93.5 |
| Example 3 | 1.9 | 94.5 |
| Example 4 | 1.7 | 93.5 |
| Example 5 | 2.2 | 96.0 |
| Example 6 | 2.0 | 95.0 |
| Example 7 | 2.7 | 98.5 |
| Example 8 | 2.5 | 97.5 |
| Example 9 | 2.0 | 95.0 |
| Example 10 | 1.8 | 94.0 |
| Example 11 | 1.7 | 93.5 |
| Example 12 | 1.5 | 92.5 |
| Comparative Example 1 | 1.0 | 90.0 |

As is obvious from Table 1, in the pressed powder materials according to Examples 1 to 12, the ratio of the length of a void site with respect to the flat surface is 20% or less. On the other hand, in Comparative Example 1, the ratio of the length of a void site with respect to the flat surface is not included in the above-described range.

As is obvious from Table 2, it is understood that the pressed powder materials of Examples 1 to 12 are excellent in terms of the strength ratio and the strength retention ratio, compared to the pressed powder material of Comparative Example 1. This is because since there are many void sites in the pressed powder material of Comparative Example 1, the binding force between the flaky magnetic metal particles is insufficient. In Examples 1 to 12, it can be seen that since the strength ratio is excellent, the strength retention ratio is also improved compared to Comparative Example 1. As described above, only in a case in which the ratio of the length of a void site with respect to the flat surface is in the range of 20% or less, remarkable effects are obtained, a high strength ratio can be realized, and an improvement effects are obtained also for the strength retention ratio. That is, it is understood that the pressed powder materials have excellent thermal stability and mechanical characteristics (strength and hardness). Furthermore, the pressed powder materials of the Examples can be applied to complicated shapes.

While certain embodiments have been described, these embodiments have been presented by way of example only, and are not intended to limit the scope of the inventions. Indeed, a pressed powder material and a rotating electric machine described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. A pressed powder material, comprising:
a plurality of flaky magnetic metal particles, each flaky magnetic metal particle having a flat surface; and a magnetic metal phase containing at least one first element selected from the group consisting of Fe, Co, and Ni, the flaky magnetic metal particles having an average thickness of from 10 nm to 100 μm and an average value of the ratio of the average length in the flat surface to the thickness of from 5 to 10,000; and
an intercalated phase existing between the flaky magnetic metal particles and containing at least one second element selected from the group consisting of oxygen (O), carbon (C), nitrogen (N), and fluorine (F),
wherein the pressed powder material includes a plane,
and wherein the pressed powder material includes, in a predetermined cross-section perpendicular to the flat surfaces, a void site at the boundary part between the flat surface of a flaky magnetic metal particle and the intercalated phase in contact with the flat surface, and the ratio of the length of the void site is 20% or less with respect to the length of the flat surface.

2. The pressed powder material according to claim 1, wherein the pressed powder material has a difference in coercivity on the basis of direction within the plane of the pressed powder material.

3. The pressed powder material according to claim 1, wherein at least a portion of the surface of the flaky magnetic metal particles is covered with a coating layer having a thickness of from 0.1 nm to 1 μm and containing at least one second element selected from the group consisting of oxygen (O), carbon (C), nitrogen (N), and fluorine (F).

4. The pressed powder material according to claim 1, wherein the intercalated phase contains a resin having a weight reduction ratio of 5% or less after heating for 3,000 hours at 180° C.

5. The pressed powder material according to claim 1, wherein the pressed powder material has a weight reduction ratio of 5% or less after heating for 3,000 hours at 180° C.

6. The pressed powder material according to claim 1, wherein the intercalated phase contains a resin having no glass transition point up to a thermal decomposition temperature.

7. The pressed powder material according to claim 1, wherein the intercalated phase is a polyimide resin.

8. A rotating electric machine comprising the pressed powder material according to claim 1.

9. A rotating electric machine comprising a magnetic wedge containing the pressed powder material according to claim 1.

10. A rotating electric machine comprising a core containing the pressed powder material according to claim 1.

* * * * *